(12) United States Patent
Teeter et al.

(10) Patent No.: US 12,355,496 B2
(45) Date of Patent: *Jul. 8, 2025

(54) SINGLE CABLE OPTICAL DATA/POWER TRANSMISSION ETHERNET PORT ADAPTER SYSTEM

(71) Applicant: Dell Products L.P., Round Rock, TX (US)

(72) Inventors: Victor Teeter, Round Rock, TX (US); Shree Rathinasamy, Round Rock, TX (US); Neal Beard, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 112 days.

This patent is subject to a terminal disclaimer.

(21) Appl. No.: 18/457,485

(22) Filed: Aug. 29, 2023

(65) Prior Publication Data

US 2025/0080238 A1 Mar. 6, 2025

(51) Int. Cl.
*H04B 10/80* (2013.01)
*H04L 12/10* (2006.01)

(52) U.S. Cl.
CPC ........... *H04B 10/807* (2013.01); *H04L 12/10* (2013.01)

(58) Field of Classification Search
CPC ............................... H04B 10/807; H04L 12/10
See application file for complete search history.

(56) References Cited

U.S. PATENT DOCUMENTS

| | | |
|---|---|---|
| 7,813,646 B2 | 10/2010 | Furey |
| 9,052,482 B1* | 6/2015 | Siddhaye ........... H04Q 11/0003 |
| 10,001,612 B2 | 6/2018 | Zediker et al. |
| 2018/0328150 A1 | 11/2018 | Grubb et al. |
| 2022/0038189 A1 | 2/2022 | Goergen et al. |

* cited by examiner

*Primary Examiner* — Stefan Stoynov
(74) *Attorney, Agent, or Firm* — Joseph Mencher

(57) ABSTRACT

A single cable optical data/power transmission Ethernet port adapter system includes a single cable optical data/power transmission powering device ("powering device") coupled to a powered device using an optical data/power transmission cable ("cable") and a single cable optical data/power transmission Ethernet port adapter device ("adapter device"). The adapter device includes an Ethernet port coupled to the powered device, and an optical data/power connector connected to the cable and including optical data conduit(s) and optical power conduit(s) with a greater cross-section area than the optical data conduit(s). A data communication system receives optical data from the powering device via the optical data conduit(s) and uses it to transmit electrical data via the Ethernet port to the powered device, and a power transmission system receives optical power from the powering device via the optical power conduit(s) and uses it to transmit electrical power via the Ethernet port to the powered device.

20 Claims, 40 Drawing Sheets

SINGLE CABLE OPTICAL DATA/POWER TRANSMISSION ETHERNET PORT ADAPTER SYSTEM

CROSS-REFERENCE TO RELATED APPLICATIONS

The present application is related to the following co-pending applications: (1) U.S. patent application Ser. No. 18/457,395, filed Aug. 29, 2023; (2) U.S. patent application Ser. No. 18/457,436, filed Aug. 29, 2023; (3) U.S. patent application Ser. No. 18/457,576, filed Aug. 29, 2023; (4) U.S. patent application Ser. No. 18/457,711, filed Aug. 29, 2023; and (5) U.S. patent application Ser. No. 18/457,995, filed Aug. 29, 2023.

BACKGROUND

The present disclosure relates generally to information handling systems, and more particularly to transmitting data and power optically over a single cable using an information handling system operating as a powering device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Most information handling systems include a separate power cable and data cable that must be connected to a power outlet and a communications device, respectively, in order to receive power and perform data communications, respectively. As the number of information handling systems utilized in a location grows, the amount of data cables and power cables can require extensive efforts to connect, route, and/or otherwise manage. One conventional solution to such issues is the use of Power over Ethernet (POE) techniques that allow a PoE "powered" device to receive electrical power from a PoE "powering" device and communicate data with that PoE "powering" device via a single Ethernet cable. For example, Internet of Things (IoT) devices such as Internet Protocol (IP) cameras, wireless access points, Voice over IP (VOIP) phones, and other network-connected PoE powered devices may each receive their electrical power from, and communicate their data with, a PoE powering switch device via a respective Ethernet cable, which operates to simplify the installation and management of those PoE powered devices by centralizing power distribution to PoE powered devices via PoE powering switch devices and reducing the number of cables utilized by the PoE powered devices, reduce the cost of the powered device infrastructure, and allow the use of such PoE powered devices in areas with power outlets are not readily available or abundant.

However, with each new generation of IoT devices and other PoE powered devices, there has been a steady increase in both the power and data transmission bandwidth requirements of the PoE powered devices, and that trend is expected to continue into the future. While Ethernet cables (e.g., Cat5, Cat6, and Cat7 Ethernet cables) are still capable of meeting bandwidth requirements of most PoE powered devices, in many situations PoE powered devices with relatively high bandwidth requirements must be placed in relatively close proximity to the powering device, or may require signal repeaters, power boosters, and/or additional Ethernet cables to meet those relatively high bandwidth requirements.

For example, the Ethernet cables used in PoE systems typically have a maximum data transmission speed of up to 10 Gigabits per second (Gbps), and high definition video cameras, audio streams, and/or other high bandwidth device or communications may require data transmission bandwidths that Ethernet cables cannot support, thus preventing PoE systems from being used in such situations.

To provide another example, the Ethernet cables used in PoE systems typically have a maximum cable length of 100 meters for the transmission of power via those Ethernet cables, which presents issues with the use such PoE systems with PoE powered devices that must be located more than 100 meters from the PoE powering device (e.g., in warehouses, industrial floors, high-rise buildings, hotels, ships, agricultural land, and/or other PoE powered device configurations that require the IoT devices discussed above to span areas that may be greater than several thousand square feet in size). Conventional solutions to such issues include the utilization of the power boosters, signal repeaters, and additional Ethernet cables discussed above, as well as additional PoE powering switch devices, to enable the operation of the PoE system, which adds additional points of failure for each PoE powered device, increases the cost of the PoE system, and generally hinders the adoption of PoE systems in such situations. While batteries provide another solution to provide power without the utilization of power cables, the use of batteries with the large number of IoT devices that may be deployed in some situations (e.g., thousands of IoT devices) would require relatively extensive maintenance with regard to battery replacement.

Accordingly, it would be desirable to provide a single cable power and data transmission system that addresses the issues discussed above.

SUMMARY

According to one embodiment, an Information Handling System (IHS) includes a single cable optical data/power transmission Ethernet port adapter chassis; a single cable optical data/power port that is included on the single cable optical data/power transmission Ethernet port adapter chassis and that includes at least one optical data conduit having an optical data conduit cross-sectional area, and at least one optical power conduit having an optical power conduit cross-section area that is greater than the optical data conduit cross-sectional area; an Ethernet connector that is included on the single cable optical data/power transmission Ethernet port adapter chassis; a data communication system that is included in the single cable optical data/power transmission Ethernet port adapter chassis, that is coupled to the at least one optical data conduit and the Ethernet port, and that is configured to: receive, via at least one optical data conduit in the single cable optical data/power connector, first optical data; transmit, using the first optical data, first electrical data via the Ethernet port; a power transmission system that is included in the single cable optical data/power transmission Ethernet cable adapter chassis, that is coupled to the at least one optical power conduit and the Ethernet port, and that is configured to: receive, via at least one optical power conduit in the single cable optical data/power connector, first optical power; transmit, using the first optical power, first electrical power via the Ethernet port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
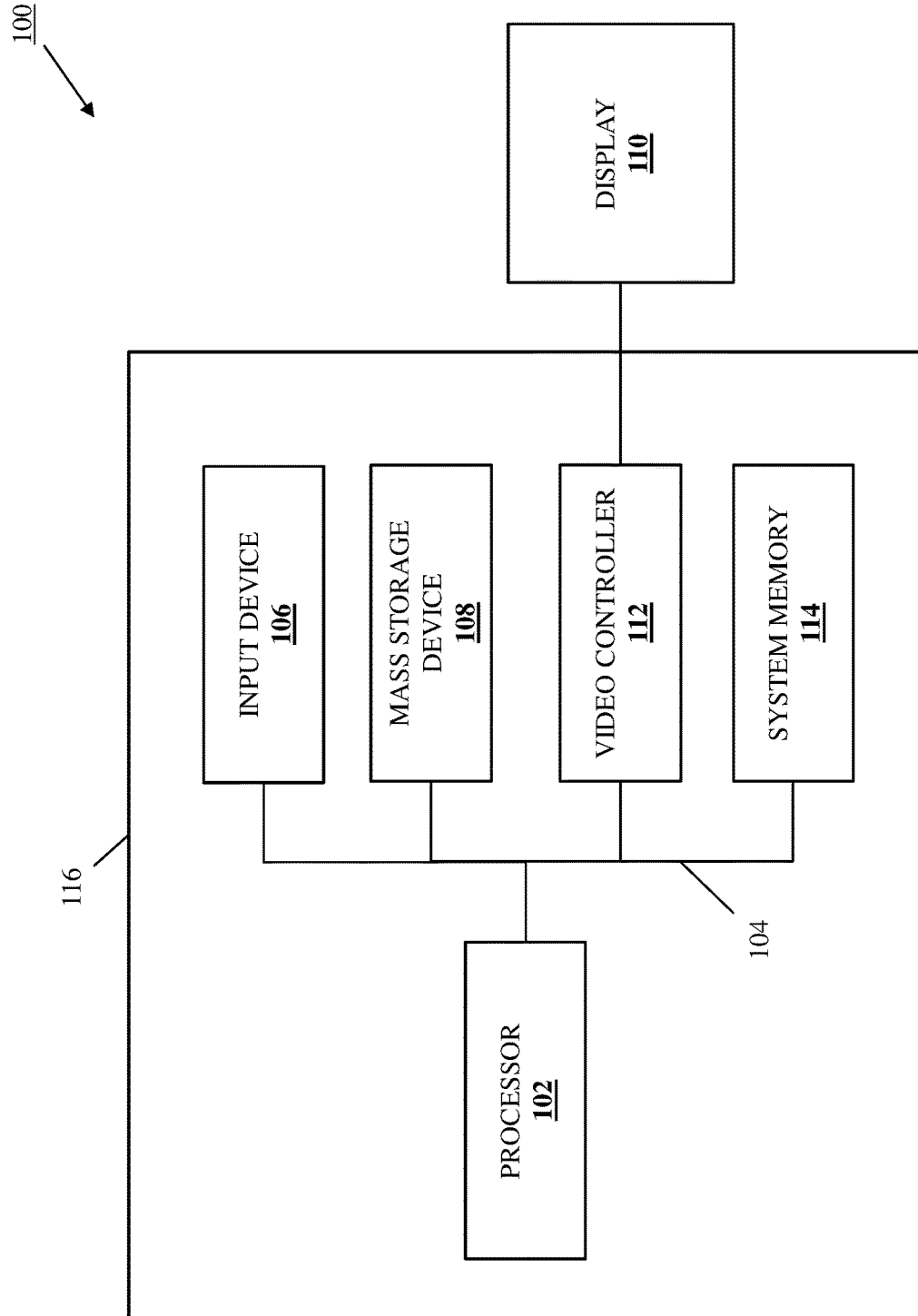
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
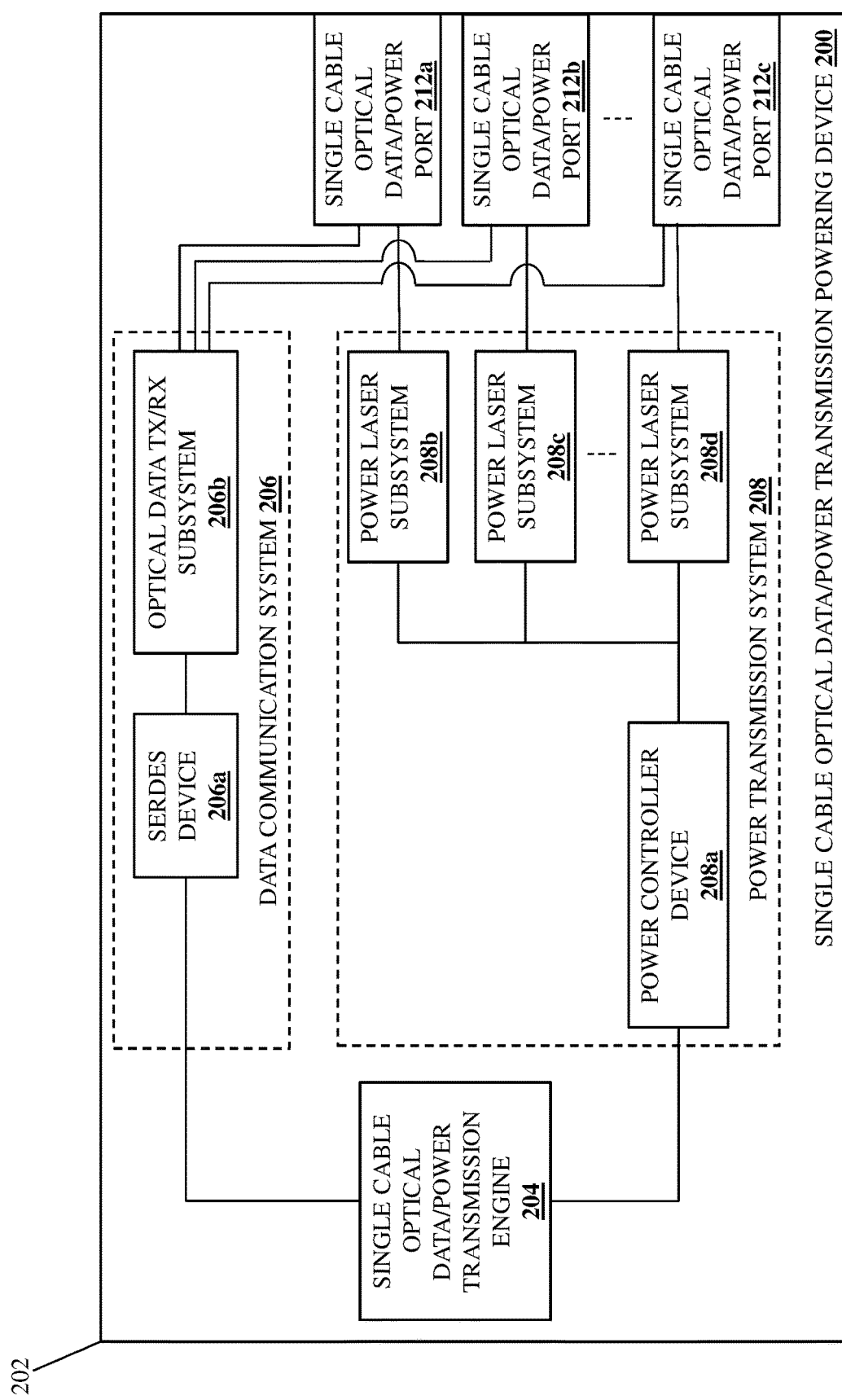
FIG. 2 is a schematic view illustrating an embodiment of a single cable optical data/power transmission powering device provided according to the teachings of the present disclosure.

Referring now to FIG. 2, an embodiment of a single cable optical data/power transmission powering device 200 is illustrated that may be used to provide the single cable optical data/power transmission powering system of the present disclosure, and in particular to transmit optical data and optical power to a powered device. In an embodiment, the single cable optical data/power transmission powering device 200 may be provided by the IHS 100 discussed above with reference to FIG. 1 and/or may include some or all of the components of the IHS 100, and in specific examples may be provided by a switch device. Furthermore, while illustrated and discussed as being provided by a switch device, one of skill in the art in possession of the present disclosure will recognize that the functionality of the single cable optical data/power transmission powering device 200 discussed below may be provided by other networking devices (e.g., router devices, access point devices, etc.), as well as other computing devices that are configured to operate similarly as the single cable optical data/power transmission powering device 200 discussed below.

In the illustrated embodiment, the single cable optical data/power transmission powering device 200 includes a chassis 202 that houses the components of the single cable optical data/power transmission powering device 200, only some of which are illustrated and described below. For example, the chassis 202 may house a processing system (not illustrated, but which may include a processor similar to the processor 102 discussed above with reference to FIG. 1 such as, for example, a Networking Processing Unit (NPU), an Ethernet System on Chip (SoC), an Application Specific Integrated Circuit (ASIC), and/or other processors that would be apparent to one of skill in the art in possession of the present disclosure) and a memory system (not illustrated, but which may include the memory 114 discussed above with reference to FIG. 1) that is coupled to the processing system and that includes instructions that, when executed by the processing system, cause the processing system to provide a single cable optical data/power transmission engine 204 that is configured to perform the functionality of the single cable optical data/power transmission engines, single cable optical data/power transmission subsystems, and/or single cable optical data/power transmission powering devices discussed below.

The chassis 202 may also house a data communication system 206 that, in the illustrated embodiment, includes a SERializer/DESerializer (SERDES) device 206a that is coupled to the single cable optical data/power transmission engine 204 (e.g., via a coupling between the SERDES device 206a and the processing system discussed above) and that one of skill in the art in possession of the present disclosure will recognize may be configured to enable high-speed data transmission via optical fibers by receiving parallel electrical data signal streams (also referred to as "electrical data" below) from the single cable optical data/ power transmission engine 204 and converting them to serial electrical data signal streams (also referred to as "electrical data" below) in order to enable higher data transmission rates, reduce the number of required interconnections, and/ or provide other high-speed data handling benefits that would be apparent to one of skill in the art in possession of the present disclosure. Furthermore, the SERDES device 206a may also be configured to convert a received serial electrical data signal stream into a parallel electrical data signal stream and provide that parallel electrical data signal stream to the single cable optical data/power transmission engine 204 as well.

The data communication system 206 in the illustrated embodiment may also include an optical data transmit/ receive (TX/RX) subsystem 206b that is coupled to the SERDES device 206a and that is configured to receive electrical data from the SERDES device (e.g., the serial electrical data signal stream discussed above), convert that electrical data to optical data, and transmit that optical data. As such, one of skill in the art in possession of the present disclosure will appreciate how the optical data TX/RX subsystem 206b may include an optical modulation device for modulating one or more laser devices using the serial electrical data signal stream discussed above to produce optical pulses that represent digital data, a fiber optic transmission device for transmitting the modulated light signal/ optical pulses to the optical data fibers discussed below, a fiber optic receiving device for receiving modulated light signal/optical pulses from optical data fibers discussed below, an optical demodulation device that may operate to convert the received modulated light signal/optical pulses to serial electrical data signal streams, and/or any other optical data TX/RX components that would be apparent to one of skill in the art in possession of the present disclosure. However, while a specific data communication system 206 has been illustrated and described, one of skill in the art in possession of the present disclosure will appreciate how the optical data of the present disclosure may be communicated using other components that will fall within the scope of the present disclosure as well.

The chassis 202 may also house a power transmission system 208 that, in the illustrated embodiment, includes a power controller device 208a that is coupled to the single cable optical data/power transmission engine 204 (e.g., via a coupling between the power controller device 208a and the processing system discussed above) and that, in the specific examples provided below, is configured to "drive", operate, and/or other control power laser subsystems in order to transmit optical power, and/thus may include any of a variety of power controller components that one of skill in the art in possession of the present disclosure would recognize as enabling the power laser subsystem operations described below. The power transmission system 208 of the illustrated embodiment also includes a plurality of power laser subsystems 208b, 208c, and up to 208d, each of which is coupled to the power controller device 208a, and each of which may include one or more laser devices. To provide a specific example, each of the power laser subsystems 208b-208d may include one or more 858 nanometer green laser devices, although one of skill in the art in possession of the present disclosure will appreciate how other types/technology laser devices will fall within the scope of the present disclosure as well. However, while a specific power transmission system 208 has been illustrated and described, one of skill in the art in possession of the present disclosure will appreciate how the optical power of the present disclosure may be transmitted using other components that will fall within the scope of the present disclosure as well.

The chassis 202 may also house a plurality of single cable optical data/power ports 212a. 212b, and up to 212c that are each coupled to the optical data TX/RX subsystem 206b in the data communication system 206, and that are each coupled to a respective power laser subsystem 208b-208d in the power transmission system 208. However, while the single cable optical data/power transmission powering device 200 is illustrated as including only single cable optical data/power ports, one of skill in the art in possession of the present disclosure will appreciate how the single cable optical data/power ports of the present disclosure may be mixed with conventional ports (e.g., PoE ports, non-PoE ports, etc.) while remaining within the scope of the present disclosure as well.

As discussed in further detail below, in the illustrated examples each single cable optical data/power port 212a-212c may provide a "female" connection that may include one or more optical data conduits that are coupled to the optical data TX/RX subsystem 206b in the data communication system 206 and that have an optical data conduit cross-sectional area, and one or more optical power conduits that are coupled to one of the power laser subsystems 208b-208d in the power transmission system 208 and that have an optical power conduit cross-section area that is greater than the optical data conduit cross-sectional area. As described below, each of the single cable optical data/power ports 212a-212c is configured to connect to an optical data/power transmission cable to couple the optical data conduit(s) in that single cable optical data/power port to corresponding optical data fiber(s) in the optical data/power transmission cable in a manner that allows for the transmission of optical data, and couple the optical power conduits(s) in that single cable optical data/power port to corresponding optical power fiber(s) in the optical data/power transmission cable in a manner that allows for the transmission of optical power.

The inventors of the present disclosure have determined that the use of a relatively small diameter single-mode optical fiber for the transmission of optical data will provide for the transmission of optical data relatively long distances (e.g., 3.5 kilometers in the specific examples provided below), while the use of a relatively large diameter optical fiber for the transmission of optical power will provide for the transmission of optical power relatively long distances (e.g., 3.5 kilometers in the specific examples provided below) as well. As will be appreciated by one of skill in the art in possession of the present disclosure, the transmission of power via optical fibers may not be substantially limited by multi-mode issues (as occurs with the transmission of data via optical fibers), allowing use of the optical power conduits in the single cable optical data/power ports 212a-212c with the relatively larger cross-sectional area without the associated issues that would occur if optical conduits with a similar cross-sectional area were used for data transmission.

As such, in a specific example of the single cable optical data/power ports 212a-212c of the present disclosure, a 9 micron diameter single mode optical conduit may be provided for the optical data conduit in those single cable optical data/power ports, and a 62.5 micron diameter optical conduit may be provided for the power data conduit in those single cable optical data/power ports. However, while a specific single cable optical data/power port has been described, one of skill in the art in possession of the present disclosure will appreciate how different components and/or component configurations may be provided for the optical data conduit(s) (e.g., utilizing more and/or larger optical data conduit(s)) and/or optical power conduit(s) (e.g., more and/or larger optical power conduits such as 125 micron diameter optical conduits, 200 micron diameter optical conduits, etc.) while remaining within the scope of the present disclosure as well.

Furthermore, in some embodiments, the optical data conduit(s) in the single cable optical data/power ports 212a-212c may include a first attenuation level that is lower than a second attenuation level of the optical power conduit(s) in the single cable optical data/power port 212a-212c. For example, the attentional levels of the optical data conduit(s) and optical power conduit(s) in the single cable optical data/power ports 212a-212c may be provided by polishing or otherwise preparing the ends of those optical data conduit(s) and optical power conduit(s) to reduce, limit, and/or otherwise control dispersion of laser light that enters those optical data conduit(s) and optical power conduit(s), and the inventors of the present disclosure has recognized that the relative attenuation level of optical conduits used to transmit power can be much higher than that of optical conduits used to transmit data, allowing the polishing and/or other preparation of the optical power conduit(s) to be reduced while still providing the benefits described above.

However, while a specific single cable optical data/power transmission powering device 200 has been illustrated and described, one of skill in the art in possession of the present disclosure will recognize that single cable optical data/power transmission powering devices (or other devices operating according to the teachings of the present disclosure in a manner similar to that described below for the single cable optical data/power transmission powering device 200) may include a variety of components and/or component configurations for providing conventional functionality (e.g., switching/networking functionality), as well as the single cable optical data/power transmission powering device functionality discussed below, while remaining within the scope of the present disclosure as well.

Figure 3:
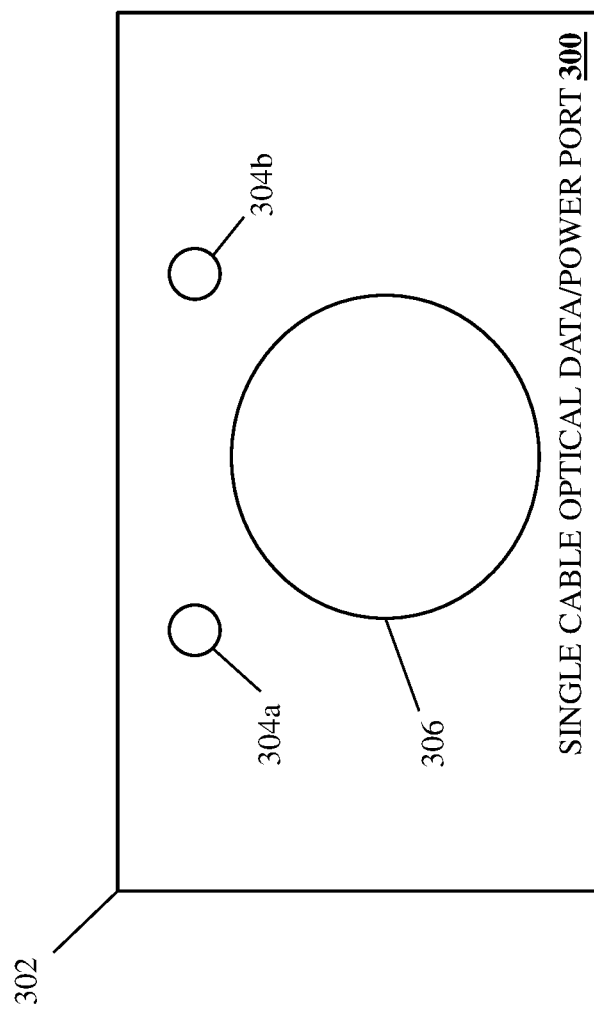
FIG. 3 is a schematic view illustrating an embodiment of a single cable optical data/power port that may be included in the single cable optical data/power transmission powering device of FIG. 2.

Referring now to FIG. 3, an embodiment of a single cable optical data/power port 300 is illustrated that may provide any or all of the single cable optical data/power ports 212a-212c discussed above with reference to FIG. 2, as well as any of the single cable optical data/power ports on the single cable optical data/power transmission powered device, the single cable optical data/power transmission Ethernet cable adapter device, the single cable optical data/power transmission Ethernet port adapter device, the single cable optical data/power transmission high availability device, or the single cable optical data/power transmission breakout device discussed below. As such, the single cable optical data/power port 300 may provide a "female" connection that may include one or more optical data conduits having an optical data conduit cross-sectional area, and one or more optical power conduits having an optical power conduit cross-section area that is greater than the optical data conduit cross-sectional area. In the specific example illustrated in FIG. 3, the single cable optical data/power port 300 includes a port chassis 302 that one of skill in the art in possession of the present disclosure will appreciate may be mounted on the chassis 202 of the single cable optical data/power transmission powering device 200 of FIG. 2.

In the specific example illustrated in FIG. 3, the port chassis 302 supports a pair of optical data conduits 304a and 304b (that are coupled to the optical data TX/RX subsystem 206b in the data communication system 206) and a single optical power conduit 306 (that is coupled to one of the power laser subsystems 208b-208d in the power transmission system 208), and one of skill in the art in possession of the present disclosure will appreciate how the optical power conduit 306 has an optical power conduit cross-section area that is greater than an optical data conduit cross-sectional area of the optical data conduits 304a and 304b. Furthermore, in some embodiments the optical data conduits 304a and 304b on the single cable optical data/power port 300 may be dedicated for optical data transmission and optical data reception, respectively, and may provide an example of the single cable optical data/power port discussed above that includes a 9 micron diameter single mode optical conduit for each of the optical data conduits 304a and 304b, and a 62.5 micron diameter optical conduit for the power data conduit 306.

Figure 4:
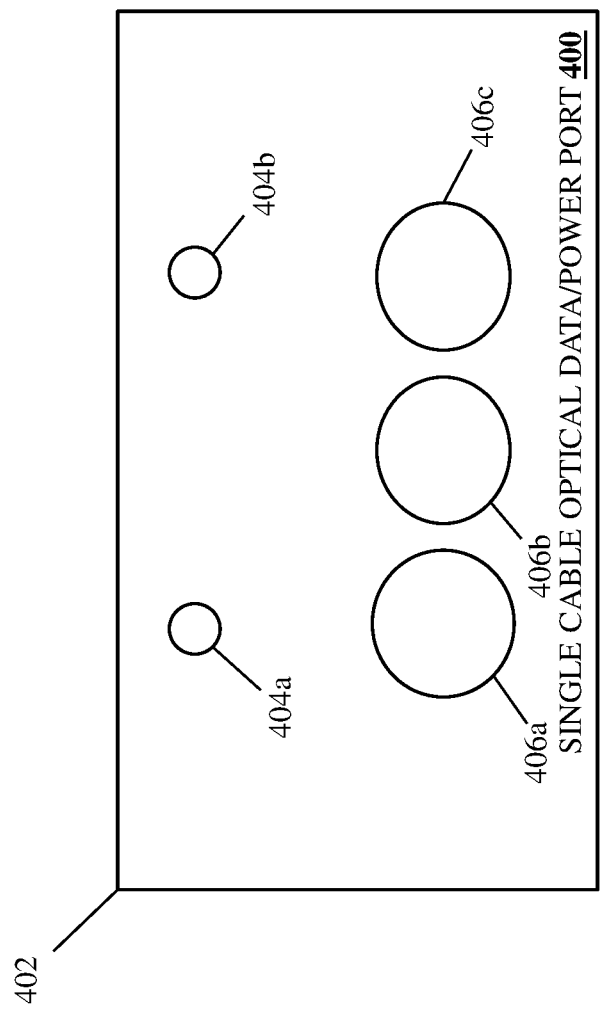
FIG. 4 is a schematic view illustrating an embodiment of a single cable optical data/power port that may be included in the single cable optical data/power transmission powering device of FIG. 2.

Referring now to FIG. 4, an embodiment of a single cable optical data/power port 400 is illustrated that may provide any or all of the single cable optical data/power ports 212a-212c discussed above with reference to FIG. 2, as well as any of the single cable optical data/power ports on the single cable optical data/power transmission powered device, the single cable optical data/power transmission Ethernet cable adapter device, the single cable optical data/power transmission Ethernet port adapter device, the single cable optical data/power transmission high availability device, or the single cable optical data/power transmission breakout device discussed below. As such, the single cable optical data/power port 400 may provide a "female" connection that may include one or more optical data conduits having an optical data conduit cross-sectional area, and one or more optical power conduits having an optical power conduit cross-section area that is greater than the optical data conduit cross-sectional area.

In the specific example illustrated in FIG. 4, the single cable optical data/power port 400 includes a port chassis 402 that one of skill in the art in possession of the present disclosure will appreciate may be mounted on the chassis 202 of the single cable optical data/power transmission powering device 200 of FIG. 2. In the specific example illustrated in FIG. 4, the port chassis 402 supports a pair of optical data conduits 404a and 404b (that are coupled to the optical data TX/RX subsystem 206b in the data communication system 206) and that have an optical data conduit cross-sectional area, and a plurality of optical power conduits 406a, 406b, and 406c (that are coupled to one of the power laser subsystems 208b-208d in the power transmission system 208), and one of skill in the art in possession of the present disclosure will appreciate how the optical power conduits 406a-406c have an optical power conduit cross-section area that is greater than an optical data conduit cross-sectional area of the optical data conduits 404a and 404b. Similarly as described above, in some embodiments the optical data conduits 404a and 404b on the single cable optical data/power port 400 may be dedicated for optical data transmission and optical data reception, respectively.

Figure 5:
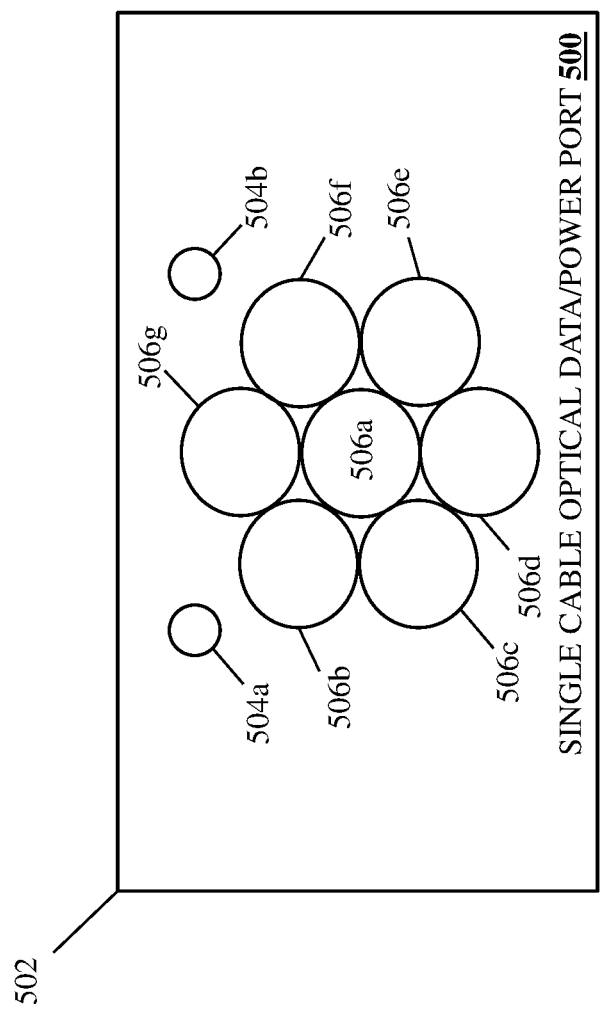
FIG. 5 is a schematic view illustrating an embodiment of a single cable optical data/power port that may be included in the single cable optical data/power transmission powering device of FIG. 2.

Referring now to FIG. 5, an embodiment of a single cable optical data/power port 500 is illustrated that may provide any or all of the single cable optical data/power ports 212a-212c discussed above with reference to FIG. 2, as well as any of the single cable optical data/power ports on the single cable optical data/power transmission powered device, the single cable optical data/power transmission Ethernet cable adapter device, the single cable optical data/power transmission Ethernet port adapter device, the single cable optical data/power transmission high availability device, or the single cable optical data/power transmission breakout device discussed below. As such, the single cable optical data/power port 500 may provide a "female" connection that may include one or more optical data conduits having an optical data conduit cross-sectional area, and one or more optical power conduits having an optical power conduit cross-section area that is greater than the optical data conduit cross-sectional area.

In the specific example illustrated in FIG. 5, the single cable optical data/power port 500 includes a port chassis 502 that one of skill in the art in possession of the present disclosure will appreciate may be mounted on the chassis 202 of the single cable optical data/power transmission powering device 200 of FIG. 2. In the specific example illustrated in FIG. 5, the port chassis 502 supports a pair of optical data conduits 504a and 504b (that are coupled to the optical data TX/RX subsystem 206b in the data communication system 206) and a plurality of optical power conduits 506a, 506b, 506c, 506d, 506e, 506f, and 506g (that are coupled to one of the power laser subsystems 208b-208d in the power transmission system 208), and one of skill in the art in possession of the present disclosure will appreciate how the optical power conduits 506a-506g have an optical power conduit cross-section area that is greater than an optical data conduit cross-sectional area of the optical data conduits 504a and 504b. Similarly as described above, in some embodiments the optical data conduits 504a and 504b on the single cable optical data/power port 500 may be dedicated for optical data transmission and optical data reception, respectively.

However, while a few specific examples of single cable optical data/power ports have been illustrated and described, one of skill in the art in possession of the present disclosure will appreciate how single cable optical data/power ports that include one or more optical data conduits having an optical data conduit cross-sectional area, along with one or more optical power conduits having an optical power conduit cross-section area that is greater than the optical data conduit cross-sectional area, may be provided with a variety of components and/or components configurations while remaining within the scope of the present disclosure as well.

Figure 6:
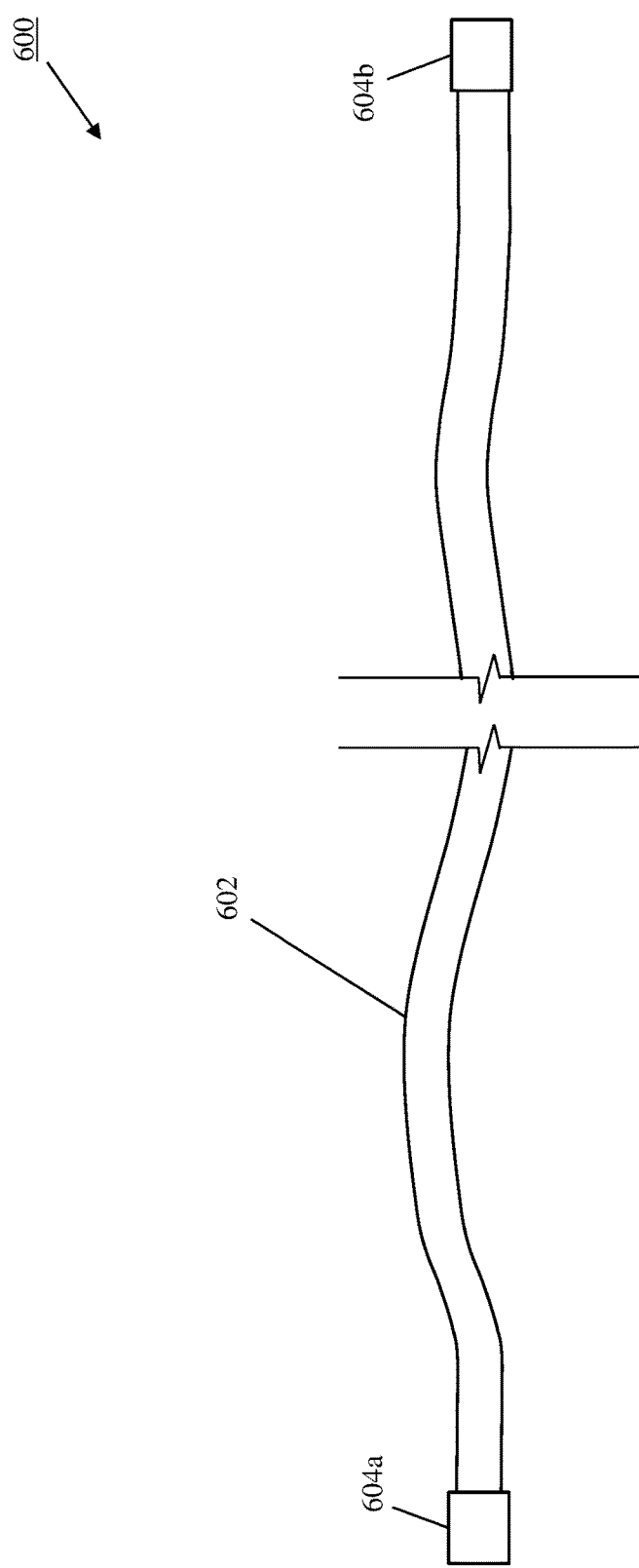
FIG. 6 is a schematic view illustrating an embodiment of an optical data/power transmission cable provided according to the teachings of the present disclosure.

Referring now to FIG. 6, an embodiment of an optical data/power transmission cable 600 is illustrated that may be used to provide the single cable optical data/power transmission powering system of the present disclosure, and in particular to transmit optical data and optical power received from the single cable optical data/power transmission powering device, the single cable optical data/power transmission Ethernet port adapter device, or the single cable optical data/power transmission breakout device to the single cable optical data/power transmission powered device of the present disclosure. In the illustrated embodiment, the optical data/power transmission cable 600 includes a cable body 602 that one of skill in the art in possession of the present disclosure will appreciate houses the optical data fibers having the optical data fiber cross-sectional area discussed below, as well as the optical power fibers having the optical power fiber cross-sectional area that is greater than the optical data fiber cross-sectional area discussed below. As such, one of skill in the art in possession of the present disclosure will appreciate how the cable body 602 may include any of a variety of cable body components and/or features to allow the optical data and optical power transmission discussed below.

Furthermore, respective single cable optical data/power connectors 604a and 604b are provided on opposite sides of the cable body 602, and as discussed in further detail below each may provide a "male" connection that may include one or more optical data conduits that are coupled to the optical data fibers in the cable body 602 and that have an optical data conduit cross-sectional area, and one or more optical power conduits that are coupled to the optical power fibers in the cable body 602 and that have an optical power conduit cross-section area that is greater than the optical data conduit cross-sectional area.

As will be appreciated by one of skill in the art in possession of the present disclosure, either of the single cable optical data/power connectors 604a and 604b is configured to connect to any of the single cable optical data/power ports 212a-212c to couple the optical data conduit(s) in that single cable optical data/power port to corresponding optical data fiber(s) in the optical data/power transmission cable 600 in order to allow for the transmission of data, as well as to couple the optical power conduits(s) in that single cable optical data/power port to corresponding optical power fiber(s) in the optical data/power transmission cable 600 in order to allow for the transmission of power.

As discussed above, the inventors of the present disclosure have determined that the use of a relatively small diameter single-mode optical fiber for the transmission of optical data will provide for the transmission of optical data relatively long distances (e.g., 3.5 kilometers in the specific examples provided below), while the use of a relatively large diameter optical fiber for the transmission of optical power will provide for the transmission of optical power relatively long distances (e.g., 3.5 kilometers in the specific examples provided below) as well, and the transmission of power via optical fibers may not be substantially limited by multi-mode issues (as occurs with the transmission of data via optical fibers), allowing use of the optical power conduits in the single cable optical data/power connectors 604a and 604b and optical power fibers in the cable body 602 with the relatively larger cross-sectional area without the associated issues that would occur if optical conduits having a similar cross-sectional area were used for data transmission.

As such, in a specific example of the optical data/power transmission cable 600 of the present disclosure, a 9 micron diameter single mode optical fiber and optical conduit may be provided for the optical data fiber(s) in the optical data/power transmission cable 600 and optical data conduit(s) in the single cable optical data/power connectors 604a and 604b, and a 62.5 micron diameter optical fiber and optical conduit may be provided for the power data fiber(s) in the optical data/power transmission cable 600 and the power data conduit(s) in the single cable optical data/power connectors 604a and 604b, which the inventors have found allow for the transmission of optical data up to 3.5 kilometers (i.e., a 3.5 kilometer length of the cable body 602 between the single cable optical data/power connectors 604a and 604b) and for transmission of optical power up to 500 meters. However, while a specific optical data/power transmission cable 600 has been described, one of skill in the art in possession of the present disclosure will appreciate how different components and/or component configurations may be provided for the optical data fiber(s) and optical data conduit(s) (e.g., utilizing more and/or larger optical data fibers and optical data conduits) and/or optical power conduits (e.g., more and/or larger optical power fiber(s) or optical power conduit(s) such as 125 micron diameter optical power fibers and optical power conduits, 200 micron diameter optical power fibers and optical power conduits, etc.) while remaining within the scope of the present disclosure as well.

Furthermore, in some embodiments, the optical data fiber(s) in the optical data/power transmission cable 600 and the optical data conduit(s) in the single cable optical data/power connectors 604*a* and 604*b* may include a first attenuation level that is lower than a second attenuation level of the optical power fiber(s) in the optical data/power transmission cable 600 and the optical power conduit(s) in the single cable optical data/power connectors 604*a* and 604*b*. Similarly as discussed above, the attentional levels of the optical data fiber(s)/conduit(s) and optical power fiber(s)/conduit(s) in the optical data/power transmission cable 600 may be provided by polishing or otherwise preparing the ends of those optical data fiber(s)/conduit(s) and optical power fiber(s)/conduit(s) to reduce, limit, and/or otherwise control dispersion of laser light that enters those optical data fiber(s)/conduit(s) and optical power fiber(s)/conduit(s), and the inventors of the present disclosure has recognized that the relative attenuation level of optical fibers/conduits used to transmit power can be much higher than that of optical fibers/conduits used to transmit data, allowing the polishing and/or other preparation of the optical power fiber(s)/conduit(s) to be reduced while still providing the benefits described above.

However, while a specific optical data/power transmission cable 600 has been illustrated and described, one of skill in the art in possession of the present disclosure will recognize that optical data/power transmission cables (or other cabling operating according to the teachings of the present disclosure in a manner similar to that described below for the optical data/power transmission cable 600) may include a variety of components and/or component configurations for providing conventional cabling functionality (e.g., shielding functionality, etc.), as well as the optical data/power transmission cable functionality discussed below, while remaining within the scope of the present disclosure as well.

Figure 7A:
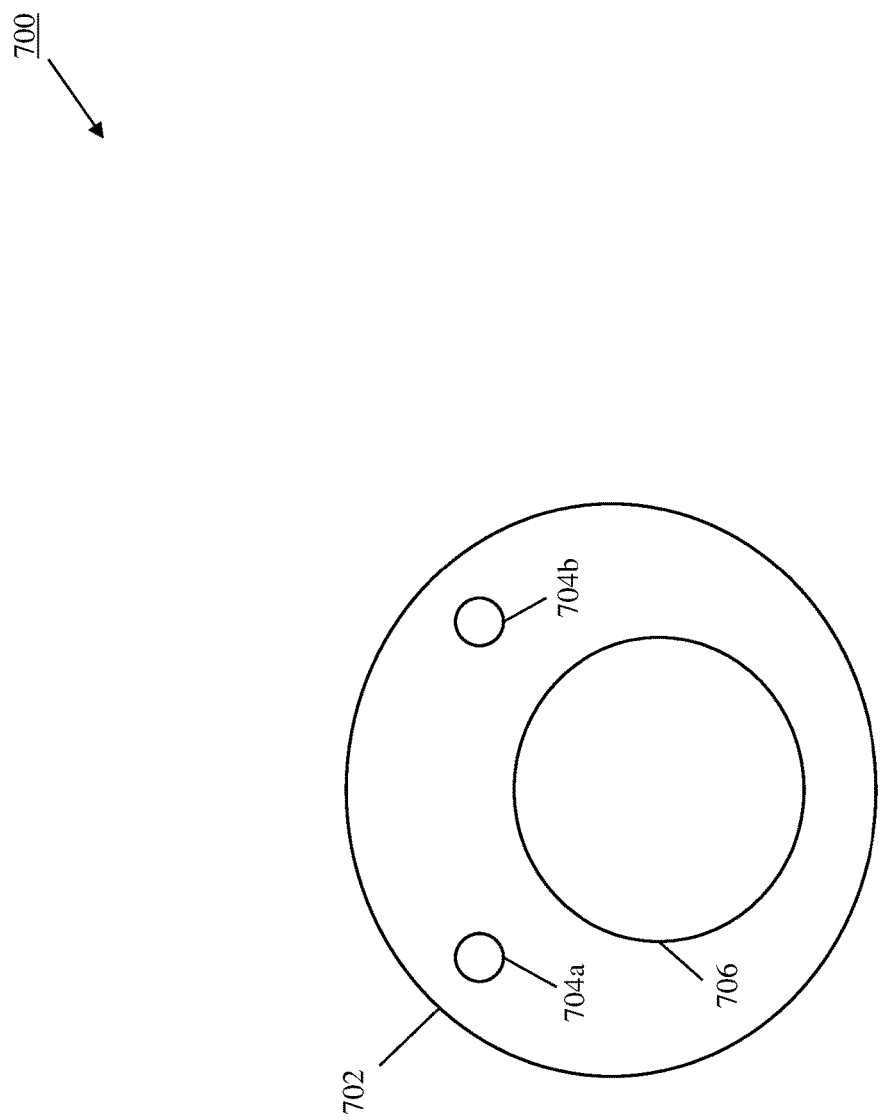
FIG. 7A is a schematic cross-sectional view illustrating an embodiment of a cross-section of the optical data/power transmission cable of FIG. 6.
Figure 7B:
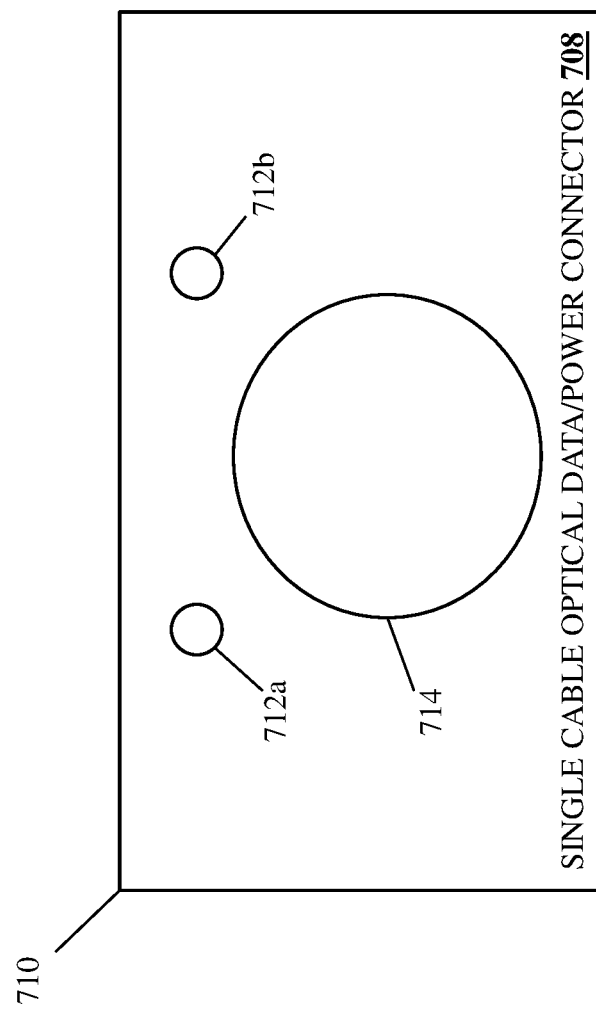
FIG. 7B is a schematic view illustrating an embodiment of a single cable optical data/power connector that may be included on the optical data/power transmission cable of FIG. 6.

Referring now to FIGS. 7A and 7B, an embodiment of an optical data/power transmission cable 700 is illustrated that may provide the optical data/power transmission cable 600 discussed above with reference to FIG. 6. As such, the optical data/power transmission cable 700 includes a cable body 702 that houses one or more optical data fibers having an optical data fiber cross-sectional area, and one or more optical power fibers having an optical power fiber cross-section area that is greater than the optical data fiber cross-sectional area. In the specific example illustrated in FIG. 7A, the cable body 702 houses a pair of optical data fibers 704*a* and 704*b* and a single optical power fiber 706, and one of skill in the art in possession of the present disclosure will appreciate how the optical power fiber 706 has an optical power fiber cross-section area that is greater than an optical data fiber cross-sectional area of the optical data fibers 704*a* and 704*b*. Furthermore, in some embodiments the optical data fibers 704*a* and 704*b* in the cable body 702 may be dedicated for optical data transmission and optical data reception, respectively, and may provide an example of the optical data/power transmission cable discussed above that includes a 9 micron diameter single mode optical fiber for each of the optical data fibers 704*a* and 704*b*, and a 62.5 micron diameter optical fiber for the optical power fiber 706.

In the specific example illustrated in FIG. 7B, a single cable optical data/power connector 708 may be included on opposite ends of the cable body 702. As will be appreciated by one of skill in the art in possession of the present disclosure, the single cable optical data/power connector 708 may provide both of the single cable optical data/power connectors 604*a* and 604*b* of FIG. 6, as well as any of the single cable optical data/power connectors on the single cable optical data/power transmission Ethernet cable adapter device, the single cable optical data/power transmission Ethernet port adapter device, or the single cable optical data/power transmission high availability device discussed below. The single cable optical data/power connector 708 includes a connector chassis 710 that supports a pair of optical data conduits 712*a* and 712*b* (which are connected to the optical data fibers 704*a* and 704*b*, respectively) and a single optical power conduit 714 (which is connected to the optical power fiber 706), and one of skill in the art in possession of the present disclosure will appreciate how the optical power conduit 714 has an optical power conduit cross-section area that is greater than an optical data conduit cross-sectional area of the optical data conduits 712*a* and 712*b*. Furthermore, in some embodiments the optical data conduits 712*a* and 712*b* may be dedicated for optical data transmission and optical data reception, respectively, and may provide an example of the optical data/power transmission connector discussed above that includes a 9 micron diameter single mode optical conduit for each of the optical data conduits 712*a* and 712*b*, and a 62.5 micron diameter optical conduit for the optical power conduit 714.

Figure 8A:
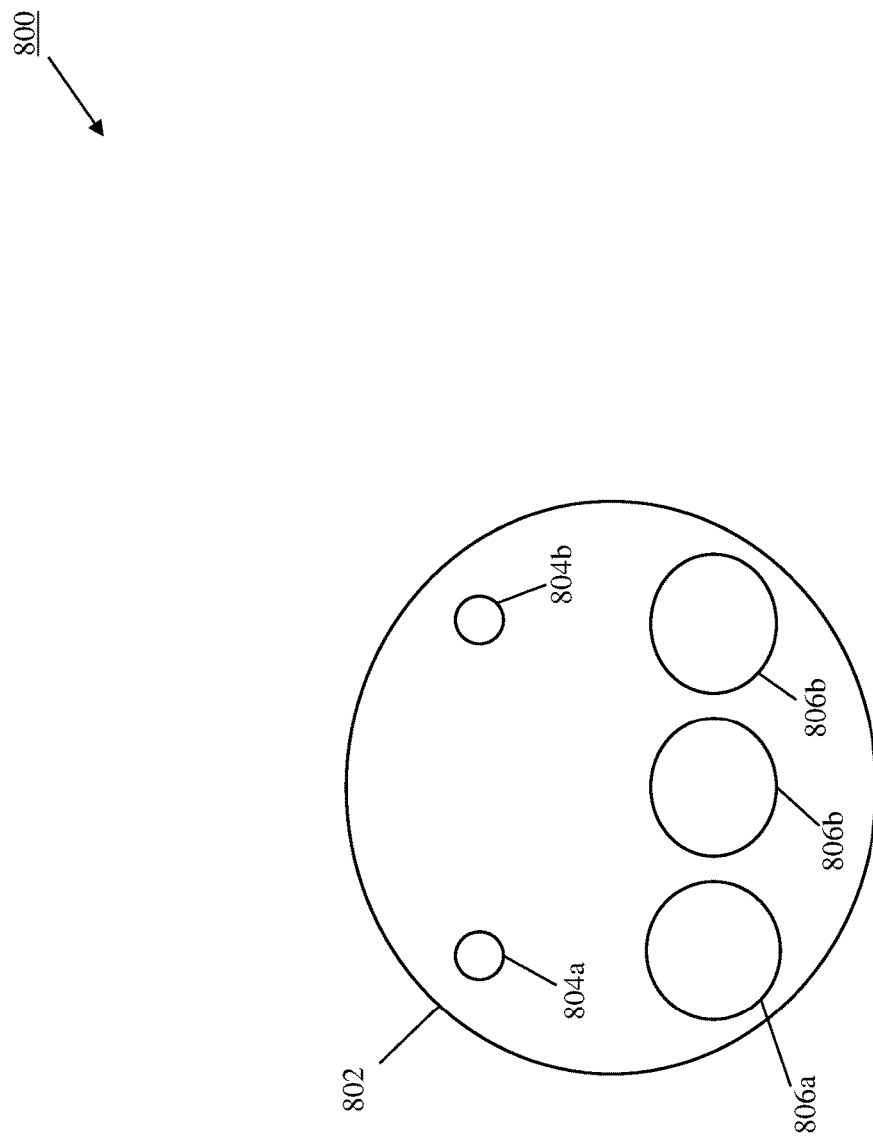
FIG. 8A is a schematic cross-sectional view illustrating an embodiment of a cross-section of the optical data/power transmission cable of FIG. 6.
Figure 8B:
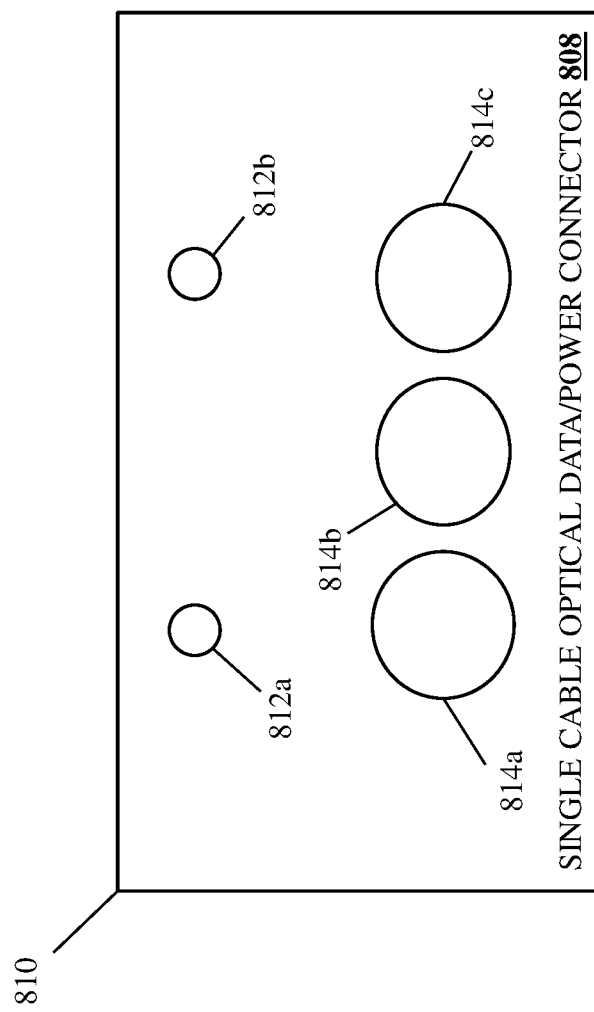
FIG. 8B is a schematic view illustrating an embodiment of a single cable optical data/power connector that may be included on the optical data/power transmission cable of FIG. 6.

Referring now to FIGS. 8A and 8B, an embodiment of an optical data/power transmission cable 800 is illustrated that may provide the optical data/power transmission cable 600 discussed above with reference to FIG. 6. As such, the optical data/power transmission cable 800 includes a cable body 802 that houses one or more optical data fibers having an optical data fiber cross-sectional area, and one or more optical power fibers having an optical power fiber cross-section area that is greater than the optical data fiber cross-sectional area. In the specific example illustrated in FIG. 8A, the cable body 802 houses a pair of optical data fibers 804*a* and 804*b* and a plurality of optical power fibers 806*a*. 806*b*, and 806*c*, and one of skill in the art in possession of the present disclosure will appreciate how the optical power fibers 806*a*-806*c* have an optical power fiber cross-section area that is greater than an optical data fiber cross-sectional area of the optical data fibers 804*a* and 804*b*. Furthermore, in some embodiments the optical data fibers 804*a* and 804*b* in the cable body 802 may be dedicated for optical data transmission and optical data reception, respectively.

In the specific example illustrated in FIG. 8B, a single cable optical data/power connector 808 may be included on opposite ends of the cable body 802. As will be appreciated by one of skill in the art in possession of the present disclosure, the single cable optical data/power connector 808 may provide both of the single cable optical data/power connectors 604*a* and 604*b* of FIG. 6, as well as any of the single cable optical data/power connectors on the single cable optical data/power transmission Ethernet cable adapter device, the single cable optical data/power transmission Ethernet port adapter device, or the single cable optical data/power transmission high availability device discussed below. The single cable optical data/power connector 808 includes a connector chassis 810 that supports a pair of optical data conduits 812a and 812b (which are connected to the optical data fibers 804a and 804b, respectively) and a plurality of optical power conduits 814a, 814b, and 814c (which are connected to the optical power fibers 806a, 806b, and 806c, respectively), and one of skill in the art in possession of the present disclosure will appreciate how the optical power conduits 814a-814c have an optical power conduit cross-section area that is greater than an optical data conduit cross-sectional area of the optical data conduits 812a and 812b. Furthermore, in some embodiments the optical data conduits 812a and 812b may be dedicated for optical data transmission and optical data reception, respectively.

Figure 9A:
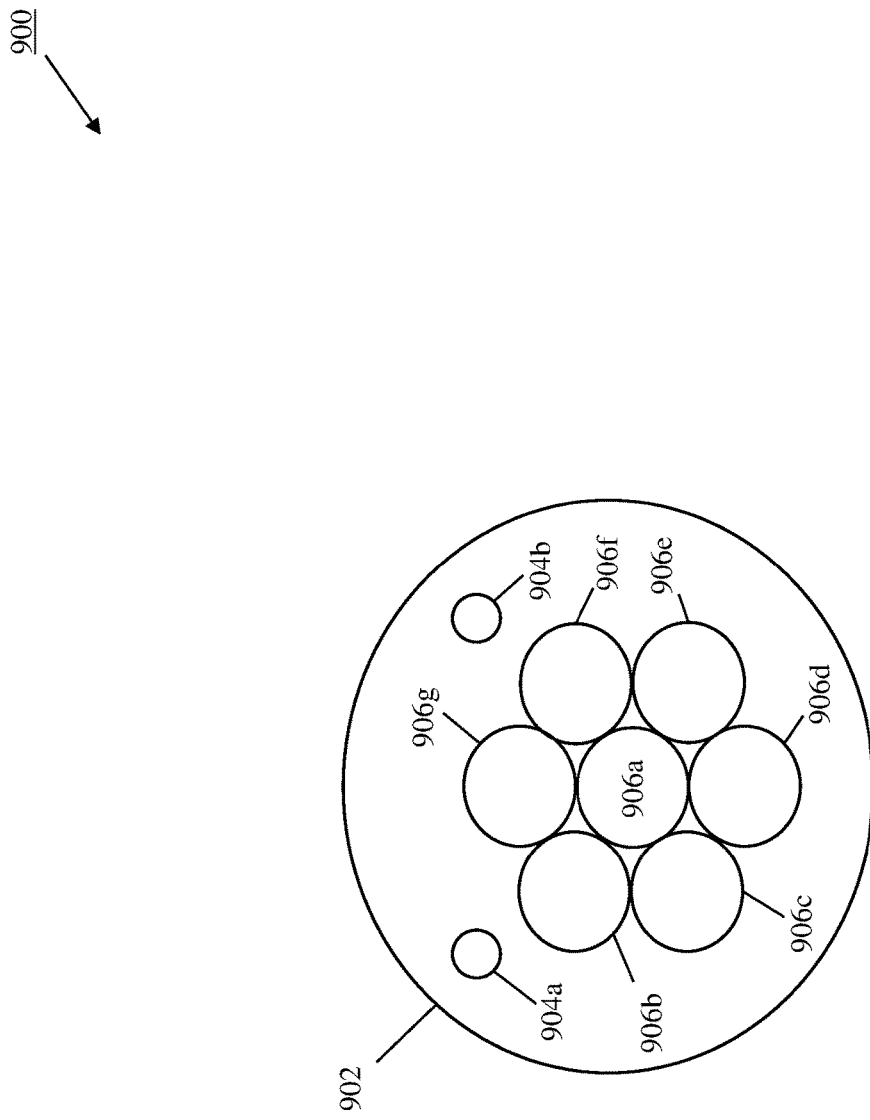
FIG. 9A is a schematic cross-sectional view illustrating an embodiment of a cross-section of the optical data/power transmission cable of FIG. 6.
Figure 9B:
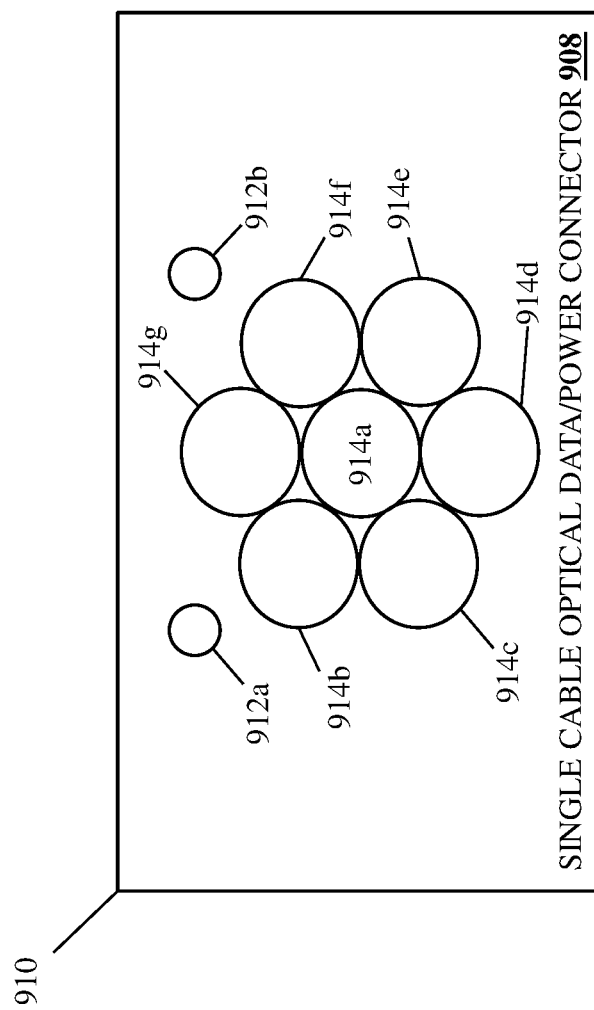
FIG. 9B is a schematic view illustrating an embodiment of a single cable optical data/power connector that may be included on the optical data/power transmission cable of FIG. 6.

Referring now to FIGS. 9A and 9B, an embodiment of an optical data/power transmission cable 900 is illustrated that may provide the optical data/power transmission cable 600 discussed above with reference to FIG. 6. As such, the optical data/power transmission cable 900 includes a cable body 902 that houses one or more optical data fibers having an optical data fiber cross-sectional area, and one or more optical power fibers having an optical power fiber cross-section area that is greater than the optical data fiber cross-sectional area. In the specific example illustrated in FIG. 9A, the cable body 902 houses a pair of optical data fibers 904a and 904b and a plurality of optical power fibers 906a, 906b, 906c, 906d, 906e, 906f, and 906g, and one of skill in the art in possession of the present disclosure will appreciate how the optical power fibers 906a-906g have an optical power fiber cross-section area that is greater than an optical data fiber cross-sectional area of the optical data fibers 904a and 904b. Furthermore, in some embodiments the optical data fibers 904a and 904b in the cable body 902 may be dedicated for optical data transmission and optical data reception, respectively.

In the specific example illustrated in FIG. 9B, a single cable optical data/power connector 908 may be included on opposite ends of the cable body 902. As will be appreciated by one of skill in the art in possession of the present disclosure, the single cable optical data/power connector 908 may provide both of the single cable optical data/power connectors 604a and 604b of FIG. 6, as well as any of the single cable optical data/power connectors on the single cable optical data/power transmission Ethernet cable adapter device, the single cable optical data/power transmission Ethernet port adapter device, or the single cable optical data/power transmission high availability device discussed below. The single cable optical data/power connector 908 includes a connector chassis 910 that supports a pair of optical data conduits 912a and 912b (which are connected to the optical data fibers 904a and 904b, respectively) and a plurality of optical power conduits 914a, 914b, 914c, 914d, 914e, 914f, and 914g (which are connected to the optical power fibers 906a, 906b, 906c, 906d, 906e, 906f, and 906g, respectively), and one of skill in the art in possession of the present disclosure will appreciate how the optical power conduits 914a-914g have an optical power conduit cross-section area that is greater than an optical data conduit cross-sectional area of the optical data conduits 912a and 912b. Furthermore, in some embodiments the optical data conduits 912a and 912b may be dedicated for optical data transmission and optical data reception, respectively.

However, while a few specific examples of optical data/power transmission cables have been illustrated and described, one of skill in the art in possession of the present disclosure will appreciate how optical data/power transmission cables that include one or more optical data fibers and optical data conduits having an optical data fiber/conduit cross-sectional area, along with one or more optical power fibers and optical power conduits having an optical power fiber/conduit cross-section area that is greater than the optical data fiber/conduit cross-sectional area, may be provided with a variety of components and/or components configurations while remaining within the scope of the present disclosure as well.

Figure 10:
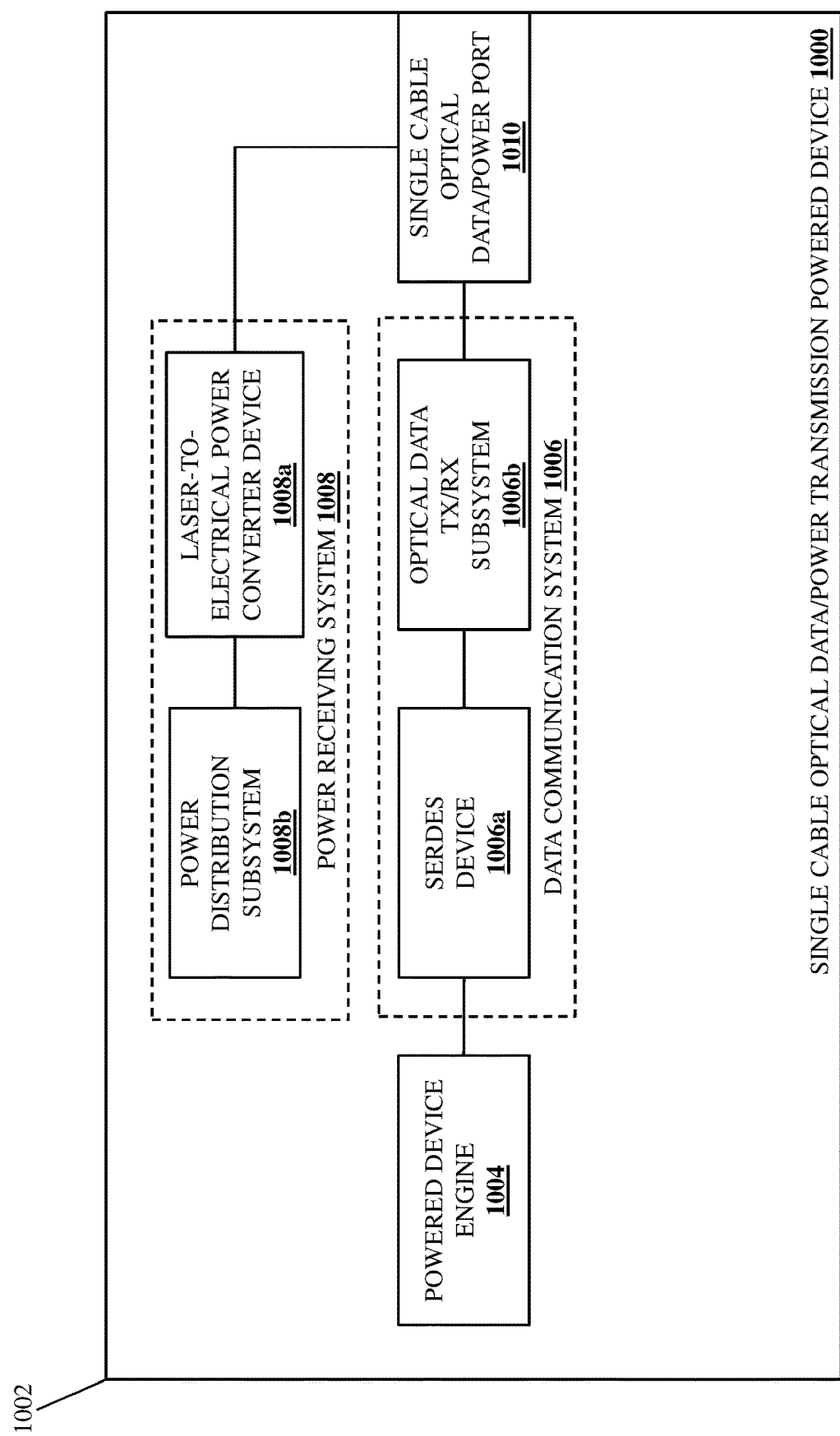
FIG. 10 is a schematic view illustrating an embodiment of a single cable optical data/power transmission powered device provided according to the teachings of the present disclosure.

Referring now to FIG. 10, an embodiment of a single cable optical data/power transmission powered device 1000 is illustrated that may be used to provide the single cable optical data/power transmission powering system of the present disclosure, and in particular to receive optical data and optical power from the single cable optical data/power transmission powering device, the single cable optical data/power transmission Ethernet cable adapter device, the single cable optical data/power transmission Ethernet port adapter device, the single cable optical data/power transmission high availability device, or the single cable optical data/power transmission breakout device of the present disclosure.

In an embodiment, the single cable optical data/power transmission powered device 1000 may be provided by the IHS 100 discussed above with reference to FIG. 1 and/or may include some or all of the components of the IHS 100, and in specific examples may be provided by IoT devices such as Internet Protocol (IP) cameras, wireless access points, Voice over IP (VOIP) phones, and other network-connected PoE powered devices that would be apparent to one of skill in the art in possession of the present disclosure. Furthermore, while illustrated and discussed as being provided by IoT devices, one of skill in the art in possession of the present disclosure will recognize that the functionality of the single cable optical data/power transmission powered device 1000 discussed below may be provided by other computing devices that are configured to operate similarly as the single cable optical data/power transmission powered device 1000 discussed below.

In the illustrated embodiment, the single cable optical data/power transmission powered device 1000 includes a chassis 1002 that houses the components of the single cable optical data/power transmission powered device 1000, only some of which are illustrated and described below. For example, the chassis 1002 may house a processing system (not illustrated, but which may include a processor similar to the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a powered device engine 1004 that is configured to perform the functionality of the powered device engines, powered device subsystems, and/or powered devices discussed below.

The chassis 1002 may also house a data communication system 1006 that, in the illustrated embodiment, includes a SERializer/DESerializer (SERDES) device 1006a that is coupled to the powered device engine 1004 (e.g., via a coupling between the SERDES device 1006a and the processing system discussed above) and that one of skill in the art in possession of the present disclosure will recognize may be configured to enable high-speed data transmission via optical fibers by receiving parallel electrical data signal streams (also referred to as "electrical data" below) from the powered device engine 1004 and converting them to serial electrical data signal streams (also referred to as "electrical data" below) in order to enable higher data transmission rates, reduce the number of required interconnections, and/or provide other high-speed data handling benefits that would be apparent to one of skill in the art in possession of the present disclosure. Furthermore, the SERDES device 1006a may also be configured to convert a received serial electrical data signal stream into a parallel electrical data signal stream and provide that parallel electrical data signal stream to the powered device engine 1004 as well.

The data communication system 1006 in the illustrated embodiment may also include an optical data TX/RX subsystem 1006b that is coupled to the SERDES device 1006a and that is configured to receive electrical data from the SERDES device (e.g., the serial electrical data signal stream discussed above), convert that electrical data to optical data, and transmit that optical data. As such, one of skill in the art in possession of the present disclosure will appreciate how the optical data TX/RX subsystem 1006b may include an optical modulation device for modulating one or more laser devices using the serial electrical data signal stream discussed above to produce optical pulses that represent digital data, a fiber optic transmission device for transmitting the modulated light signal/optical pulses to the optical data fibers in the optical data/power transmission cable 600, a fiber optic receiving device for receiving modulated light signal/optical pulses from the optical data fibers in the optical data/power transmission cable 600, and/or any other optical data TX/RX components that would be apparent to one of skill in the art in possession of the present disclosure. However, while a specific data communication system 1006 has been illustrated and described, one of skill in the art in possession of the present disclosure will appreciate how the optical data of the present disclosure may be communicated using other components that will fall within the scope of the present disclosure as well.

The chassis 1002 may also house a power receiving system 1008 that, in the illustrated embodiment, includes a laser-to-electrical power converter device 1008a that is configured to convert optical power (e.g., from a laser) that is received via the optical power conduit(s) in the single cable optical data/power port 1010 to electrical power. For example, the laser-to-electrical power converter device 1008a may be provided by a photovoltaic power converter that is configured to convert optical power provided by laser light into electrical power, although other techniques for converting optical power provided by laser light into electrical power are envisioned as falling within the scope of the present disclosure as well. To provide a specific example, the laser-to-electrical power converter device 1008a may be configured to convert 15 watts of optical power/laser light to 9 watts of electrical power at current laser-to-electrical power conversion efficiencies, although other power amounts are envisioned as falling within the scope of the present disclosure as well.

The power transmission system 1008 of the illustrated embodiment also includes a power distribution system 1008b that is coupled to the laser-to-electrical power converter device 1008a and that is configured to distribute electrical power received from the laser-to-electrical power converter device 1008a to the processing system/memory system that provide the powered device engine 1004, the data communication system 1006, the power receiving system 1008, and/or any other components of the single cable optical data/power transmission powered device 1000. However, while a specific power receiving system 1008 has been illustrated and described, one of skill in the art in possession of the present disclosure will appreciate how the optical power of the present disclosure may be utilized to power the single cable optical data/power transmission powered device 1000 using other components that will fall within the scope of the present disclosure as well.

The chassis 202 may also house a single cable optical data/power port 1010 that is coupled to the optical data TX/RX subsystem 1006b in the data communication system 1006, and coupled to the laser-to-electrical power converter device 1008a in the power receiving system 1008, and that may be provided by any of the single cable optical data/power ports 300, 400, and/or 500 discussed above. Similarly to the single cable optical data/power ports discussed above, the single cable optical data/power port 1010 may provide a "female" connection that may include one or more optical data conduits that are coupled to the optical data TX/RX subsystem 1006b in the data communication system 1006 and that have an optical data conduit cross-sectional area, and one or more optical power conduits that are coupled to the laser-to-electrical power converter device 1008a in the power receiving system 1008 and that have an optical power conduit cross-section area that is greater than the optical data conduit cross-sectional area.

As will be appreciated by one of skill in the art in possession of the present disclosure, the single cable optical data/power port 1010 is configured to connect to the single cable optical data/power connectors 604a or 604b on the optical data/power transmission cable 600 in order to couple the optical data conduit(s) in that single cable optical data/power port to corresponding optical data fiber(s) in the optical data/power transmission cable 600 to transmit data, and couple the optical power conduits(s) in that single cable optical data/power port to corresponding optical power fiber(s) in the optical data/power transmission cable 600 to transmit power. Similarly, the single cable optical data/power port 1010 is also configured to connect to the single cable optical data/power connector on the single cable optical data/power transmission Ethernet cable adapter device or single cable optical data/power transmission high availability device discussed below in order to couple the optical data conduit(s) in that single cable optical data/power port/single cable optical data/power connector combination in order to allow for the transmission of optical data, and couple the optical power conduit(s) in that single cable optical data/power port/single cable optical data/power connector combination in order to allow for the transmission of optical power.

As such, in a specific example of the single cable optical data/power ports of the present disclosure, a 9 micron diameter single mode optical conduit may be provided for the optical data conduit in the single cable optical data/power port 1010, and a 62.5 micron diameter optical conduit may be provided for a power data conduit in the single cable optical data/power port 1010. However, while a specific single cable optical data/power port has been described, one of skill in the art in possession of the present disclosure will appreciate how different components and/or component configurations may be provided for the optical data conduit(s) (e.g., utilizing more and/or larger optical data conduit(s)) and/or optical power conduit(s) (e.g., more and/or larger optical power conduits such as 125 micron diameter optical power conduits, 200 micron diameter optical power conduits, etc.) while remaining within the scope of the present disclosure as well.

Furthermore, in some embodiments, the optical data conduit(s) in the single cable optical data/power port 1010 may include a first attenuation level that is lower than a second attenuation level of the optical power conduit(s) in the single cable optical data/power port 1010. As discussed above, the attentional levels of the optical data conduit(s) and optical power conduit(s) in the single cable optical data/power port 1010 may be provided by polishing or otherwise preparing the ends of those optical data conduit(s) and optical power conduit(s) to reduce, limit, and/or otherwise control dispersion of laser light that enters those optical data conduit(s) and optical power conduit(s), and the inventors of the present disclosure has recognized that the relative attenuation level of optical conduits used to transmit power can be much higher than that of optical conduits used to transmit data, allowing the polishing and/or other preparation of the optical power conduit(s) to be reduced while still providing the benefits described above.

However, while a specific single cable optical data/power transmission powered device 1000 has been illustrated and described, one of skill in the art in possession of the present disclosure will recognize that single cable optical data/power transmission powered devices (or other devices operating according to the teachings of the present disclosure in a manner similar to that described below for the single cable optical data/power transmission powered device 1000) may include a variety of components and/or component configurations for providing conventional functionality (e.g., any IoT functionality known in the art), as well as the single cable optical data/power transmission powered device functionality discussed below, while remaining within the scope of the present disclosure as well.

Figure 11:
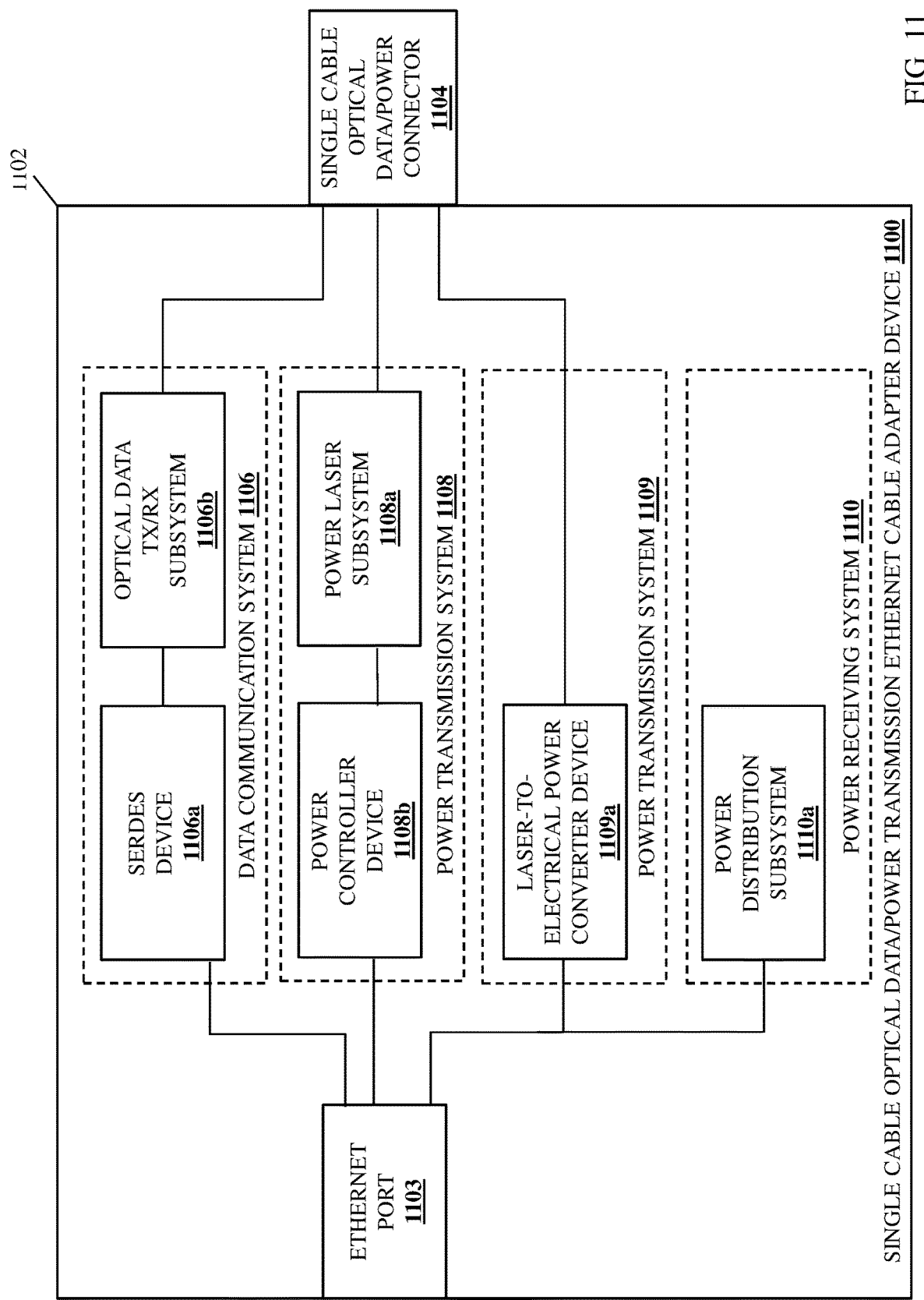
FIG. 11 is a schematic view illustrating an embodiment of a single cable optical data/power transmission Ethernet cable adapter device provided according to the teachings of the present disclosure.

Referring now to FIG. 11, an embodiment of a single cable optical data/power transmission Ethernet cable adapter device 1100 is illustrated that may be used to provide the single cable optical data/power transmission powering system of the present disclosure, and in particular to connect the single cable optical data/power transmission powering device of the present disclosure to a conventional PoE powered device via an Ethernet cable, or connect the single cable optical data/power transmission powered device of the present disclosure to a conventional PoE powering device via an Ethernet cable. As discussed in U.S. patent application Ser. No. 18/457,576, filed Aug. 29, 2023, the disclosure of which is incorporated by reference herein in its entirety, the single cable optical data/power transmission Ethernet cable adapter device 1100 may be connected directly to the single cable optical data/power transmission powering device of the present disclosure, and coupled to a conventional PoE powered device via an Ethernet cable, and may operate to receive data and power from the single cable optical data/power transmission powering device of the present disclosure, and provide that data and power via the Ethernet cable to the conventional PoE powered device. Similarly, the single cable optical data/power transmission Ethernet cable adapter device 1100 may be connected directly to the single cable optical data/power transmission powered device of the present disclosure, and coupled to a conventional PoE powering device via an Ethernet cable, and may operate to receive data and power from the conventional PoE powering device via the Ethernet cable, and provide that data and power to the single cable optical data/power transmission powered device.

In an embodiment, the single cable optical data/power transmission Ethernet cable adapter device 1100 may be provided by the IHS 100 discussed above with reference to FIG. 1 and/or may include some or all of the components of the IHS 100. In the illustrated embodiment, the single cable optical data/power transmission Ethernet cable adapter device 1100 includes a chassis 1102 that houses the components of the single cable optical data/power transmission Ethernet cable adapter device 1100, only some of which are illustrated and described below. For example, the chassis 1102 includes an Ethernet port 1103, along with a single cable optical data/power connector 1104 that may be provided by any of the single cable optical data/power connectors 700, 800, or 900 discussed above. Similarly to the single cable optical data/power connectors discussed above, the single cable optical data/power connector 1104 may provide a "male" connection that may include one or more optical data conduits that have an optical data conduit cross-sectional area, and one or more optical power conduits that have an optical power conduit cross-section area that is greater than the optical data conduit cross-sectional area. As will be appreciated by one of skill in the art in possession of the present disclosure, the single cable optical data/power connector 1104 is configured to connect to any of the single cable optical data/power ports 212a-212c on the single cable optical data/power transmission powering device 200, or to the single cable optical data/power port 1010 on the single cable optical data/power transmission powered device 1000.

As such, in a specific example of the single cable optical data/power connectors of the present disclosure, a 9 micron diameter single mode optical conduit may be provided for the optical data conduit in the single cable optical data/power connector 1104, and a 62.5 micron diameter optical conduit may be provided for a power data conduit in the single cable optical data/power connector 1104. However, while a specific single cable optical data/power connector has been described, one of skill in the art in possession of the present disclosure will appreciate how different components and/or component configurations may be provided for the optical data conduit(s) (e.g., utilizing more and/or larger optical data conduit(s)) and/or optical power conduit(s) (e.g., more and/or larger optical power conduits such as 125 micron diameter optical power conduits, 200 micron diameter optical power conduits, etc.) while remaining within the scope of the present disclosure as well.

Furthermore, in some embodiments, the optical data conduit(s) in the single cable optical data/power connector 1104 may include a first attenuation level that is lower than a second attenuation level of the optical power conduit(s) in the single cable optical data/power connector 1104. As discussed above, the attentional levels of the optical data conduit(s) and optical power conduit(s) in the single cable optical data/power connector 1104 may be provided by polishing or otherwise preparing the ends of those optical data conduit(s) and optical power conduit(s) to reduce, limit, and/or otherwise control dispersion of laser light that enters those optical data conduit(s) and optical power conduit(s), and the inventors of the present disclosure has recognized that the relative attenuation level of optical conduits used to transmit power can be much higher than that of optical conduits used to transmit data, allowing the polishing and/or other preparation of the optical power conduit(s) to be reduced while still providing the benefits described above.

The chassis 1102 may also house a data communication system 1106 that, in the illustrated embodiment, includes a SERializer/DESerializer (SERDES) device 1106a that is coupled to the Ethernet port 1103 and that one of skill in the art in possession of the present disclosure will recognize may be configured to enable high-speed data transmission via optical fibers by receiving parallel electrical data signal streams (also referred to as "electrical data" below) from the Ethernet port 1103 and converting them to serial electrical data signal streams (also referred to as "electrical data" below) in order to enable higher data transmission rates, reduce the number of required interconnections, and/or provide other high-speed data handling benefits that would be apparent to one of skill in the art in possession of the present disclosure. Furthermore, the SERDES device 1106a may also be configured to convert a received serial electrical data signal stream into a parallel electrical data signal stream and provide that parallel electrical data signal stream to the Ethernet port 1103 as well.

The data communication system 1106 in the illustrated embodiment may also include an optical data TX/RX subsystem 1106b that is coupled to the SERDES device 1106a and that is configured to receive electrical data from the SERDES device (e.g., the serial electrical data signal stream discussed above), convert that electrical data to optical data, and transmit that optical data. As such, one of skill in the art in possession of the present disclosure will appreciate how the optical data TX/RX subsystem 1106b may include an optical modulation device for modulating one or more laser devices using the serial electrical data signal stream discussed above to produce optical pulses that represent digital data, a fiber optic transmission device for transmitting the modulated light signal/optical pulses to the optical data fibers in the optical data/power transmission cable 600, a fiber optic receiving device for receiving modulated light signal/optical pulses from the optical data fibers in the optical data/power transmission cable 600, an optical demodulation device that may operate to convert the received modulated light signal/optical pulses to serial electrical data signal streams, and/or any other optical data TX/RX components that would be apparent to one of skill in the art in possession of the present disclosure. However, while a specific data communication system 1106 has been illustrated and described, one of skill in the art in possession of the present disclosure will appreciate how the optical data of the present disclosure may be communicated using other components that will fall within the scope of the present disclosure as well.

The chassis 1102 may also house a power transmission system 1108 that, in the illustrated embodiment, includes a power laser subsystem 1108a that is coupled to the optical power conduit(s) in the single cable optical data/power connector 1104, and that may include one or more laser devices. To provide a specific example, the power laser subsystem 1108b may include one or more 858 nanometer green laser devices, although one of skill in the art in possession of the present disclosure will appreciate how other types/technology laser devices will fall within the scope of the present disclosure as well. The power transmission system 1108 also includes a power controller device 1108a that is coupled to the Ethernet port 1103 and the power laser subsystem 1108a and that, in the specific examples provided below, is configured to use electrical power received via the Ethernet port 1103 to "drive", operate, and/or other control the power laser subsystem 1108a in order to transmit optical power via the optical power conduit(s) in the single cable optical data/power connector 1104, and/thus may include any of a variety of power controller components that one of skill in the art in possession of the present disclosure would recognize as enabling the power laser subsystem operations described below. However, while a specific power transmission system 1108 has been illustrated and described, one of skill in the art in possession of the present disclosure will appreciate how the optical power of the present disclosure may be transmitted using other components that will fall within the scope of the present disclosure as well.

The chassis 1102 may also house a power transmission system 1109 that, in the illustrated embodiment, includes a laser-to-electrical power converter device 1109a that is coupled to the Ethernet port 1103 and the single cable optical data/power connector 1104, and that is configured to convert optical power (e.g., from a laser) that is received via the optical power conduit(s) in the single cable optical data/power connector 1104 to electrical power, and provide that electrical power to the Ethernet port 1103. For example, the laser-to-electrical power converter device 1109a may be provided by a photovoltaic power converter that is configured to convert optical power provided by laser light into electrical power, although other techniques for converting optical power provided by laser light into electrical power are envisioned as falling within the scope of the present disclosure as well. To provide a specific example, the laser-to-electrical power converter device 1109a may be configured to convert 15 watts of optical power/laser light to 9 watts of electrical power at current laser-to-electrical power conversion efficiencies, although other power amounts are envisioned as falling within the scope of the present disclosure as well. However, while a specific power transmission system 1109 has been illustrated and described, one of skill in the art in possession of the present disclosure will appreciate how the optical power of the present disclosure may be transmitted using other components that will fall within the scope of the present disclosure as well.

The chassis 1102 may also house a power receiving system 1110 that is coupled to the Ethernet port 1103 and, in the illustrated embodiment, includes a power distribution system 1110a that is coupled to the Ethernet port 1103 and the laser-to-electrical power converter device 1109a, and that is configured to distribute electrical power received from the Ethernet port 1103 or the laser-to-electrical power converter device 1109a to the data communication system 1106, the power transmission system 1108, the power transmission system 1109, and/or any other components of the single cable optical data/power transmission Ethernet cable adapter device 1100. However, while a specific power receiving system 1110 has been illustrated and described, one of skill in the art in possession of the present disclosure will appreciate how the electrical power received via the Ethernet port 1103 may be utilized to power the single cable optical data/power transmission Ethernet cable adapter device 1100 using other components that will fall within the scope of the present disclosure as well.

However, while a specific single cable optical data/power transmission Ethernet cable adapter device 1100 has been illustrated and described, one of skill in the art in possession of the present disclosure will recognize that single cable optical data/power transmission Ethernet cable adapter device (or other devices operating according to the teachings of the present disclosure in a manner similar to that described below for the single cable optical data/power transmission Ethernet cable adapter device) may include a variety of components and/or component configurations for providing the single cable optical data/power transmission Ethernet cable adapter device functionality discussed below while remaining within the scope of the present disclosure as well.

Figure 12:
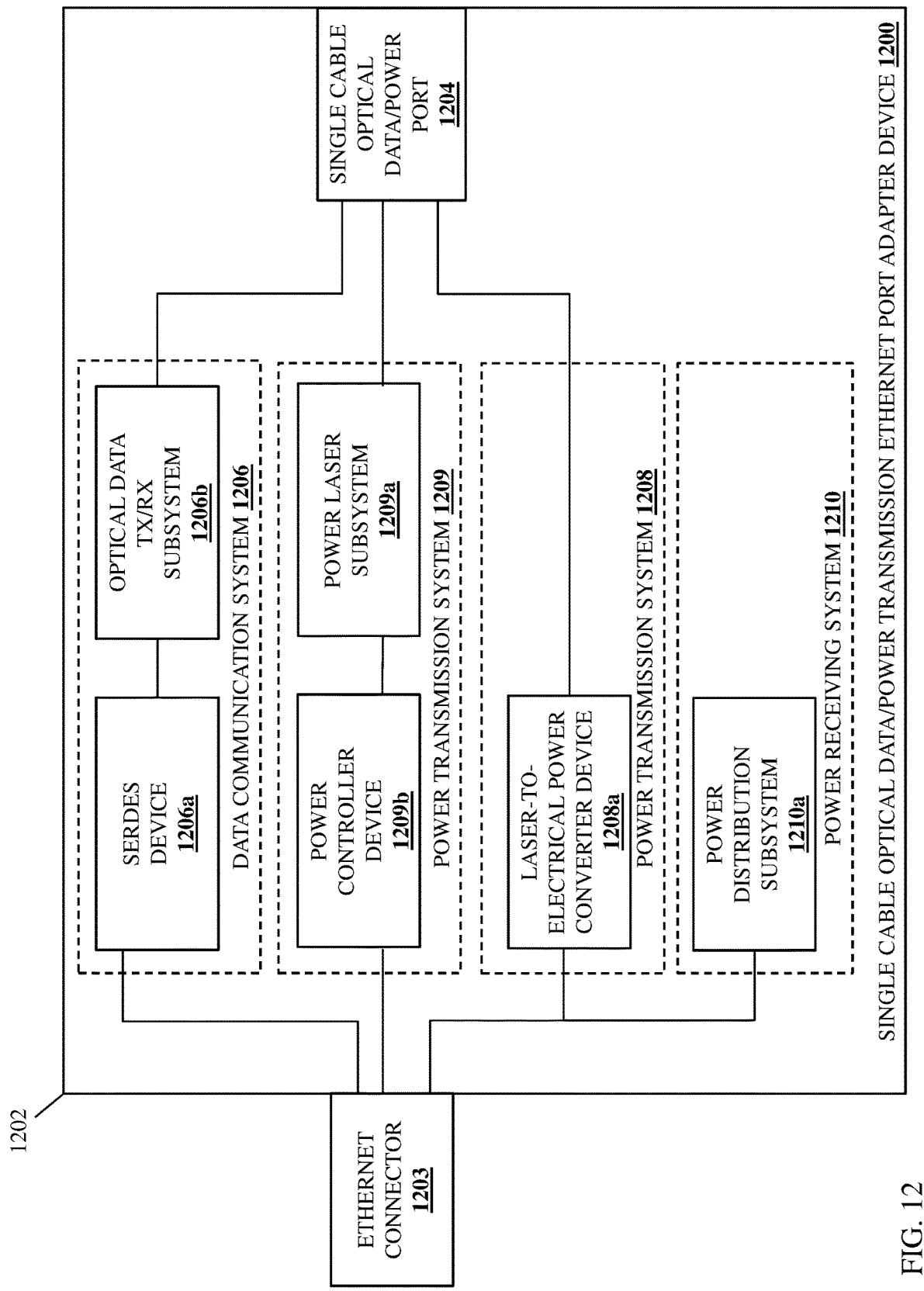
FIG. 12 is a schematic view illustrating an embodiment of a single cable optical data/power transmission Ethernet port adapter device provided according to the teachings of the present disclosure.

Referring now to FIG. 12, an embodiment of a single cable optical data/power transmission Ethernet port adapter device 1200 is illustrated that may be used to provide the single cable optical data/power transmission powering system of the present disclosure, and in particular to couple the single cable optical data/power transmission powering device of the present disclosure to a conventional Power over Ethernet (POE) powered device via the optical data/power transmission cable of the present disclosure, or to couple the single cable optical data/power transmission powered system of the present disclosure to a conventional PoE powering device via the optical data/power transmission cable of the present disclosure. As discussed below, the single cable optical data/power transmission Ethernet port adapter device 1200 may be connected directly to a conventional PoE powered device, and coupled to the single cable optical data/power transmission powering system of the present disclosure via the optical data/power transmission cable of the present disclosure, and may operate to receive data and power from the single cable optical data/power transmission powering device via the optical data/power transmission cable, and provide data and power to the conventional Power over Ethernet (POE) powered device. Similarly, the single cable optical data/power transmission Ethernet port adapter device 1200 may be connected directly to a conventional PoE powering device, and coupled to the single cable optical data/power transmission powered system of the present disclosure via the optical data/power transmission cable of the present disclosure, and may operate to receive data and power from the conventional PoE powering device, and provide data and power to the single cable optical data/power transmission powering device via the optical data/power transmission cable.

In an embodiment, the single cable optical data/power transmission Ethernet port adapter device 1200 may be provided by the IHS 100 discussed above with reference to FIG. 1 and/or may include some or all of the components of the IHS 100. In the illustrated embodiment, the single cable optical data/power transmission Ethernet port adapter device 1200 includes a chassis 1202 that houses the components of the single cable optical data/power transmission Ethernet port adapter device 1200, only some of which are illustrated and described below. For example, the chassis 1202 includes an Ethernet connector 1203, along with a single cable optical data/power port 1204 that may be provided by any of the single cable optical data/power ports 300, 400, or 500 discussed above. Similarly to the single cable optical data/power ports discussed above, the single cable optical data/power port 1204 may provide a "female" connection that may include one or more optical data conduits that have an optical data conduit cross-sectional area, and one or more optical power conduits that have an optical power conduit cross-section area that is greater than the optical data conduit cross-sectional area. As will be appreciated by one of skill in the art in possession of the present disclosure, the single cable optical data/power port 1204 is configured to connect to any of the single cable optical data/power connectors 604*a* and 604*b* on the optical data/power transmission cable 600 discussed above.

As such, in a specific example of the single cable optical data/power ports of the present disclosure, a 9 micron diameter single mode optical conduit may be provided for the optical data conduit in the single cable optical data/power port 1204, and a 62.5 micron diameter optical conduit may be provided for a power data conduit in the single cable optical data/power port 1204. However, while a specific single cable optical data/power port has been described, one of skill in the art in possession of the present disclosure will appreciate how different components and/or component configurations may be provided for the optical data conduit(s) (e.g., utilizing more and/or larger optical data conduit(s)) and/or optical power conduit(s) (e.g., more and/or larger optical power conduits such as 125 micron diameter optical power conduits, 200 micron diameter optical power conduits, etc.) while remaining within the scope of the present disclosure as well.

Furthermore, in some embodiments, the optical data conduit(s) in the single cable optical data/power port 1204 may include a first attenuation level that is lower than a second attenuation level of the optical power conduit(s) in the single cable optical data/power port 1204. As discussed above, the attentional levels of the optical data conduit(s) and optical power conduit(s) in the single cable optical data/power port 1204 may be provided by polishing or otherwise preparing the ends of those optical data conduit(s) and optical power conduit(s) to reduce, limit, and/or otherwise control dispersion of laser light that enters those optical data conduit(s) and optical power conduit(s), and the inventors of the present disclosure has recognized that the relative attenuation level of optical conduits used to transmit power can be much higher than that of optical conduits used to transmit data, allowing the polishing and/or other preparation of the optical power conduit(s) to be reduced while still providing the benefits described above.

The chassis 1202 may also house a data communication system 1206 that, in the illustrated embodiment, includes a SERializer/DESerializer (SERDES) device 1206*a* that is coupled to the Ethernet connector 1203 and that one of skill in the art in possession of the present disclosure will recognize may be configured to enable high-speed data transmission via optical fibers by receiving parallel electrical data signal streams (also referred to as "electrical data" below) via the Ethernet connector 1203 and converting them to serial electrical data signal streams (also referred to as "electrical data" below) in order to enable higher data transmission rates, reduce the number of required interconnections, and/or provide other high-speed data handling benefits that would be apparent to one of skill in the art in possession of the present disclosure. Furthermore, the SERDES device 1206*a* may also be configured to convert a received serial electrical data signal stream into a parallel electrical data signal stream and provide that parallel electrical data signal stream to the Ethernet connector 1203 as well.

The data communication system 1206 in the illustrated embodiment may also include an optical data TX/RX subsystem 1206*b* that is coupled to the SERDES device 1206*a* and that is configured to receive electrical data from the SERDES device (e.g., the serial electrical data signal stream discussed above), convert that electrical data to optical data, and transmit that optical data. As such, one of skill in the art in possession of the present disclosure will appreciate how the optical data TX/RX subsystem 1206*b* may include an optical modulation device for modulating one or more laser devices using the serial electrical data signal stream discussed above to produce optical pulses that represent digital data, a fiber optic transmission device for transmitting the modulated light signal/optical pulses to the optical data fibers in the optical data/power transmission cable 600, a fiber optic receiving device for receiving modulated light signal/optical pulses from the optical data fibers in the optical data/power transmission cable 600, an optical demodulation device that may operate to convert the received modulated light signal/optical pulses to serial electrical data signal streams, and/or any other optical data TX/RX components that would be apparent to one of skill in the art in possession of the present disclosure. However, while a specific data communication system 1206 has been illustrated and described, one of skill in the art in possession of the present disclosure will appreciate how the optical data of the present disclosure may be communicated using other components that will fall within the scope of the present disclosure as well.

The chassis 1202 may also house a power transmission system 1208, in the illustrated embodiment, includes a laser-to-electrical power converter device 1208a that is configured to convert optical power (e.g., from a laser) that is received via the optical power conduit(s) in the single cable optical data/power port 1204 to electrical power, and provide that electrical power to the Ethernet connector 1203. For example, the laser-to-electrical power converter device 1208a may be provided by a photovoltaic power converter that is configured to convert optical power provided by laser light into electrical power, although other techniques for converting optical power provided by laser light into electrical power are envisioned as falling within the scope of the present disclosure as well. To provide a specific example, the laser-to-electrical power converter device 1208a may be configured to convert 15 watts of optical power/laser light to 9 watts of electrical power at current laser-to-electrical power conversion efficiencies, although other power amounts are envisioned as falling within the scope of the present disclosure as well. However, while a specific power transmission system 1208 has been illustrated and described, one of skill in the art in possession of the present disclosure will appreciate how the optical power of the present disclosure may be transmitted using other components that will fall within the scope of the present disclosure as well.

The chassis 1202 may also house a power transmission system 1209 that, in the illustrated embodiment, includes a power laser subsystem 1209a that is coupled to the optical power conduit(s) in the single cable optical data/power port 1204, and that may include one or more laser devices. To provide a specific example, the power laser subsystem 1209a may include one or more 858 nanometer green laser devices, although one of skill in the art in possession of the present disclosure will appreciate how other types/technology laser devices will fall within the scope of the present disclosure as well. The power transmission system 1209 also includes a power controller device 1209b that is coupled to the Ethernet connector 1203 and the power laser subsystem 1209a and that, in the specific examples provided below, is configured to use electrical power received via the Ethernet port 1203 to "drive", operate, and/or other control the power laser subsystem 1209a in order to transmit optical power via the optical power conduit(s) in the single cable optical data/power port 1204, and/thus may include any of a variety of power controller components that one of skill in the art in possession of the present disclosure would recognize as enabling the power laser subsystem operations described below. However, while a specific power transmission system 1209 has been illustrated and described, one of skill in the art in possession of the present disclosure will appreciate how the optical power of the present disclosure may be transmitted using other components that will fall within the scope of the present disclosure as well.

The chassis 1202 may also house a power receiving system 1210 that is coupled to the Ethernet connector 1203 and the laser-to-electrical power converter device 1208a and, in the illustrated embodiment, includes a power distribution system 1210b that is configured to distribute electrical power received from the laser-to-electrical power converter device 1208a or the Ethernet connector 1203 to the data communication system 1206, the power transmission systems 1208 and 1209, and/or any other components of the single cable optical data/power transmission Ethernet port adapter device 1200. However, while a specific power receiving system 1210 has been illustrated and described, one of skill in the art in possession of the present disclosure will appreciate how the optical power received via the single cable optical data/power port 1204, or electrical power received via the Ethernet connector 1203, may be utilized to power the single cable optical data/power transmission Ethernet port adapter device 1200 using other components that will fall within the scope of the present disclosure as well.

However, while a specific single cable optical data/power transmission Ethernet port adapter device 1200 has been illustrated and described, one of skill in the art in possession of the present disclosure will recognize that single cable optical data/power transmission Ethernet port adapter device (or other devices operating according to the teachings of the present disclosure in a manner similar to that described below for the single cable optical data/power transmission Ethernet port adapter device) may include a variety of components and/or component configurations for providing the single cable optical data/power transmission Ethernet port adapter device functionality discussed below while remaining within the scope of the present disclosure as well.

Figure 13:
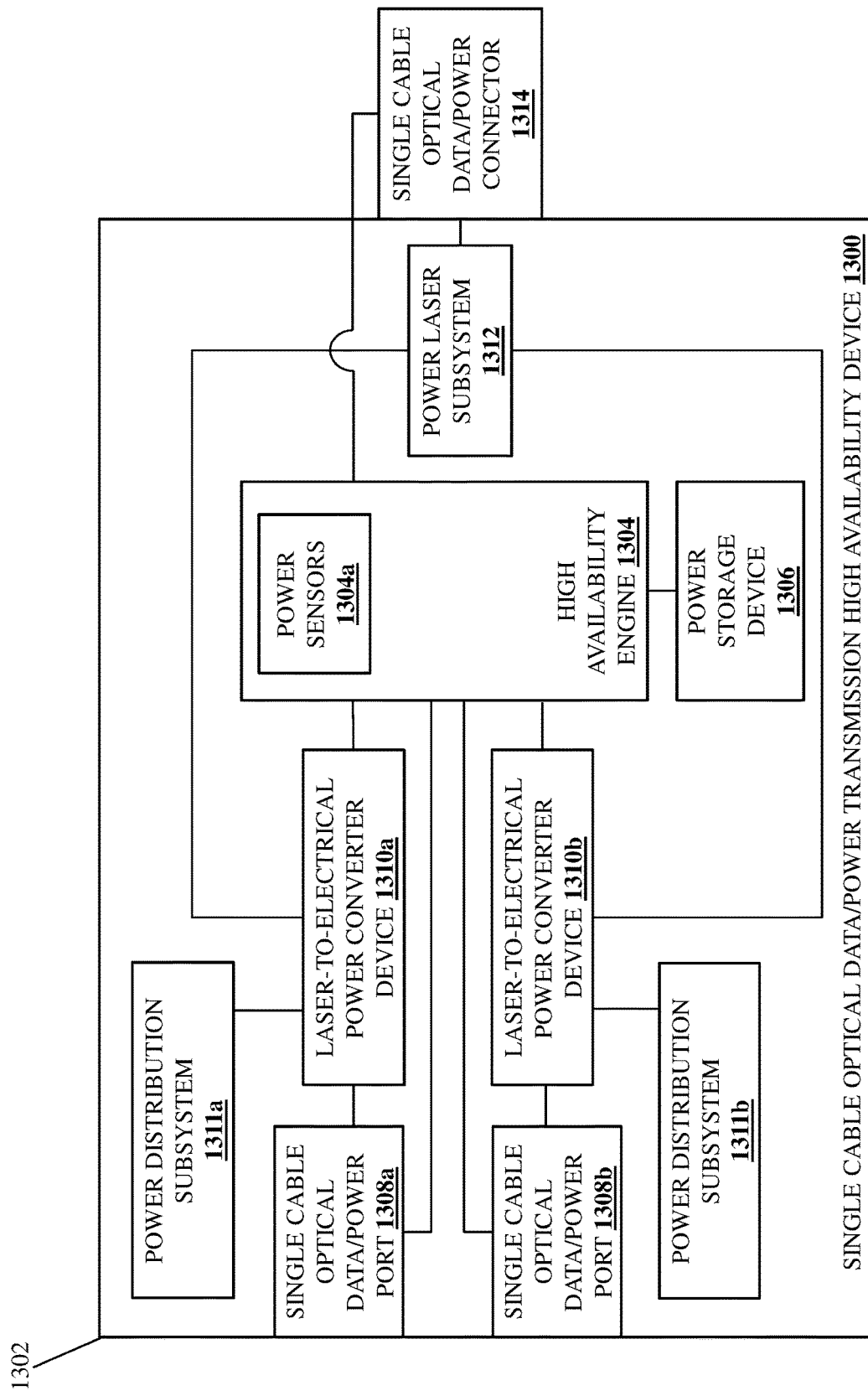
FIG. 13 is a schematic view illustrating an embodiment of a single cable optical data/power transmission high availability device provided according to the teachings of the present disclosure.

Referring now to FIG. 13, an embodiment of a single cable optical data/power transmission high availability device 1300 is illustrated that may be used to provide the single cable optical data/power transmission powering system of the present disclosure, and in particular to couple a plurality of the single cable optical data/power transmission powering devices of the present disclosure to the single cable optical data/power transmission powered device of the present disclosure. As discussed in U.S. patent application Ser. No. 18/457,436, filed Aug. 29, 2023, the disclosure of which is incorporated by reference herein in its entirety, the single cable optical data/power transmission high availability device 1300 may be coupled to each of a plurality of the single cable optical data/power transmission powering devices of the present disclosure via a respective one of the optical data/power transmission cables of the present disclosure, as well as to the single cable optical data/power transmission powered device of the present disclosure, in order to allow data and power to be received by the single cable optical data/power transmission powered device from either of the single cable optical data/power transmission powering devices in the event the other becomes unavailable.

In an embodiment, the single cable optical data/power transmission high availability device 1300 may be provided by the IHS 100 discussed above with reference to FIG. 1 and/or may include some or all of the components of the IHS 100. In the illustrated embodiment, the single cable optical data/power transmission high availability device 1300 includes a chassis 1302 that houses the components of the single cable optical data/power transmission high availability device 1300, only some of which are illustrated and described below. For example, the chassis 1302 may house a processing system (not illustrated, but which may include a processor similar to the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a high availability engine 1304 that is configured to perform the functionality of the high availability engines, high availability subsystems, and/or single cable optical data/power transmission high availability devices discussed below. In the specific example illustrated in FIG. 13, the high availability engine 1304 includes a plurality of power sensors 1304a that are configured to detect the presence of power from any connected single cable optical data/power transmission powering device.

In the illustrated embodiment, the chassis 1302 also houses a power storage device 1306 that is coupled to the high availability engine 1304 (e.g., the processing system/memory system combination that provides the high availability engine 1304), as well as any other components in the single cable optical data/power transmission high availability device 1300 that one of skill in the art in possession of the present disclosure would recognize as requiring power to perform the high availability functionality described below. As will be appreciated by one of skill in the art in possession of the present disclosure, the power storage device 1306 may be provided by capacitors, batteries, and/or any other power storage components that one of skill in the art in possession of the present disclosure will recognize as storing sufficient power to enable the high availability functionality described below.

The chassis 1302 also includes a plurality of single cable optical data/power ports that are illustrated as being provided by single cable optical data/power ports 1308a and 1308b, but that one of skill in the art in possession of the present disclosure will appreciate may be provided by different numbers of single cable optical data/power ports while remaining within the scope of the present disclosure as well. As discussed above, the single cable optical data/power ports 1308a and 1308b may be provided by any of the single cable optical data/power ports 300, 400, or 500 described above. Similarly to the single cable optical data/power ports discussed above, the single cable optical data/power ports 1308a and 1308b may each provide a "female" connection that may include one or more optical data conduits that have an optical data conduit cross-sectional area, and one or more optical power conduits that have an optical power conduit cross-section area that is greater than the optical data conduit cross-sectional area. As will be appreciated by one of skill in the art in possession of the present disclosure, the single cable optical data/power ports 1308a and 1308b are configured to connect to any of the single cable optical data/power connectors 604a and 604b on the optical data/power transmission cable 600 discussed above.

As such, in a specific example of the single cable optical data/power ports of the present disclosure, a 9 micron diameter single mode optical conduit may be provided for the optical data conduit in each of the single cable optical data/power ports 1308a and 1308b, and a 62.5 micron diameter optical conduit may be provided for a power data conduit in each of the single cable optical data/power ports 1308a and 1308b. However, while specific single cable optical data/power ports have been described, one of skill in the art in possession of the present disclosure will appreciate how different components and/or component configurations may be provided for the optical data conduit(s) (e.g., utilizing more and/or larger optical data conduit(s)) and/or optical power conduit(s) (e.g., more and/or larger optical power conduits such as 125 micron diameter optical power conduits, 200 micron diameter optical power conduits, etc.) while remaining within the scope of the present disclosure as well.

Furthermore, in some embodiments, the optical data conduit(s) in the single cable optical data/power ports 1308a and 1308b may include a first attenuation level that is lower than a second attenuation level of the optical power conduit(s) in the single cable optical data/power ports 1308a and 1308b. As discussed above, the attentional levels of the optical data conduit(s) and optical power conduit(s) in the single cable optical data/power ports 1308a and 1308b may be provided by polishing or otherwise preparing the ends of those optical data conduit(s) and optical power conduit(s) to reduce, limit, and/or otherwise control dispersion of laser light that enters those optical data conduit(s) and optical power conduit(s), and the inventors of the present disclosure has recognized that the relative attenuation level of optical conduits used to transmit power can be much higher than that of optical conduits used to transmit data, allowing the polishing and/or other preparation of the optical power conduit(s) to be reduced while still providing the benefits described above.

In the illustrated embodiment, the optical power conduit(s) in each of the single cable optical data/power ports 1308a and 1308b are coupled to a laser-to-electrical power converter device 1310a and 1310b, respectively, while the optical data conduit(s) in each of the single cable optical data/power ports 1308a and 1308b are coupled to the high availability engine 1304 (e.g., via a coupling between those optical power conduit(s) and the processing system). Similarly as discussed above, each laser-to-electrical power converter device 1310a and 1310b is configured to convert optical power (e.g., from a laser) that is received via the optical power conduit(s) in its single cable optical data/power port 1308a and 1308b to electrical power, and provide that electrical power to the power laser subsystem described below. For example, the laser-to-electrical power converter devices 1310a and 1310b may each be provided by a photovoltaic power converter that is configured to convert optical power provided by laser light into electrical power, although other techniques for converting optical power provided by laser light into electrical power are envisioned as falling within the scope of the present disclosure as well. To provide a specific example, each laser-to-electrical power converter device 1310a and 1310b may be configured to convert 15 watts of optical power/laser light to 9 watts of electrical power at current laser-to-electrical power conversion efficiencies, although other power amounts are envisioned as falling within the scope of the present disclosure as well.

As illustrated, each laser-to-electrical power converter device 1310a and 1310b may be coupled to a power distribution subsystem 1311a and 1311b, respectively. Similarly as described above, each power distribution system 1311a and 1311b may be configured to distribute electrical power received from its laser-to-electrical power converter device 1310a and 1310b to any components of the single cable optical data/power transmission high availability device 1300. As will be appreciated by one of skill in the art in possession of the present disclosure, the laser-to-electrical power converter device 1310a and 1310b and the power distribution subsystems 1311a and 1311b may provide a power receiving system in the single cable optical data/power transmission high availability device 1300. However, while a specific power receiving system has been illustrated and described, one of skill in the art in possession of the present disclosure will appreciate how the optical power received via the single cable optical data/power ports 1308a and 1308b may be utilized to power the single cable optical data/power transmission high availability device 1300 using other components that will fall within the scope of the present disclosure as well.

As illustrated, each laser-to-electrical power converter device 1310a and 1310b may also be coupled to the high availability engine 1304 (e.g., via a coupling between the laser-to-electrical power converter devices 1310a and 1310b and the processing system discussed above) in order to, for example, allow the high availability engine 1304 to monitor for power received from the single cable optical data/power transmission powering device via the single cable optical data/power ports 1308*a* and 1308*b* and laser-to-electrical power converter devices 1310*a* and 1310*b*, respectively.

Furthermore, each laser-to-electrical power converter device 1310*a* and 1310*b* may also be coupled to a power laser subsystem 1312 that may include one or more laser devices. To provide a specific example, the power laser subsystem 1312 may include one or more 858 nanometer green laser devices, although one of skill in the art in possession of the present disclosure will appreciate how other types/technology laser devices will fall within the scope of the present disclosure as well. As will be appreciated by one of skill in the art in possession of the present disclosure, the laser-to-electrical power converter device 1310*a* and 1310*b* and the power laser subsystem 1312 may provide a power transmission system in the single cable optical data/power transmission high availability device 1300. However, while a specific power transmission system has been illustrated and described, one of skill in the art in possession of the present disclosure will appreciate how the optical power received via the single cable optical data/power ports 1308*a* and 1308*b* may be transmitted using other components that will fall within the scope of the present disclosure as well.

As illustrated, the chassis 1302 may also include a single cable optical data/power connector 1314 that is coupled to the high availability engine 1304 (e.g., via a coupling between the single cable optical data/power connector 1314 and the processing system) and the power laser subsystem 1312, and that may be provided by any of the single cable optical data/power connectors 700, 800, or 900 discussed above. Similarly to the single cable optical data/power connectors discussed above, the single cable optical data/power connector 1314 may provide a "male" connection that may include one or more optical data conduits (e.g., that are coupled to the high availability engine 1304) that have an optical data conduit cross-sectional area, and one or more optical power conduits (e.g., that are coupled to the power laser subsystem 1312) that have an optical power conduit cross-section area that is greater than the optical data conduit cross-sectional area. As will be appreciated by one of skill in the art in possession of the present disclosure, the single cable optical data/power connector 1314 is configured to connect to any of the single cable optical data/power ports 212*a*-212*c* on the single cable optical data/power transmission powering device 200, or to the single cable optical data/power port 1010 on the single cable optical data/power transmission powered device 1000.

As such, in a specific example of the single cable optical data/power connectors of the present disclosure, a 9 micron diameter single mode optical conduit may be provided for the optical data conduit in the single cable optical data/power connector 1314, and a 62.5 micron diameter optical conduit may be provided for a power data conduit in the single cable optical data/power connector 1314. However, while a specific single cable optical data/power connector has been described, one of skill in the art in possession of the present disclosure will appreciate how different components and/or component configurations may be provided for the optical data conduit(s) (e.g., utilizing more and/or larger optical data conduit(s)) and/or optical power conduit(s) (e.g., more and/or larger optical power conduits such as 125 micron diameter optical power conduits, 200 micron diameter optical power conduits, etc.) while remaining within the scope of the present disclosure as well.

Furthermore, in some embodiments, the optical data conduit(s) in the single cable optical data/power connector 1314 may include a first attenuation level that is lower than a second attenuation level of the optical power conduit(s) in the single cable optical data/power connector 1314. As discussed above, the attentional levels of the optical data conduit(s) and optical power conduit(s) in the single cable optical data/power connector 1314 may be provided by polishing or otherwise preparing the ends of those optical data conduit(s) and optical power conduit(s) to reduce, limit, and/or otherwise control dispersion of laser light that enters those optical data conduit(s) and optical power conduit(s), and the inventors of the present disclosure has recognized that the relative attenuation level of optical conduits used to transmit power can be much higher than that of optical conduits used to transmit data, allowing the polishing and/or other preparation of the optical power conduit(s) to be reduced while still providing the benefits described above.

As will be appreciated by one of skill in the art in possession of the present disclosure, the high availability engine may provide a data communication system in the single cable optical data/power transmission high availability device 1300. However, while a specific data communication system has been illustrated and described, one of skill in the art in possession of the present disclosure will appreciate how the optical data received via the single cable optical data/power ports 1308*a* and 1308*b* may be communicated via the single cable optical data/power connector 1314 using other components that will fall within the scope of the present disclosure as well. Furthermore, while a specific single cable optical data/power transmission high availability device 1300 has been illustrated and described, one of skill in the art in possession of the present disclosure will recognize that single cable optical data/power transmission high availability device (or other devices operating according to the teachings of the present disclosure in a manner similar to that described below for the single cable optical data/power transmission high availability device) may include a variety of components and/or component configurations for providing the single cable optical data/power transmission high availability device functionality discussed below while remaining within the scope of the present disclosure as well.

Figure 14:
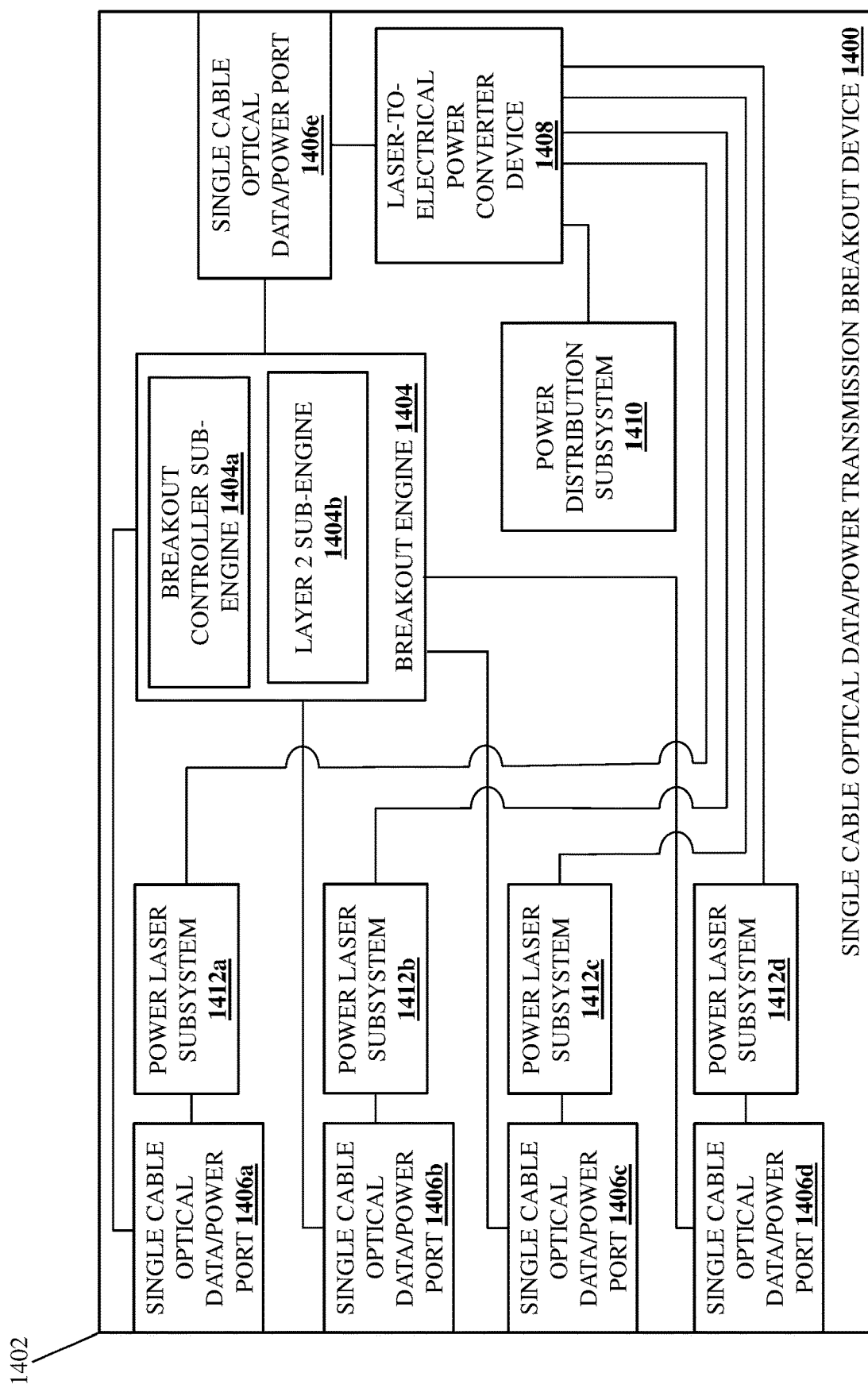
FIG. 14 is a schematic view illustrating an embodiment of a single cable optical data/power transmission breakout device provided according to the teachings of the present disclosure.

Referring now to FIG. 14, an embodiment of a single cable optical data/power transmission breakout device 1400 is illustrated that may be used to provide the single cable optical data/power transmission powering system of the present disclosure, and in particular to couple a plurality of the single cable optical data/power transmission powered devices of the present disclosure to one single cable optical data/power port on the single cable optical data/power transmission powering device of the present disclosure. As discussed in U.S. patent application Ser. No. 18/457,395, filed Aug. 29, 2023, the disclosure of which is incorporated by reference herein in its entirety, the single cable optical data/power transmission breakout device 1400 may be coupled to the single cable optical data/power transmission powering device of the present disclosure via the optical data/power transmission cable of the present disclosure, as well as to a plurality of the single cable optical data/power transmission powered devices of the present disclosure via respective ones of the optical data/power transmission cables of the present disclosure, in order to allow data and power to be received by each of the single cable optical data/power transmission powered devices from the single cable optical data/power transmission powering device via one of its single cable optical data/power ports.

In an embodiment, the single cable optical data/power transmission breakout device 1400 may be provided by the IHS 100 discussed above with reference to FIG. 1 and/or may include some or all of the components of the IHS 100. In the illustrated embodiment, the single cable optical/ power transmission breakout device 1400 includes a chassis 1402 that houses the components of the single cable optical data/power transmission breakout device 1400, only some of which are illustrated and described below. For example, the chassis 1402 may house a processing system (not illustrated, but which may include a processor similar to the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a breakout engine 1404 that is configured to perform the functionality of the breakout engines, breakout subsystems, and/or single cable optical data/power transmission breakout devices discussed below. In the specific example illustrated in FIG. 14, the breakout engine 1404 includes a breakout controller sub-engine 1404a that may be configured to perform power negotiation operations as well as any other breakout controller functionality that would be apparent to one of skill in the art in possession of the present disclosure, and a Layer 2 (L2) sub-engine 1404b that may be configured to perform data routing operations as well as any other L2 functionality that would be apparent to one of skill in the art in possession of the present disclosure.

In the illustrated embodiment, the chassis 1402 also includes a plurality of single cable optical data/power ports that are illustrated as being provided by single cable optical data/power ports 1406a, 1406b, 1406c, 1406d, and 1406e, but that one of skill in the art in possession of the present disclosure will appreciate may be provided by different numbers of single cable optical data/power ports while remaining within the scope of the present disclosure as well. In an embodiment, the single cable optical data/power ports 1406a-1406e may be provided by any of the single cable optical data/power ports 300, 400, or 500 described above. Similarly to the single cable optical data/power ports discussed above, the single cable optical data/power ports 1406a-1406e may provide a "female" connection that may include one or more optical data conduits that have an optical data conduit cross-sectional area, and one or more optical power conduits that have an optical power conduit cross-section area that is greater than the optical data conduit cross-sectional area. As will be appreciated by one of skill in the art in possession of the present disclosure, the single cable optical data/power ports 1406a-1406e are configured to connect to any of the single cable optical data/power connectors 604a and 604b on the optical data/power transmission cable 600 discussed above.

As such, in a specific example of the single cable optical data/power ports of the present disclosure, a 9 micron diameter single mode optical conduit may be provided for the optical data conduit in each of the single cable optical data/power ports 1406a-1406e, and a 62.5 micron diameter optical conduit may be provided for a power data conduit in each of the single cable optical data/power ports 1406a-1406e. However, while specific single cable optical data/ power ports have been described, one of skill in the art in possession of the present disclosure will appreciate how different components and/or component configurations may be provided for the optical data conduit(s) (e.g., utilizing more and/or larger optical data conduit(s)) and/or optical power conduit(s) (e.g., more and/or larger optical power conduits such as 125 micron diameter optical power conduits, 200 micron diameter optical power conduits, etc.) while remaining within the scope of the present disclosure as well.

Furthermore, in some embodiments, the optical data conduit(s) in the single cable optical data/power ports 1406a-1406e may include a first attenuation level that is lower than a second attenuation level of the optical power conduit(s) in the single cable optical data/power ports 1406a-1406c. As discussed above, the attentional levels of the optical data conduit(s) and optical power conduit(s) in the single cable optical data/power ports 1406a-1406e may be provided by polishing or otherwise preparing the ends of those optical data conduit(s) and optical power conduit(s) to reduce, limit, and/or otherwise control dispersion of laser light that enters those optical data conduit(s) and optical power conduit(s), and the inventors of the present disclosure has recognized that the relative attenuation level of optical conduits used to transmit power can be much higher than that of optical conduits used to transmit data, allowing the polishing and/or other preparation of the optical power conduit(s) to be reduced while still providing the benefits described above.

As illustrated, the optical data conduit(s) in the single cable optical data/power port 1406e is coupled to the breakout engine 1404 (e.g., via a coupling between those optical power conduit(s) and the processing system), while the optical power conduits in the single cable optical data/power port 1406e is coupled to a laser-to-electrical power converter device 1408 that is configured to convert optical power (e.g., from a laser) that is received via the optical power conduit(s) in the single cable optical data/power port 1406e to electrical power, and provide that electrical power to the power laser subsystems and power distribution subsystem described below. For example, the laser-to-electrical power converter device 1408 may be provided by a photovoltaic power converter that is configured to convert optical power provided by laser light into electrical power, although other techniques for converting optical power provided by laser light into electrical power are envisioned as falling within the scope of the present disclosure as well. To provide a specific example, the laser-to-electrical power converter device 1408 may be configured to convert 15 watts of optical power/laser light to 9 watts of electrical power at current laser-to-electrical power conversion efficiencies, although other power amounts are envisioned as falling within the scope of the present disclosure as well.

As described above, a power distribution system 1410 may be coupled to the laser-to-electrical power converter device 1408 and may be configured to distribute electrical power received from the laser-to-electrical power converter device 1408 to any components of the single cable optical data/power transmission breakout device 1400. As will be appreciated by one of skill in the art in possession of the present disclosure, the laser-to-electrical power converter device 1408 and the power distribution subsystem 1410 may provide a power receiving system in the single cable optical data/power transmission breakout device 1400. However, while a specific power receiving system has been illustrated and described, one of skill in the art in possession of the present disclosure will appreciate how the optical power received via the single cable optical data/power port 1406e may be utilized to power the single cable optical data/power transmission breakout device 1400 using other components that will fall within the scope of the present disclosure as well.

As also described above, power laser subsystems 1412a, 1412b, 1412c, and 1412d may be coupled to the laser-to-electrical power converter device 1408, and each power laser subsystem 1408a-1408d includes one or more laser devices that may be powered using the electrical power received from the laser-to-electrical power converter device 1408. In a specific example, the power laser subsystems 1408a-1408d may each include one or more 858 nanometer green laser devices, although one of skill in the art in possession of the present disclosure will appreciate how other types/technology laser devices will fall within the scope of the present disclosure as well. Furthermore, the optical data conduit(s) in each of the single cable optical data/power ports 1406a-1406d are coupled to the breakout engine 1404 (e.g., via a coupling between those optical power conduit(s) and the processing system), while the optical power conduits in each of the single cable optical data/power ports 1406a-1406d are coupled to a respective one of the power laser subsystems 1412a-1412d.

As will be appreciated by one of skill in the art in possession of the present disclosure, the laser-to-electrical power converter device 1408 and the power laser subsystems 1412a-1412d may provide a power transmission system in the single cable optical data/power transmission breakout device 1400. However, while a specific power transmission system has been illustrated and described, one of skill in the art in possession of the present disclosure will appreciate how the optical power received via the single cable optical data/power port 1406e may be transmitted using other components that will fall within the scope of the present disclosure as well. As will also be appreciated by one of skill in the art in possession of the present disclosure, the breakout engine 1404 (e.g., the L2 sub-engine 1404b) may provide a data communication system in the single cable optical data/power transmission breakout device 1400. However, while a specific data communication system has been illustrated and described, one of skill in the art in possession of the present disclosure will appreciate how the optical data received via the single cable optical data/power port 1406e may be communicated via the single cable optical data/power porta 1406a-1406d using other components that will fall within the scope of the present disclosure as well.

However, while a specific single cable optical data/power transmission breakout device 1400 has been illustrated and described, one of skill in the art in possession of the present disclosure will recognize that single cable optical data/power transmission breakout device (or other devices operating according to the teachings of the present disclosure in a manner similar to that described below for the single cable optical data/power transmission breakout device) may include a variety of components and/or component configurations for providing the single cable optical data/power transmission breakout device functionality discussed below while remaining within the scope of the present disclosure as well.

Figure 15:
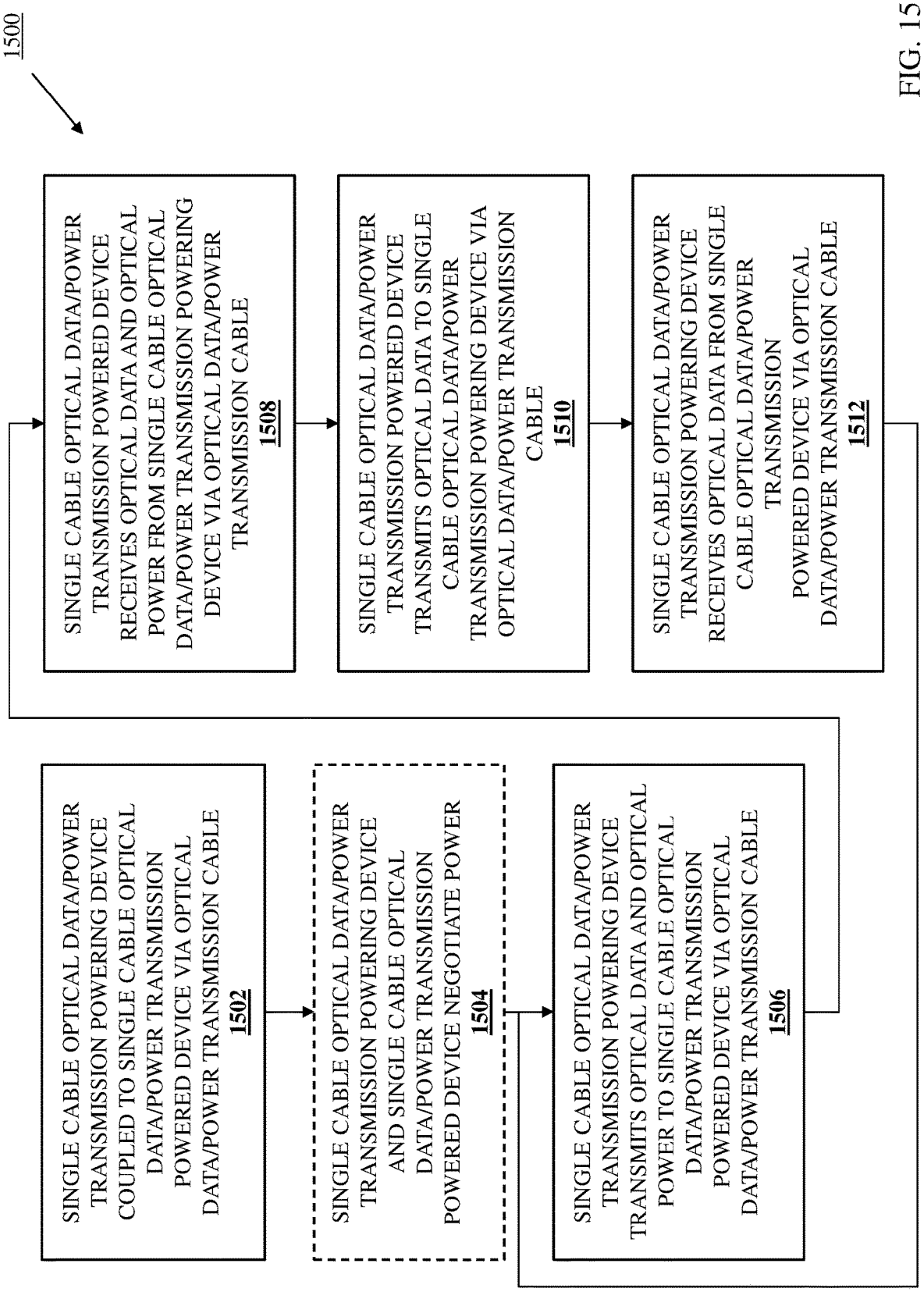
FIG. 15 is a flow chart illustrating an embodiment of a method for transmitting optical data and optical power from a single cable optical data/power transmission powering device to a single cable optical data/power transmission powered device.

Referring now to FIG. 15, an embodiment of a method 1500 for transmitting optical data and optical power from a single cable optical data/power transmission powering device to a single cable optical data/power transmission powered device is illustrated. As discussed below, the systems and methods of the present disclosure provide for the transmission of optical power from a single cable optical data/power transmission powering device to a single cable optical data/power transmission powered device via a single optical data/power transmission cable, as well as the exchange of optical data between the single cable optical data/power transmission powering device and the single cable optical data/power transmission powered device via that single optical data/power transmission cable.

For example, a single cable optical data/power transmission powering system provided according to the teachings of the present disclosure may include a single cable optical data/power transmission powering device coupled to a single cable optical data/power transmission powered device via an optical data/power transmission cable. The single cable optical data/power transmission powering device is coupled to the optical data/power transmission cable via a single cable optical data/power port includes optical data conduit(s) and optical power conduit(s) with a greater cross-section area than the optical data conduit(s). A single cable optical data/power transmission subsystem in the single cable optical data/power transmission powering system controls a data communication system to transmit first optical data via the optical data conduit(s) to the single cable optical data/power transmission powered device, and controls a power transmission system to transmit first optical power via the optical power conduit(s) to the single cable optical data/power transmission powered device. As such, data and power may be transmitted via a single cable over greater distances than are available via conventional PoE techniques.

In another example, a single cable optical data/power transmission powered device system provided according to the teachings of the present disclosure may include a single cable optical data/power transmission powering device coupled to a single cable optical data/power transmission powered device via an optical data/power transmission cable. The single cable optical data/power transmission powered device is coupled to the optical data/power transmission cable via a single cable optical data/power port that includes optical data conduit(s) and optical power conduit(s) with a greater cross-section area than the optical data conduit(s). A power receiving system in the single cable optical data/power transmission powered device receives first optical power, which was transmitted using the optical data/power transmission cable, via the optical power conduit(s). A powered device subsystem and data communication system in the single cable optical data/power transmission powered device receive first optical data, which was transmitted using the optical data/power transmission cable, via the optical data conduit(s). As such, data and power may be received via a single cable over greater distances than are available via conventional PoE techniques.

Figure 16:
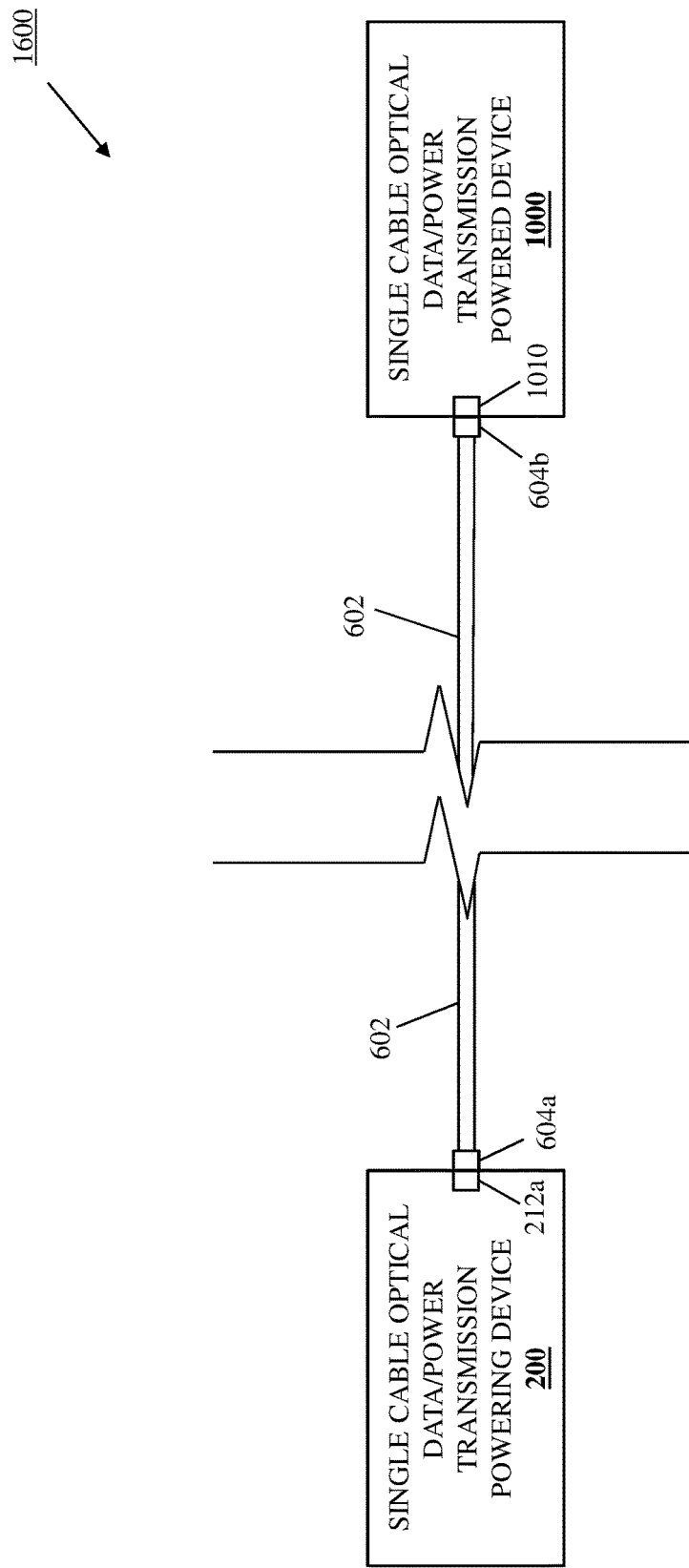
FIG. 16 is a schematic view illustrating an embodiment of the single cable optical data/power transmission powering device of FIG. 2 coupled to the single cable optical data/power transmission powered device of FIG. 10 using the optical data/power transmission cable of FIG. 6 during the method of FIG. 15 to provide a single cable optical data/power transmission powering system.

The method 1500 begins at block 1502 where a single cable optical data/power transmission powering device is coupled to a single cable optical data/power transmission powered device via an optical data/power transmission cable. With reference to FIG. 16, in an embodiment of block 1502, the single cable optical data/power transmission powering device 200 may be coupled to the single cable optical data/power transmission powered device 1000 via the optical data/power transmission cable 600 in order to provide a single cable optical data/power transmission powering system 1600. In the illustrated embodiment, the single cable optical data/power connector 604a on the optical data/power transmission cable 600 is connected to the single cable optical data/power port 212a on the single cable optical data/power transmission powering device 200, and the single cable optical data/power connector 604b on the optical data/power transmission cable 600 is connected to the single cable optical data/power port 1010 on the single cable optical data/power transmission powered device 1000, but one of skill in the art in possession of the present disclosure will appreciate how the single cable optical data/power transmission powered device 1000 may be coupled to the single cable optical data/power transmission powering device 200 via its other single cable optical data/power ports 212*b* and up to 212*c* while remaining with the scope of the present disclosure as well.

Figure 17A:
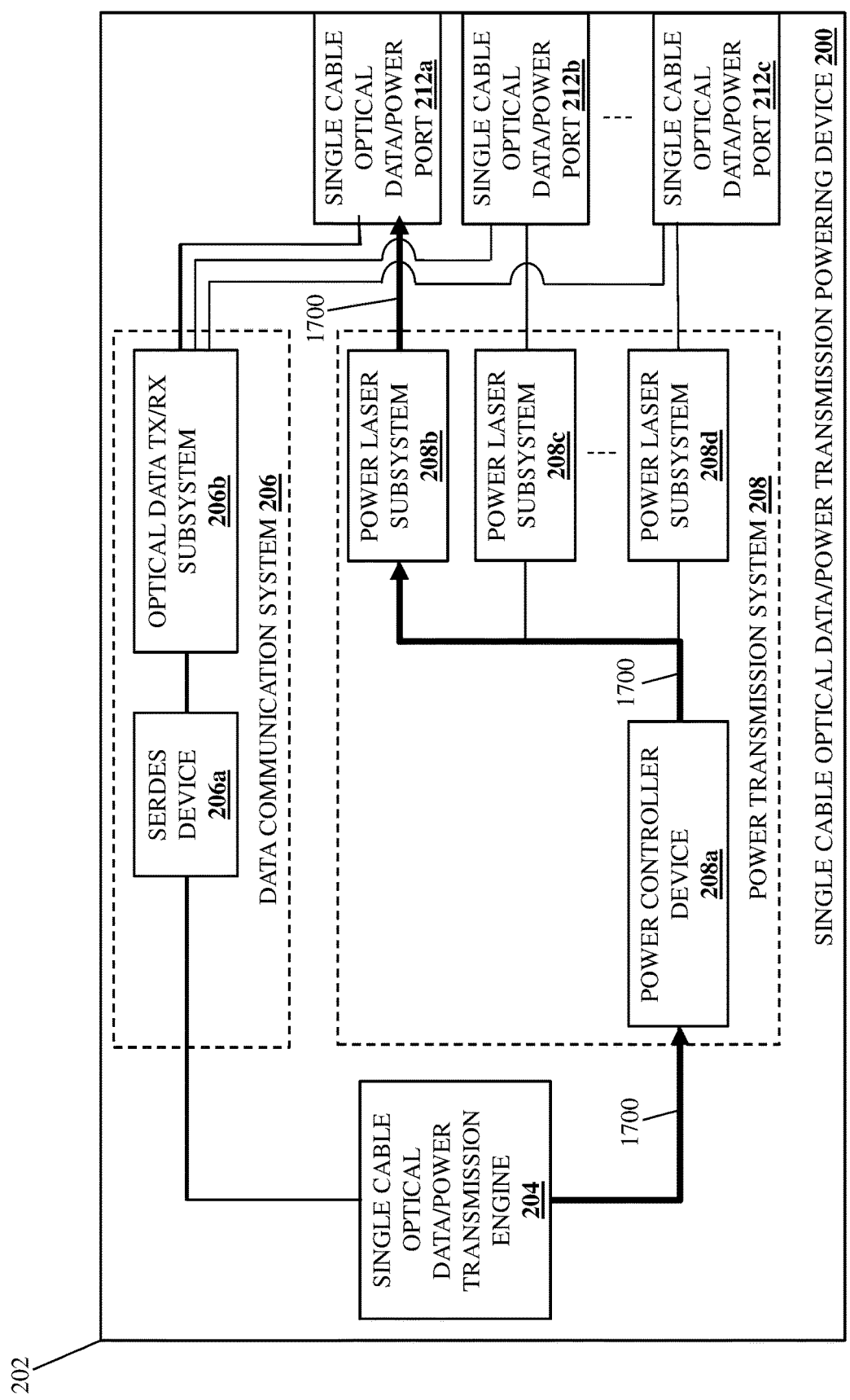
FIG. 17A is a schematic view illustrating an embodiment of the single cable optical data/power transmission powering device of FIG. 16 operating during the method of FIG. 15.

The method 1500 then proceeds to optional block 1504 where the single cable optical data/power transmission powering device and the single cable optical data/power transmission powered device may negotiate power. In an embodiment, at optional block 1504, the single cable optical data/power transmission powering device 200 and the single cable optical data/power transmission powered device 1000 may negotiate a power amount that the single cable optical data/power transmission powering device 200 will provide to the single cable optical data/power transmission powered device 1000 during the method 1500. With reference to FIG. 17A, following block 1502 and in response to being powered on or otherwise initialized, the single cable optical data/power transmission engine 204 in the in the single cable optical data/power transmission powering device 200 may perform preliminary power provisioning operations 1700 that include controlling the power transmission system 208 to cause the power controller device 208*a* to drive the power laser subsystem 208*b* such that the power laser subsystem 208*b* emits laser light to provide optical power that is transmitted via the optical power conduit(s) in the single cable optical data power port 212*a* and through the optical power fiber(s) in the optical data/power transmission cable 600.

Figure 17B:
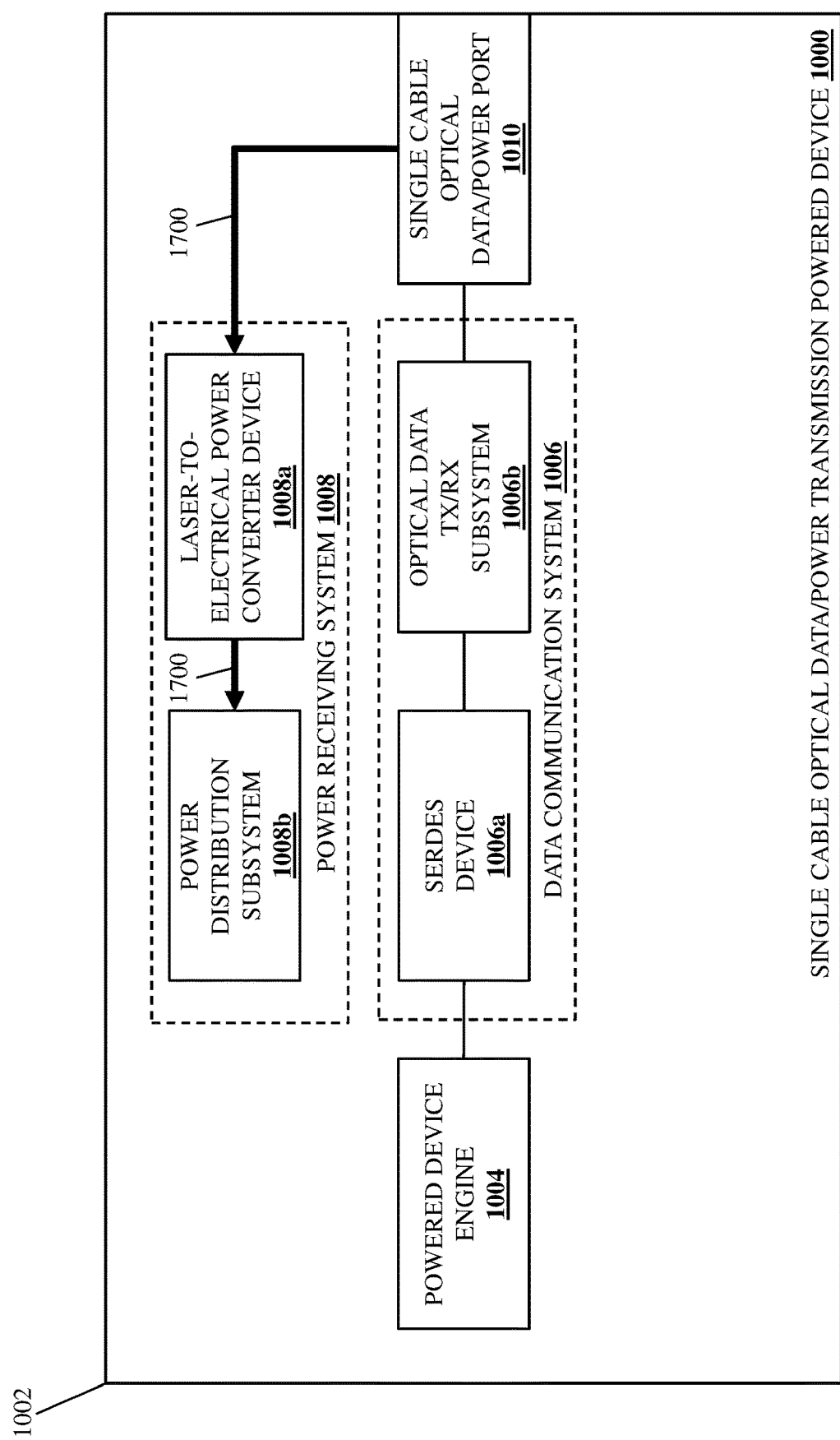
FIG. 17B is a schematic view illustrating an embodiment of the single cable optical data/power transmission powered device of FIG. 16 operating during the method of FIG. 15.

With reference to FIG. 17B, the preliminary power provisioning operations 1700 also include the optical power conduit(s) in the single cable optical data power port 1010 on the single cable optical data/power transmission powered device 1000 receiving the optical power that was transmitted through the optical power fiber(s) in the optical data/power transmission cable 600, and providing the optical power to the power receiving system 1008 such that the laser-to-electrical power converter device 1008*a* converts that optical power to electrical power and provides the electrical power to the power distribution subsystem 1008*b*, and the power distribution subsystem 1008*b* distributes that electrical power to one or more components in the single cable optical data/power transmission powered device 1000 that one of skill in the art in possession of the present disclosure will recognize require power to provide the functionality described below.

In a specific example, the preliminary power provisioning operations 1700 may include controlling the power transmission system 208 to cause the power controller device 208*a* to drive the power laser subsystem 208*b* at a maximum level such that a maximum amount of electrical power is provided to the single cable optical data/power transmission powered device 1000, although the provisioning of other "default" amounts of preliminary power will fall within the scope of the present disclosure as well. As will be appreciated by one of skill in the art in possession of the present disclosure, the preliminary power provisioning operations 1700 may continue up to block 1506 of the method 1500 to ensure that the single cable optical data/power transmission powered device 1000 has sufficient power to perform any of the operations discussed below.

Figure 17C:
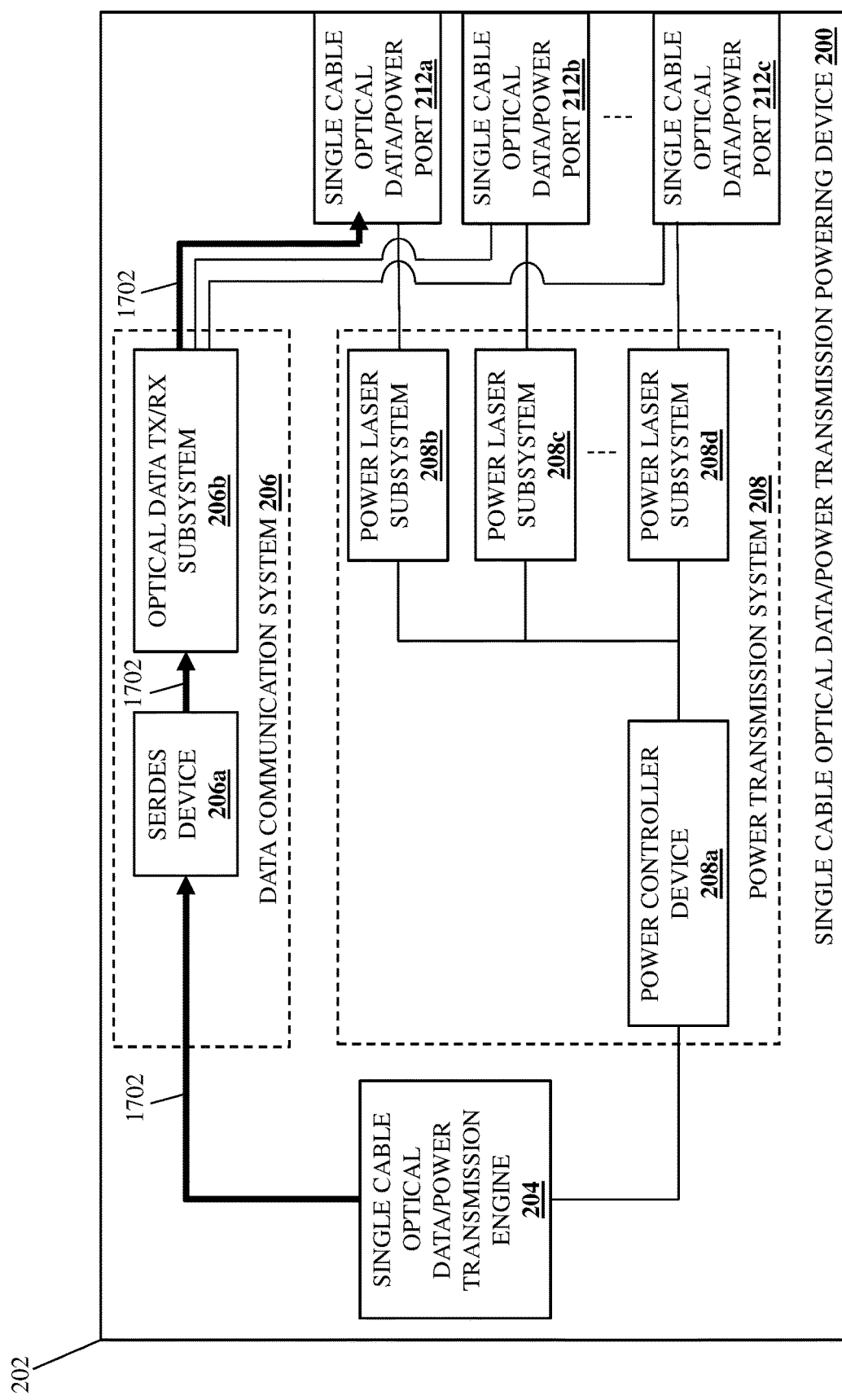
FIG. 17C is a schematic view illustrating an embodiment of the single cable optical data/power transmission powering device of FIG. 16 operating during the method of FIG. 15.

With reference to FIG. 17C, following the preliminary power provisioning operations 1700, the single cable optical data/power transmission engine 204 in the single cable optical data/power transmission powering device 200 may perform powering device power negotiation operations 1702 that include controlling the data communication system 206 to transmit a powering device power negotiation communication (e.g., using Type-Length-Value (TLV) elements in a Link Layer Discovery Protocol (LLDP) communication) that may include a request for single cable optical data/power transmission powered device power requirements, a class and type of the single cable optical data/power transmission powered device, any of a variety of powering-device-side power negotiation information that would be apparent to one of skill in the art in possession of the present disclosure.

For example, the powering device power negotiation operations 1702 may include the single cable optical data/power transmission engine 204 generating a powering device power negotiation communication as a parallel electrical data signal stream and providing it to the SERDES device 206*a*, the SERDES device 206*a* converting the parallel electrical data signal stream to a serial electrical data signal stream and providing that serial electrical data signal stream to the optical data TX/RX subsystem 206*b*, and the optical data TX/RX subsystem 206*b* modulating one or more laser devices using the serial electrical data signal stream to produce optical data that is transmitted via the optical data conduit(s) in the single cable optical data power port 212*a* and through the optical data fiber(s) in the optical data/power transmission cable 600.

Figure 17D:
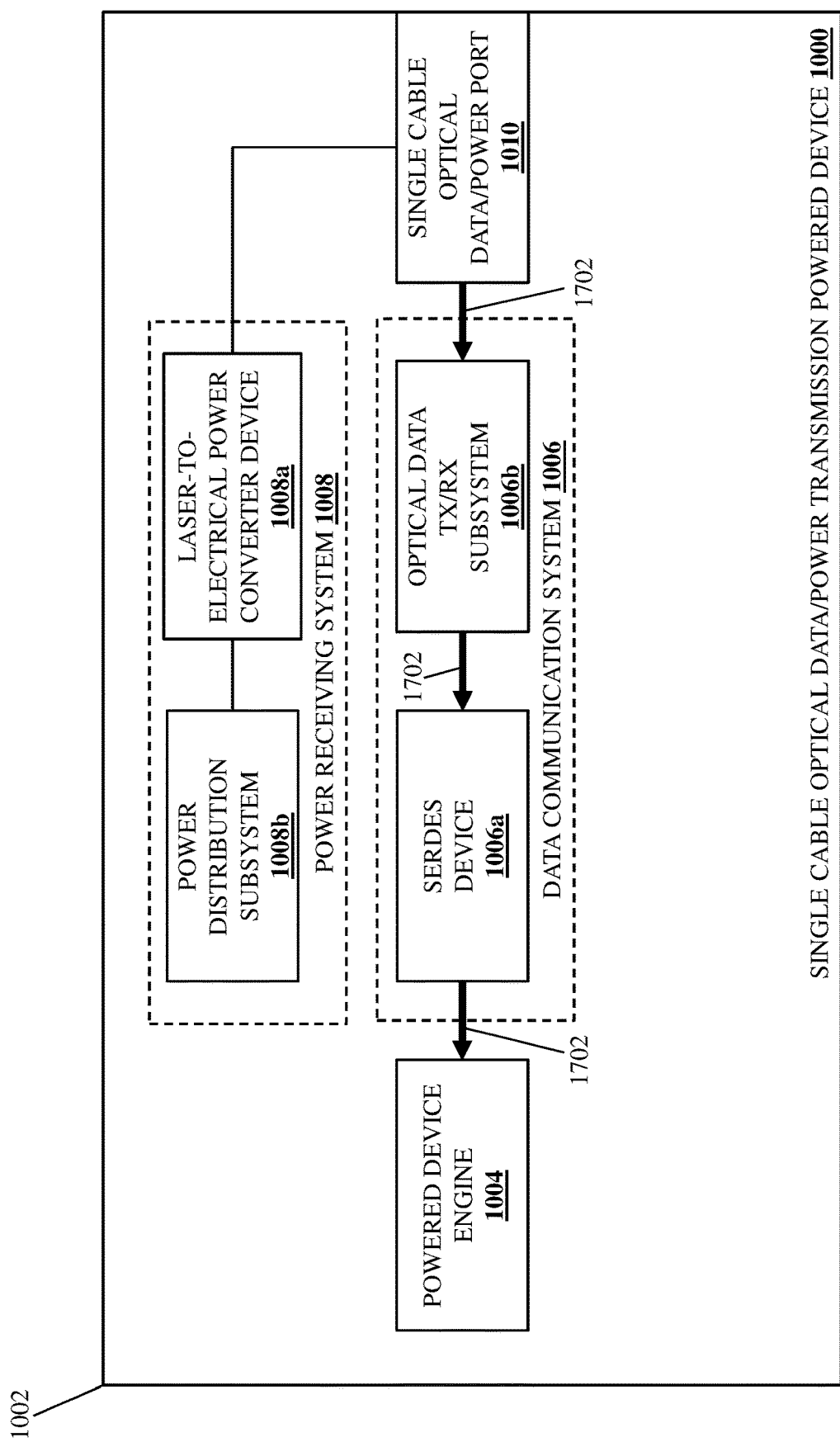
FIG. 17D is a schematic view illustrating an embodiment of the single cable optical data/power transmission powered device of FIG. 16 operating during the method of FIG. 15.

With reference to FIG. 17D, the powering device power negotiation operations 1702 also include the optical data conduit(s) in the single cable optical data power port 1010 on the single cable optical data/power transmission powered device 1000 receiving the optical data that was transmitted through the optical power fiber(s) in the optical data/power transmission cable 600, and providing the optical data to the data communication system 1006 such that the optical data TX/RX subsystem 1006*b* converts the received optical data to a serial electrical data signal stream and provides the serial electrical data stream to the SERDES device 1006*a*, and the SERDES device 1006*a* converts the serial electrical data signal stream to a parallel electrical data signal stream that provides the powering device power negotiation communication, and provides the powering device power negotiation communication to the powered device engine 1004.

As will be appreciated by one of skill in the art in possession of the present disclosure, the powering device power negotiation communication may be processed by the powered device engine 1004 in the single cable optical data/power transmission powered device 1000 in order to generate a powered device power negotiation communication (e.g., using TLV elements in an LLDP communication) that may include a response with single cable optical data/power transmission powered device power requirements, a class and type of the single cable optical data/power transmission powered device, any of a variety of powered-device-side power negotiation information that would be apparent to one of skill in the art in possession of the present disclosure.

Figure 17E:
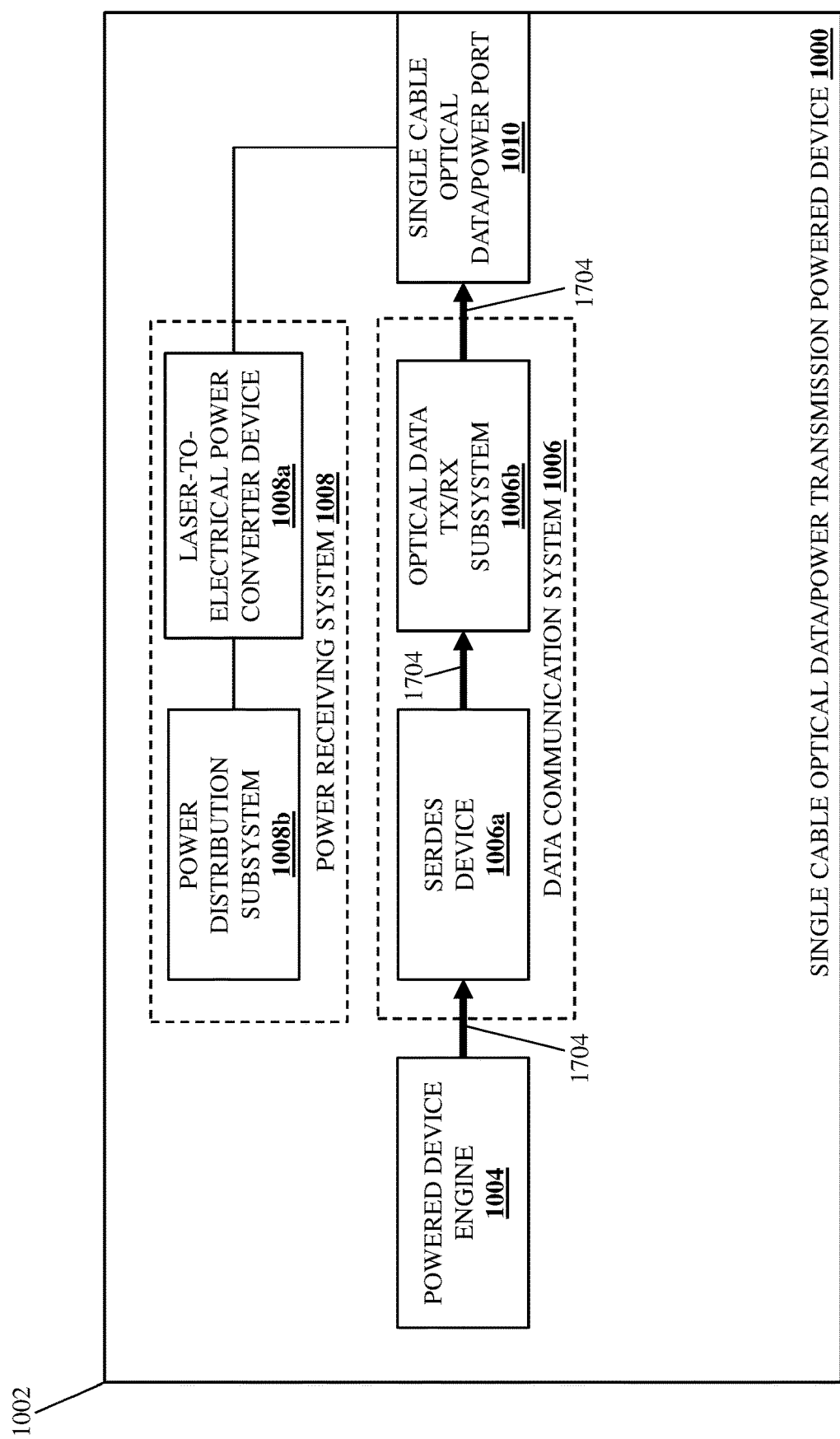
FIG. 17E is a schematic view illustrating an embodiment of the single cable optical data/power transmission powered device of FIG. 16 operating during the method of FIG. 15.

With reference to FIG. 17E, following the generation of the powered device power negotiation communication, the powered device engine 1004 in the in the single cable optical data/power transmission powered device 1000 may perform powered device power negotiation operations 1704 that include controlling the data communication system 1006 to transmit the powered device power negotiation communication as a parallel electrical data signal stream and providing it to the SERDES device 1006*a*, the SERDES device 1006*a* converting the parallel electrical data signal stream to a serial electrical data signal stream and providing that serial electrical data signal stream to the optical data TX/RX subsystem 1006b, and the optical data TX/RX subsystem 1006b modulating one or more laser devices using the serial electrical data signal stream to produce optical data that is transmitted via the optical data conduit(s) in the single cable optical data power port 1010 and through the optical data fiber(s) in the optical data/power transmission cable 600.

Figure 17F:
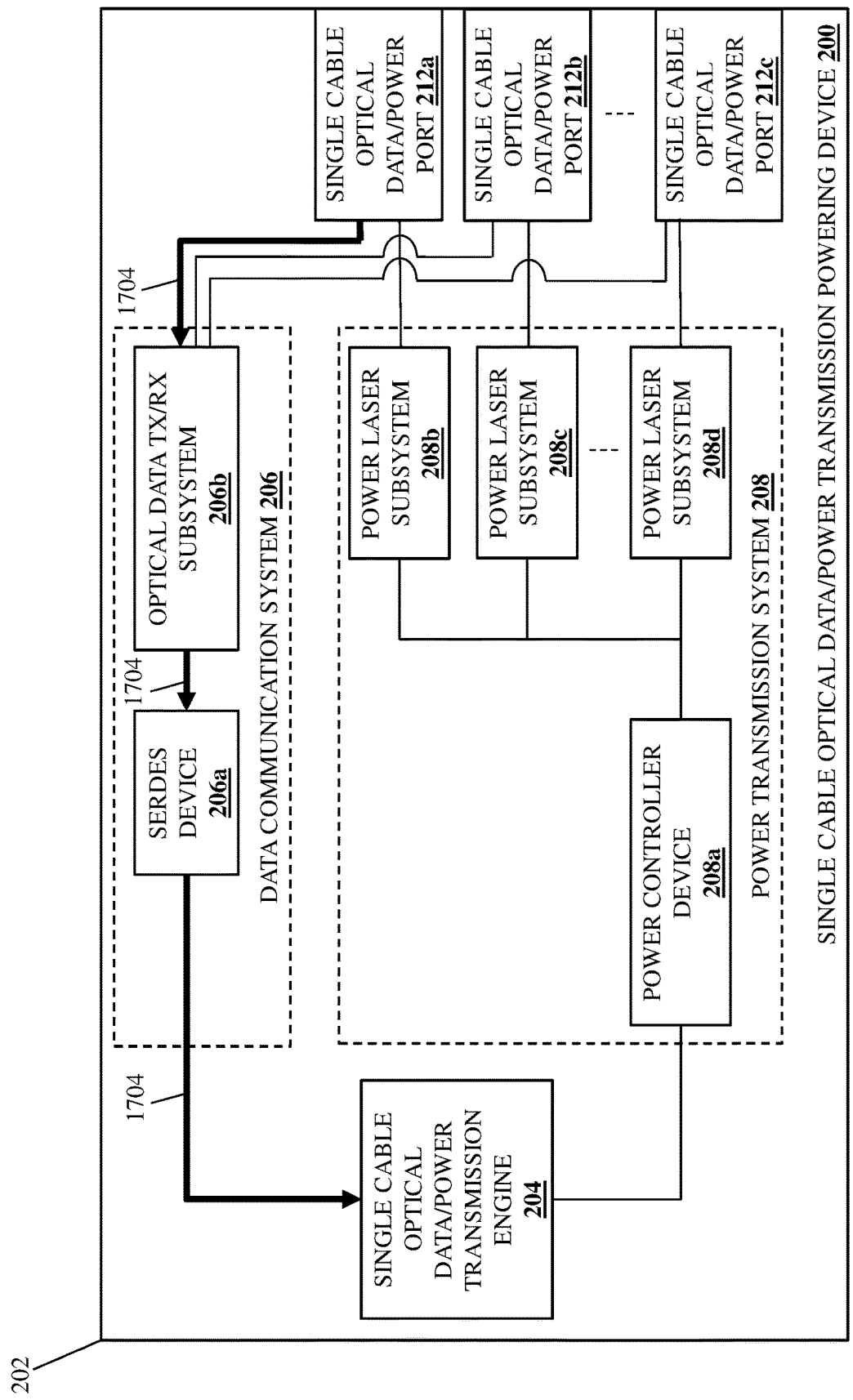
FIG. 17F is a schematic view illustrating an embodiment of the single cable optical data/power transmission powering device of FIG. 16 operating during the method of FIG. 15.

With reference to FIG. 17F, the powered device power negotiation operations 1704 also include the optical data conduit(s) in the single cable optical data power port 212a on the single cable optical data/power transmission powering device 200 receiving the optical data that was transmitted through the optical power fiber(s) in the optical data/power transmission cable 600, and providing the optical data to the data communication system 206 such that the optical data TX/RX subsystem 206b converts the received optical data to a serial electrical data signal stream and provides the serial electrical data stream to the SERDES device 206a, and the SERDES device 206a converts the serial electrical data signal stream to a parallel electrical data signal stream that provides the powered device power negotiation communication, and provides the powered device power negotiation communication to the single cable optical data/power transmission engine 204.

As will be appreciated by one of skill in the art in possession of the present disclosure, the powered device power negotiation communication may be processed by the single cable optical data/power transmission engine 204 in the single cable optical data/power transmission powering device 200 in order to determine an amount of power to provide to the single cable optical data/power transmission powered device 1000 (e.g., by reducing the maximum power amount available via the power laser subsystem 208b being transmitted as part of the preliminary power provisioning operations 1700 to a power amount required by the single cable optical data/power transmission powered device 1000). However, in the event the processing of the powered device power negotiation communication does not result in the single cable optical data/power transmission powering device 200 determining an amount of power to provide to the single cable optical data/power transmission powered device 1000, the powering device/powered device power negotiation operations discussed above may be repeated until the single cable optical data/power transmission powering device 200 determines an amount of power to provide to the single cable optical data/power transmission powered device 1000.

Figure 18A:
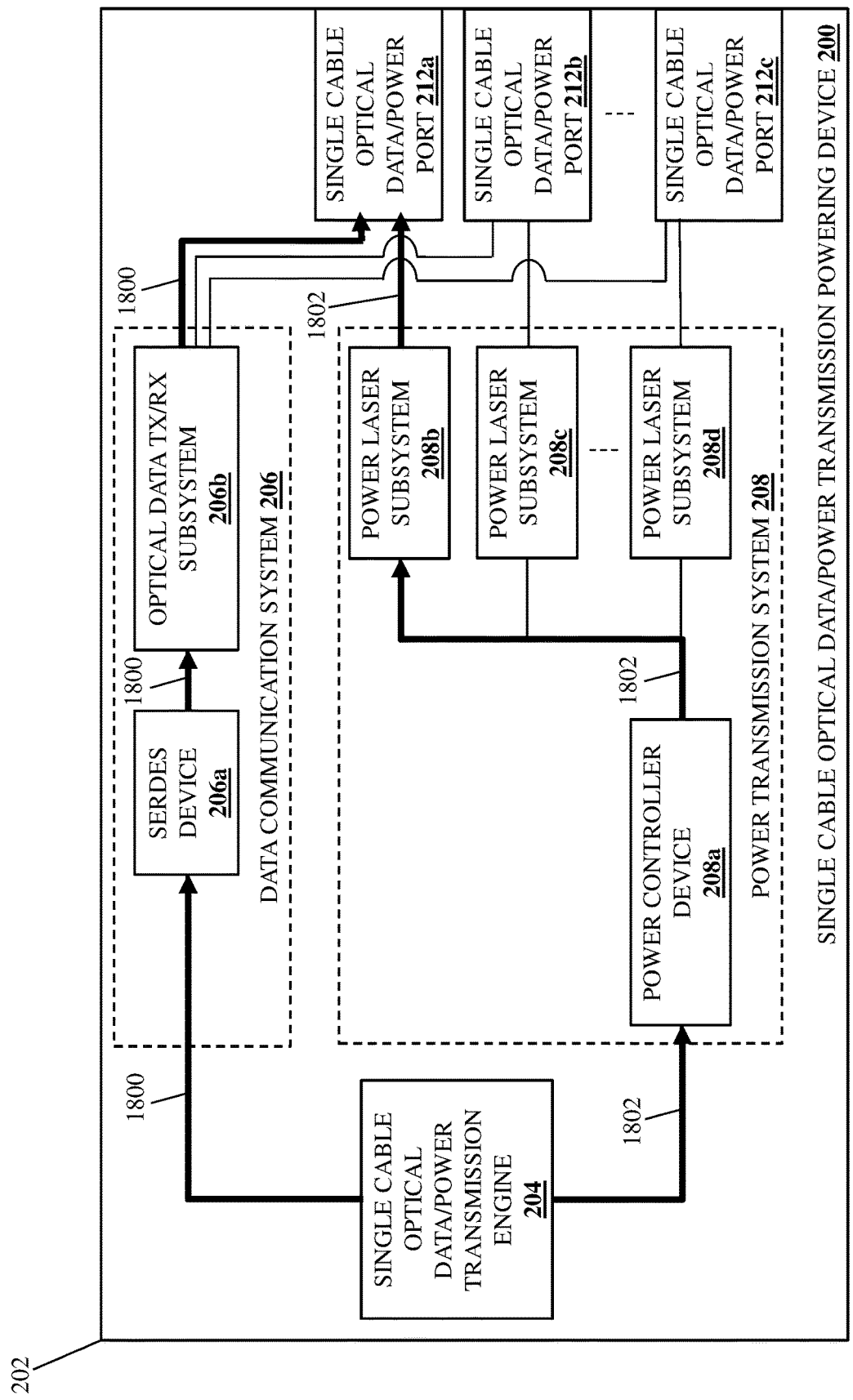
FIG. 18A is a schematic view illustrating an embodiment of the single cable optical data/power transmission powering device of FIG. 16 operating during the method of FIG. 15.

The method 1500 then proceeds to block 1506 where the single cable optical data/power transmission powering device transmits optical data and optical power to the single cable optical data/power transmission powered device via the optical data/power transmission cable. With reference to FIG. 18A, in an embodiment of block 1506, the single cable optical data/power transmission engine 204 in the in the single cable optical data/power transmission powering device 200 may perform data communication operations 1800 that include controlling the data communication system 206 to transmit optical data to the single cable optical data/power transmission powered device 1000. As will be appreciated by one of skill in the art in possession of the present disclosure, the data transmitted by the single cable optical data/power transmission powering device 200 at block 1506 may be generated by the single cable optical data/power transmission powering device 200, received by and forwarded by the single cable optical data/power transmission powering device 200 from another device (not illustrated) connected to the single cable optical data/power transmission powering device 200, and/or provided in a variety of manners that will fall within the scope of the present disclosure.

For example, the data communication operations 1800 may include the single cable optical data/power transmission engine 204 providing electrical data as a parallel electrical data signal stream to the SERDES device 206a, the SERDES device 206a converting the parallel electrical data signal stream to a serial electrical data signal stream and providing that serial electrical data signal stream to the optical data TX/RX subsystem 206b, and the optical data TX/RX subsystem 206b modulating one or more laser devices using the serial electrical data signal stream to produce the optical data that is transmitted at block 1506 via the optical data conduit(s) in the single cable optical data power port 212a and through the optical data fiber(s) in the optical data/power transmission cable 600.

With continued reference to FIG. 18A, in an embodiment of block 1506, the single cable optical data/power transmission engine 204 in the in the single cable optical data/power transmission powering device 200 may also perform power transmission operations 1802 that include controlling the power transmission system 208 to cause the power controller device 208a to drive the power laser subsystem 208b such that the power laser subsystem 208b emits laser light to provide optical power (e.g., the default optical power or negotiated optical power discussed above) that is transmitted via the optical power conduit(s) in the single cable optical data power port 212a and through the optical power fiber(s) in the optical data/power transmission cable 600. As such, the optical data and optical power may be transmitted by the single cable optical data/power transmission powering device 200 via the optical data/power transmission cable 600 at the same time.

Figure 18B:
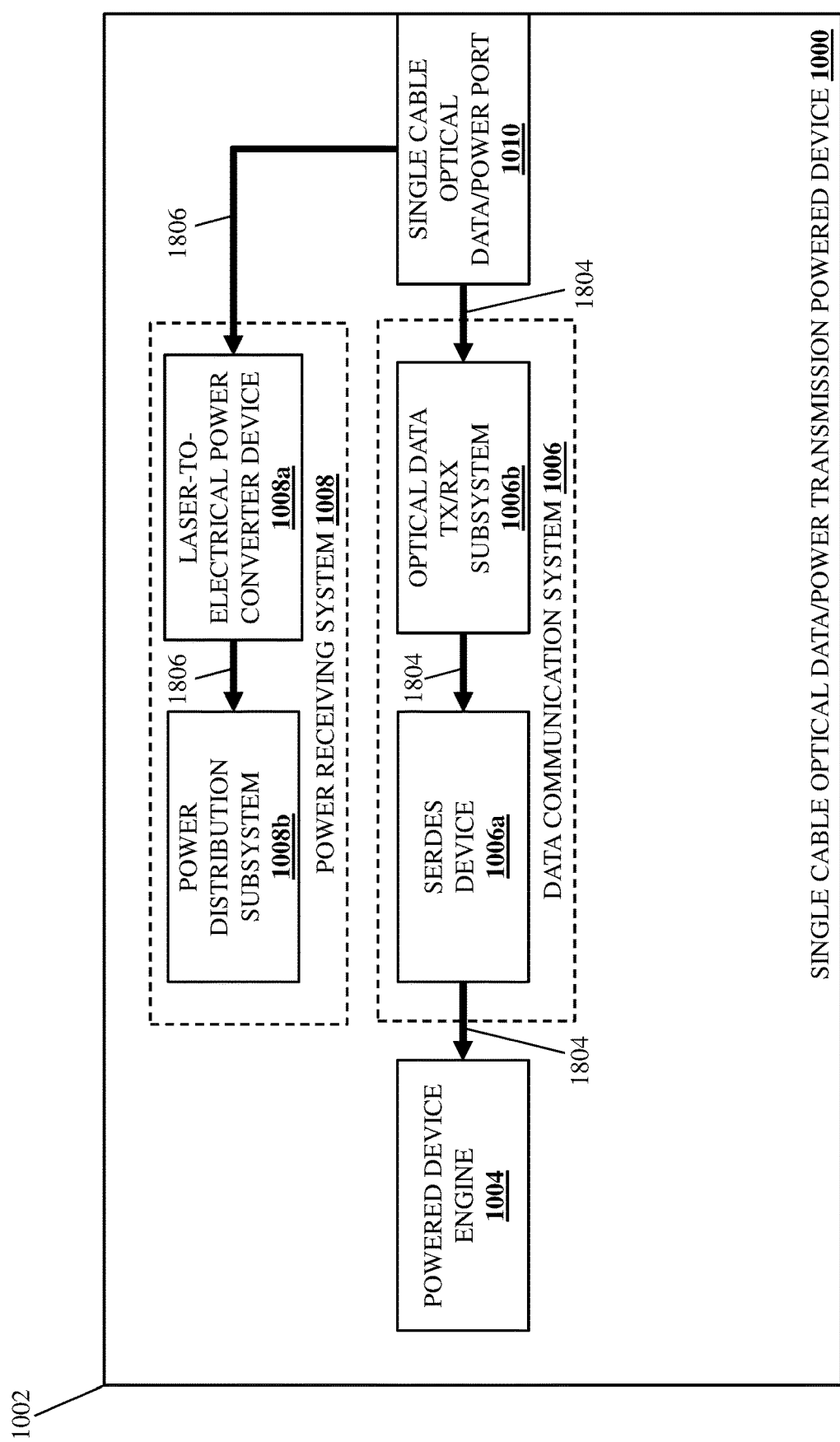
FIG. 18B is a schematic view illustrating an embodiment of the single cable optical data/power transmission powered device of FIG. 16 operating during the method of FIG. 15.

The method 1500 then proceeds to block 1508 where the single cable optical data/power transmission powered device receives the optical data and optical power from the single cable optical data/power transmission powered device via the optical data/power transmission cable. With reference to FIG. 18B, in an embodiment of block 1508, the single cable optical data/power transmission powered device 1000 may perform optical data receiving operations 1804 that include the optical data conduit(s) in the single cable optical data power port 1010 receiving the optical data that was transmitted by the single cable optical data/power transmission powering device 200 through the optical power fiber(s) in the optical data/power transmission cable 600, and providing the optical data to the data communication system 1006 such that the optical data TX/RX subsystem 1006b converts the received optical data to a serial electrical data signal stream and provides the serial electrical data stream to the SERDES device 1006a, and the SERDES device 1006a converts the serial electrical data signal stream to a parallel electrical data signal stream that provides electrical data, and provides the electrical data (that was transmitted by the single cable optical data/power transmission engine 204 in the in the single cable optical data/power transmission powering device 200) to the powered device engine 1004.

With reference to FIG. 18B, in an embodiment of block 1506, the single cable optical data/power transmission powered device 1000 may also perform power receiving operations 1806 that include the optical power conduit(s) in the single cable optical data power port 1010 on the single cable optical data/power transmission powered device 1000 receiving the optical power (e.g., the default optical power or negotiated optical power discussed above) that was transmitted by the single cable optical data/power transmission powering device 200 through the optical power fiber(s) in the optical data/power transmission cable 600, and providing the optical power to the power receiving system 1008 such that the laser-to-electrical power converter device 1008a converts that optical power to electrical power and provides the electrical power to the power distribution subsystem 1008b, and the power distribution subsystem 1008b distributes that electrical power to one or more components in the single cable optical data/power transmission powered device 1000 that one of skill in the art in possession of the present disclosure will recognize require power to provide the functionality described below.

Figure 19A:
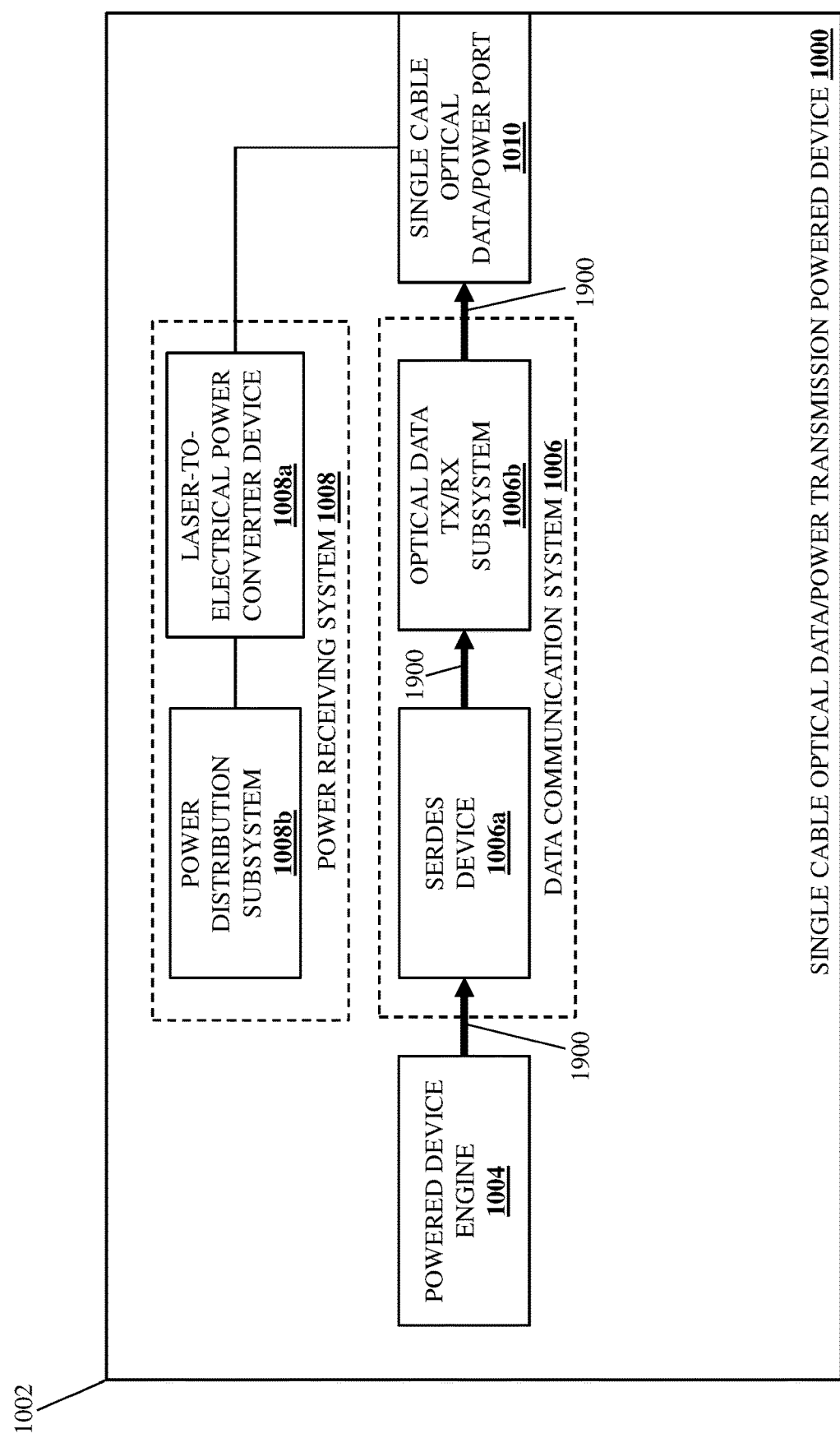
FIG. 19A is a schematic view illustrating an embodiment of the single cable optical data/power transmission powered device of FIG. 16 operating during the method of FIG. 15.

The method 1500 then proceeds to block 1510 where the single cable optical data/power transmission powered device transmits optical data to the single cable optical data/power transmission powering device via an optical data/power transmission cable. With reference to FIG. 19A, in an embodiment of block 1510, the powered device engine 1004 in the in the single cable optical data/power transmission powered device 1000 may perform data communication operations 1900 that include controlling the data communication system 1006 to transmit optical data to the single cable optical data/power transmission powering device 200. As will be appreciated by one of skill in the art in possession of the present disclosure, the data transmitted by the single cable optical data/power transmission powered device 1000 at block 1510 may be generated by the single cable optical data/power transmission powered device 1000, provided in response to the data received from the single cable optical data/power transmission powering device 200, and/or provided in a variety of manners that will fall within the scope of the present disclosure.

For example, the data communication operations 1900 may include the powered device engine 1004 providing electrical data as a parallel electrical data signal stream to the SERDES device 1006a, the SERDES device 1006a converting the parallel electrical data signal stream to a serial electrical data signal stream and providing that serial electrical data signal stream to the optical data TX/RX subsystem 1006b, and the optical data TX/RX subsystem 1006b modulating one or more laser devices using the serial electrical data signal stream to produce optical data that is transmitted at block 1510 via the optical data conduit(s) in the single cable optical data power port 1010 and through the optical data fiber(s) in the optical data/power transmission cable 600.

Figure 19B:
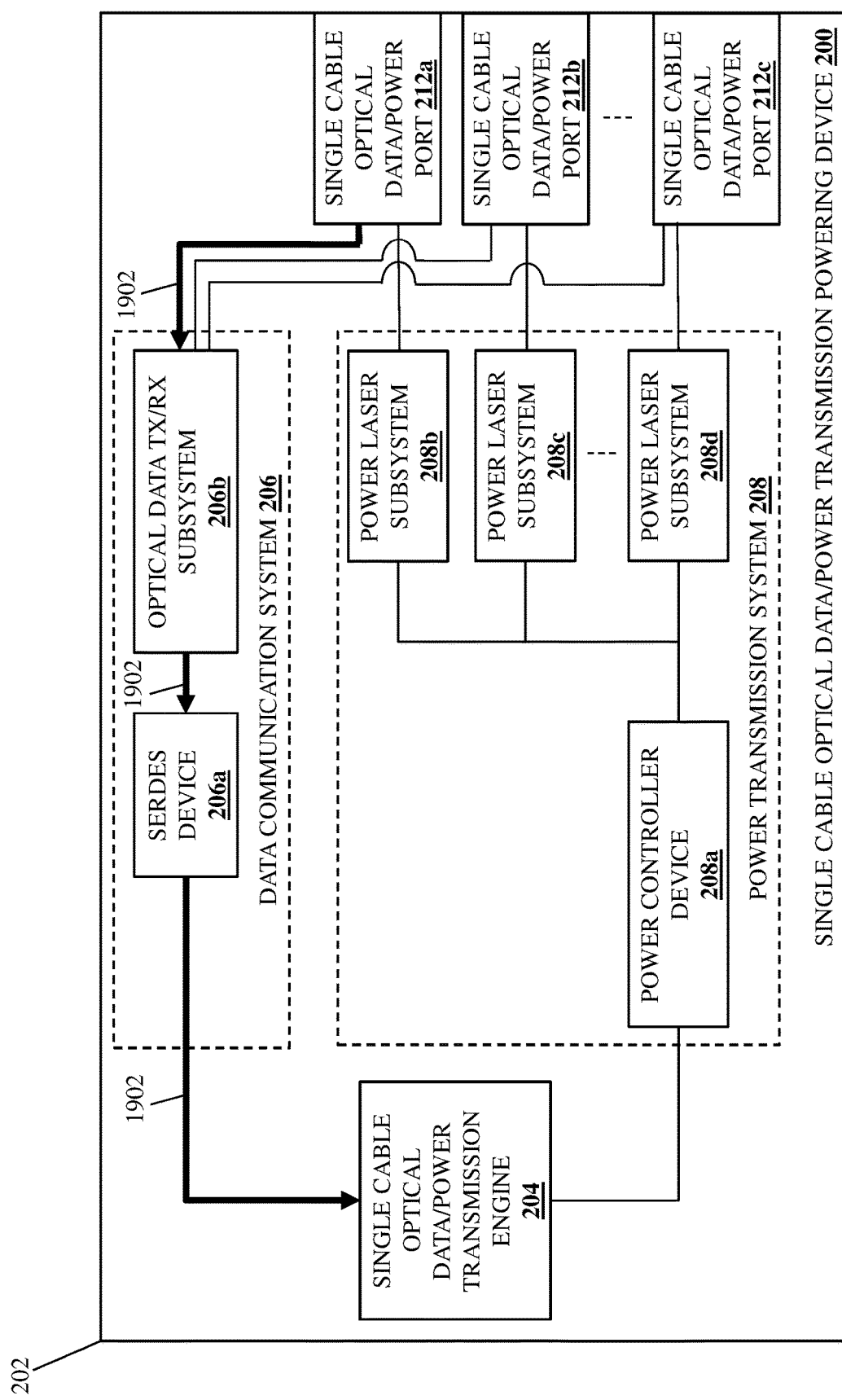
FIG. 19B is a schematic view illustrating an embodiment of the single cable optical data/power transmission powering device of FIG. 16 operating during the method of FIG. 15.

The method 1500 then proceeds to block 1512 where the single cable optical data/power transmission powering device receives the optical data from the single cable optical data/power transmission powering device via an optical data/power transmission cable. With reference to FIG. 19B, in an embodiment of block 1512, the single cable optical data/power transmission powering device 200 may perform optical data receiving operations 1902 that include the optical data conduit(s) in the single cable optical data power port 212a receiving the optical data that was transmitted by the single cable optical data/power transmission powered device 1000 through the optical power fiber(s) in the optical data/power transmission cable 600, and providing the optical data to the data communication system 206 such that the optical data TX/RX subsystem 206b converts the received optical data to a serial electrical data signal stream and provides the serial electrical data stream to the SERDES device 206a, and the SERDES device 206a converts the serial electrical data signal stream to a parallel electrical data signal stream that provides the electrical data (that was transmitted by the powered device engine 1004 in the in the single cable optical data/power transmission powered device 1000), and provides the electrical data to the single cable optical data/power transmission engine 204.

The method 1500 then returns to block 1506. As such, the method 1500 may loop such that the single cable optical data/power transmission powering device 200 powers the single cable optical data/power transmission powered device 1000, and the single cable optical data/power transmission powering device 200 and the single cable optical data/power transmission powered device 1000 exchange data, via the optical data/power transmission cable 600. Furthermore, one of skill in the art in possession of the present disclosure will appreciate how the power negotiation operations discussed above with reference to optional block 1504 may be performed periodically to adjust the amount of power provided by the single cable optical data/power transmission powering device 200 to the single cable optical data/power transmission powered device 1000 while remaining within the scope of the present disclosure.

Thus, systems and methods have been described that provide for the transmission of optical power from a single cable optical data/power transmission powering device to a single cable optical data/power transmission powered device via a single optical data/power transmission cable, as well as the exchange of optical data between the single cable optical data/power transmission powering device and the single cable optical data/power transmission powered device via that single optical data/power transmission cable. As such, data and power may be transmitted and received via a single cable over greater distances than are available via conventional PoE techniques.

Figure 20:
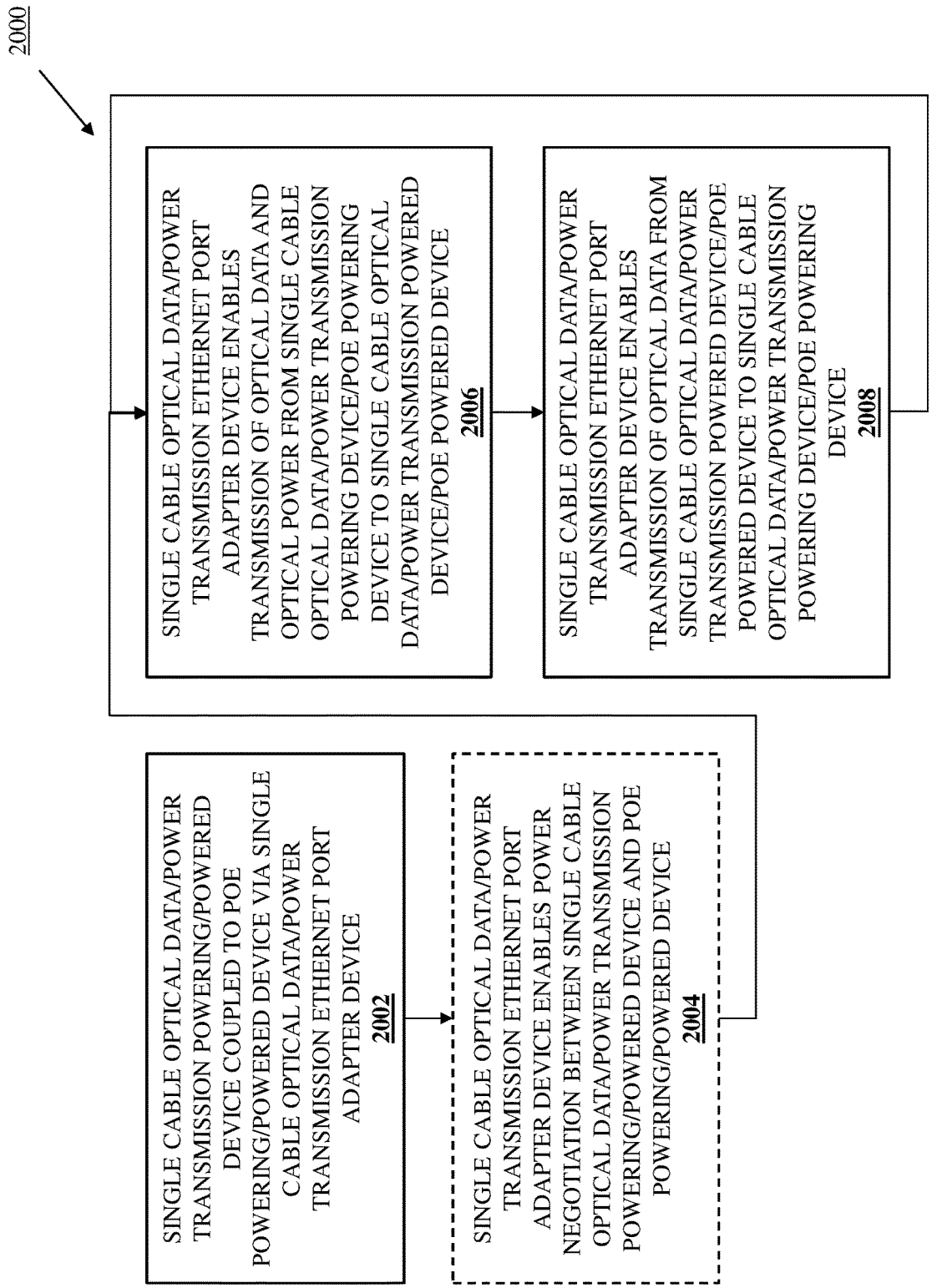
FIG. 20 is a flow chart illustrating an embodiment of a method for transmitting optical data and optical power from a single cable optical data/power transmission powering device or to a single cable optical data/power transmission powered device.

Referring now to FIG. 20, an embodiment of a method 2000 for transmitting optical data and optical power from a single cable optical data/power transmission powering device or to a single cable optical data/power transmission powered device is illustrated. As discussed below, the systems and methods of the present disclosure provide a single cable optical data/power transmission Ethernet port adapter device that may be used to couple the single cable optical data/power transmission powering device of the present disclosure to a PoE powered device via the optical data/power transmission cable of the present disclosure in order to allow data and power to be transmitted to the PoE powered device over greater distances than are available via conventional PoE techniques, or that may be used to couple a PoE powering device to the single cable optical data/power transmission powered device of the present disclosure via the optical data/power transmission cable of the present disclosure in order to allow data and power to be transmitted from the PoE powering device over greater distances than are available via conventional PoE techniques.

For example, a single cable optical data/power transmission Ethernet port adapter system provided according to the teachings of the present disclosure may include a single cable optical data/power transmission powering device ("powering device") coupled to a powered device using an optical data/power transmission cable ("cable") and a single cable optical data/power transmission Ethernet port adapter device ("adapter device"). The adapter device includes an Ethernet port coupled to the powered device, and an optical data/power connector connected to the cable and including optical data conduit(s) and optical power conduit(s) with a greater cross-section area than the optical data conduit(s). A data communication system receives optical data from the powering device via the optical data conduit(s) and uses it to transmit electrical data via the Ethernet port to the powered device, and a power transmission system receives optical power from the powering device via the optical power conduit(s) and uses it to transmit electrical power via the Ethernet port to the powered device.

In another example, a single cable optical data/power transmission Ethernet cable adapter system provided according to the teachings of the present disclosure may include a powering device coupled to a single cable optical data/power transmission powered device ("powered device") using a single cable optical data/power transmission Ethernet port adapter device ("adapter device") and an optical data/power transmission cable ("cable"). The adapter device includes an Ethernet port coupled to the powering device, and an optical data/power connector connected to the cable and including optical data conduit(s) and optical power conduit(s) with a greater cross-section area than the optical data conduit(s). A data communication system receives electrical data from the powering device via the Ethernet port and uses it to transmit optical data via the optical data conduit(s) in the optical data/power connector to the powered device, and a power transmission system receives electrical power from the powering device via the Ethernet port and uses it to transmit optical power via the optical power conduit(s) in the optical data/power connector to the powered device.

Figure 21:
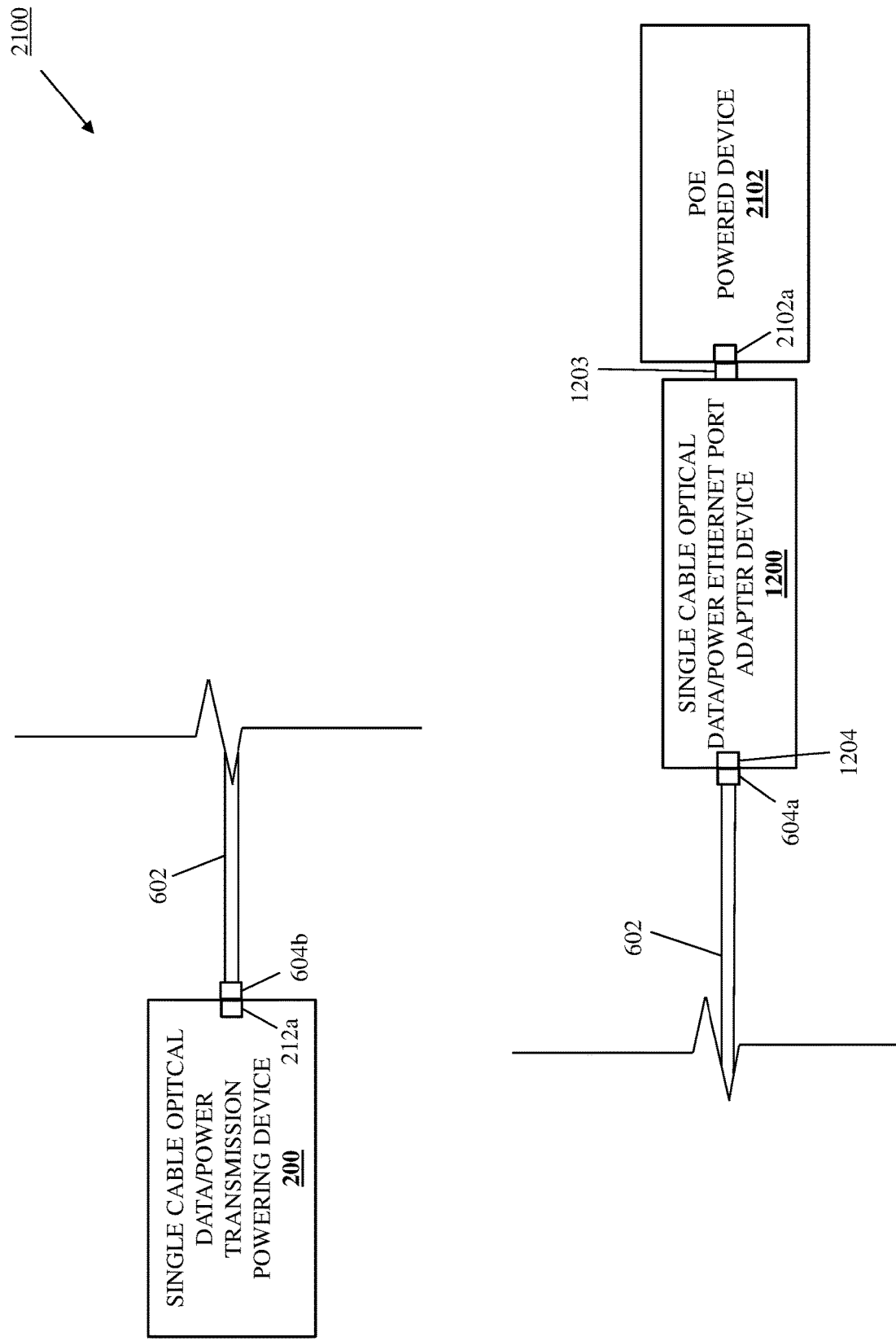
FIG. 21 is a schematic view illustrating an embodiment of the single cable optical data/power transmission powering device of FIG. 2 coupled to a PoE powered device using the optical data/power transmission cable of FIG. 6 and the single cable optical data/power Ethernet port adapter device of FIG. 12 during the method of FIG. 20 to provide a single cable optical data/power transmission Ethernet port adapter system.

The method 2000 begins at block 2002 where a single cable optical data/power transmission powering device or a single cable optical data/power transmission powered device is coupled to a PoE powered device or PoE powering device, respectively, via a single cable optical data/power transmission Ethernet port adapter device. With reference to FIG. 21, in an embodiment of block 2002, a single cable optical data/power transmission Ethernet port adapter system 2100 may be provided by coupling the single cable optical data/power transmission powering device 200 to a PoE powered device 2102 via the optical data/power transmission cable 600 and the single cable optical data/power transmission Ethernet port adapter device 1200. For example, the Ethernet connector 1203 on the single cable optical data/power transmission Ethernet port adapter device 1200 may be connected to an Ethernet port 2102a on the PoE powered device 2102, and the single cable optical data/power port 1204 on the single cable optical data/power transmission Ethernet port adapter device 1200 may be connected to the single cable optical data/power connector 604a on the optical data/power transmission cable 600, with the single cable optical data/power connector 604b on the optical data/power transmission cable 600 connected to the single cable optical data/power port 212a on the single cable optical data/power transmission powering device 200.

In the illustrated embodiment, the single cable optical data/power connector 604b on the optical data/power transmission cable 600 is connected to the single cable optical data/power port 212a on the single cable optical data/power transmission powering device 200, but one of skill in the art in possession of the present disclosure will appreciate how the optical data/power transmission cable 600 may be connected to the single cable optical data/power transmission powering device 200 via its other single cable optical data/power ports 212b and up to 212c while remaining with the scope of the present disclosure as well.

Figure 22:
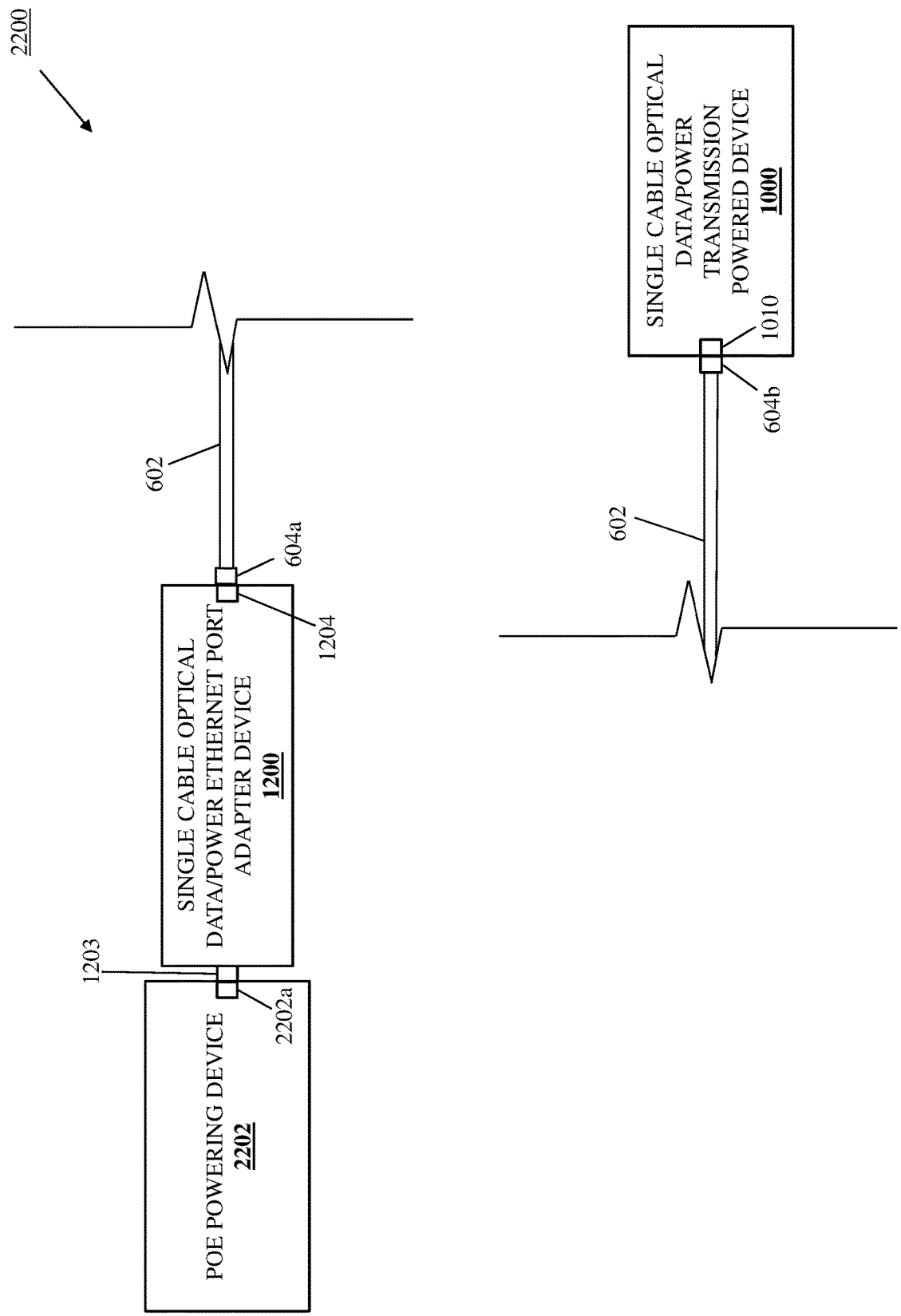
FIG. 22 is a schematic view illustrating an embodiment of a PoE powering device coupled to the single cable optical data/power transmission powered device of FIG. 10 using the single cable optical data/power Ethernet port adapter device of FIG. 12 and the optical data/power transmission cable of FIG. 6 during the method of FIG. 20 to provide a single cable optical data/power transmission Ethernet port adapter system.

With reference to FIG. 22, in another embodiment of block 2002, a single cable optical data/power transmission Ethernet port adapter system 2200 may be provided by coupling a PoE powering device 2202 to the single cable optical data/power transmission powered device 1000 via the single cable optical data/power transmission Ethernet port adapter device 1200 and the optical data/power transmission cable 600. For example, the Ethernet connector 1203 on the single cable optical data/power transmission Ethernet port adapter device 1200 may be connected to an Ethernet port 2202a on the PoE powering device 2202, and the single cable optical data/power connector 604a on the optical data/power transmission cable 600 may be connected to the single cable optical data/power port 1204 on the single cable optical data/power transmission Ethernet port adapter device 1200, with the single cable optical data/power connector 604b on the optical data/power transmission cable 600 connected to the single cable optical data/power port 1010 on the single cable optical data/power transmission powered device 1000.

The method 2000 then proceeds to optional block 2004 where the single cable optical data/power transmission Ethernet port adapter device may enable power negotiation between the single cable optical data/power transmission powering device and the PoE powered device, or between the PoE powering device and the single cable optical data/power transmission powered device. In an embodiment of optional block 2004, the single cable optical data/power transmission powering device 200 and the PoE powered device 2102 may negotiate a power amount that the single cable optical data/power transmission powering device 200 will provide to the PoE powered device 2102 during the method 2000. In another embodiment of optional block 2004, the PoE powering device 2202 and the single cable optical data/power transmission powered device 1000 may negotiate a power amount that the PoE powering device 2202 will provide to the single cable optical data/power transmission powered device 1000 during the method 2000.

Similarly as described above with reference to FIG. 17A, at optional block 2004 the single cable optical data/power transmission powering device 200 may perform preliminary power provisioning operations to transmit optical power via the optical power conduit(s) in the single cable optical data power port 212a and via the optical power fiber(s) in the optical data/power cable 600. Furthermore, one of skill in the art in possession of the present disclosure will appreciate how the PoE powering device 2202 may operate at optional block 2004 to transmit electrical power via the Ethernet port 2202a in a similar manner.

Figure 23A:
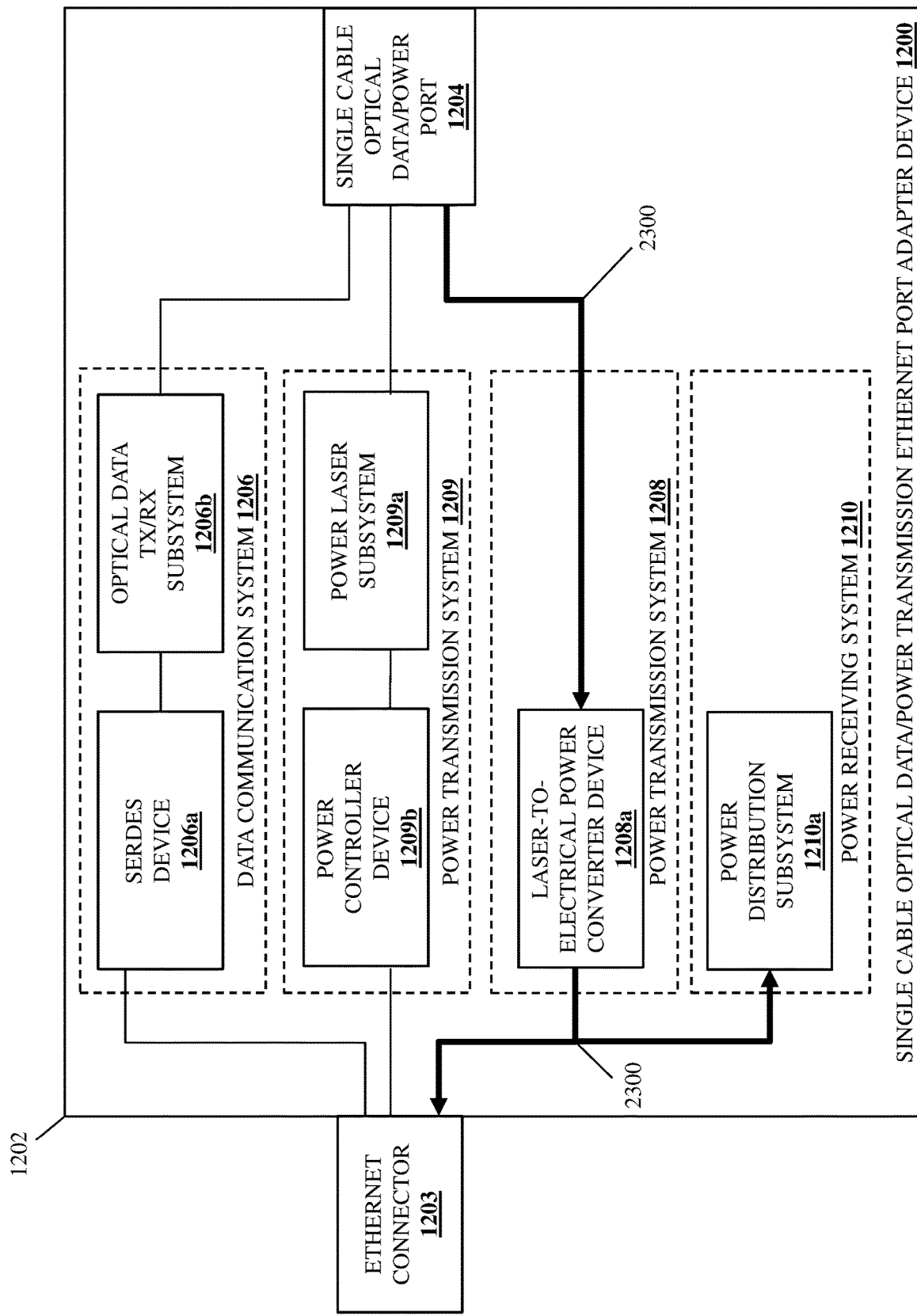
FIG. 23A is a schematic view illustrating an embodiment of the single cable optical data/power transmission Ethernet port adapter device of FIG. 21 operating during the method of FIG. 20.

With reference to FIG. 23A, in embodiments of optional block 2004 where the single cable optical data/power transmission powering device 200 performs the preliminary power provisioning operations discussed above, the single cable optical data/power transmission Ethernet port adapter device 1200 may perform preliminary power transmission operations 2300 that include the optical power conduit(s) in the single cable optical data power port 1204 receiving the optical power that was transmitted via the optical power conduit(s) in the single cable optical data power port 212a and via the optical power fiber(s) in the optical data/power transmission cable 600, and providing the optical power to the power transmission system 1208 such that the laser-to-electrical power converter device 1208a converts that optical power to electrical power and provides a portion of that electrical power to the power receiving system 1210 so that the power distribution subsystem 1210a may distribute that electrical power to one or more components in the single cable optical data/power transmission Ethernet port adapter device 1200 that one of skill in the art in possession of the present disclosure will recognize require power to provide the functionality described below. Furthermore, the laser-to-electrical power converter device 1208a may also provide that electrical power to the Ethernet connector 1203 in order to transmit that electrical power via the Ethernet port 2102*a* in order to power the PoE powered device 2102.

Figure 23B:
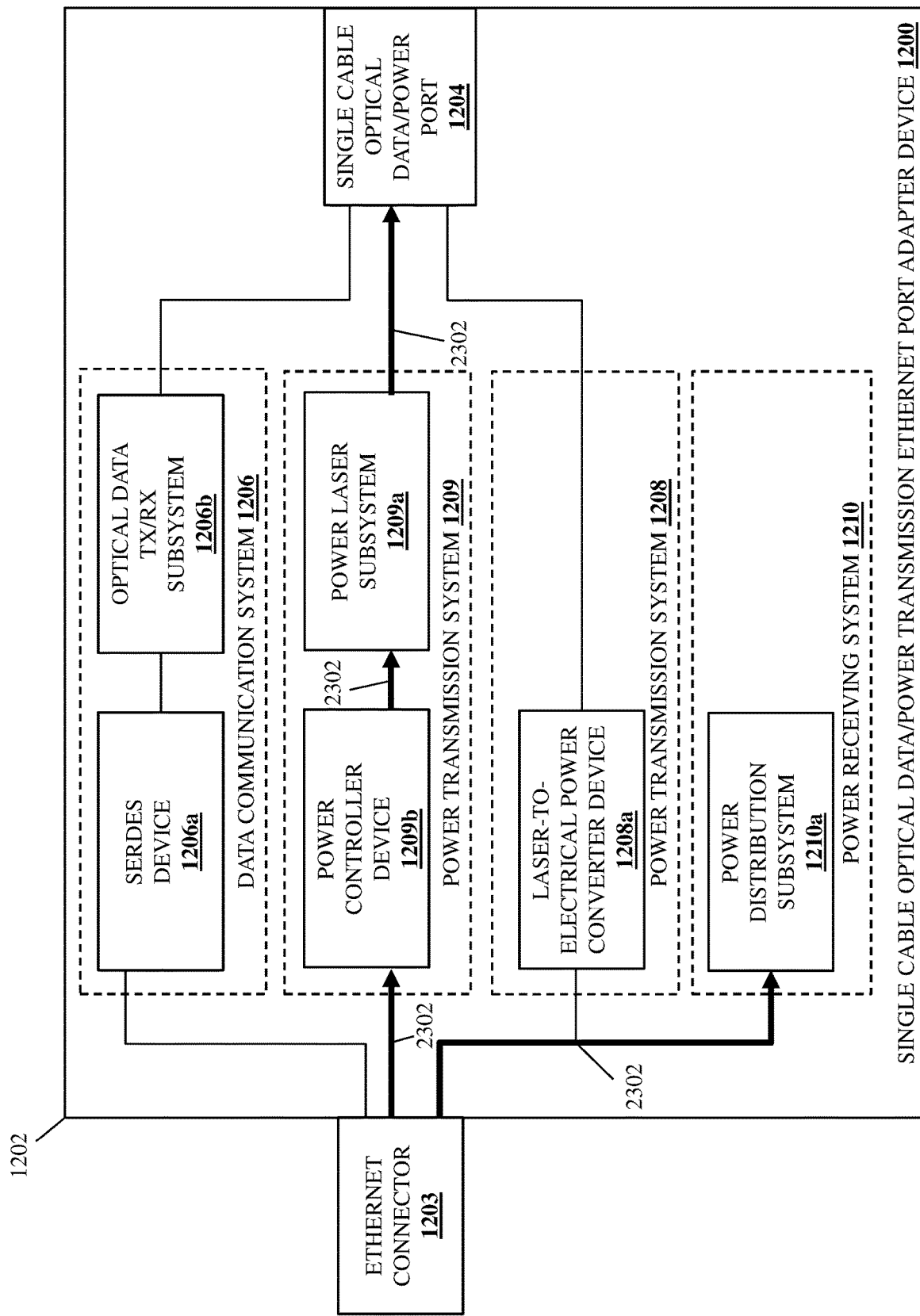
FIG. 23B is a schematic view illustrating an embodiment of the single cable optical data/power transmission Ethernet port adapter device of FIG. 22 operating during the method of FIG. 20.

With reference to FIG. 23B, in embodiments of optional block 2004 where the POE powering device 2202 performs the preliminary power provisioning operations discussed above, the single cable optical data/power transmission Ethernet port adapter device 1200 may perform preliminary power transmission operations 2302 that include the Ethernet connector 1203 receiving the electrical power transmitted by the PoE powering device 2202 via the Ethernet port 2202*a*, and providing a portion of that electrical power to the power receiving system 1210 so that the power distribution subsystem 1210*a* may distribute that electrical power to one or more components in the single cable optical data/power transmission Ethernet port adapter device 1200 that one of skill in the art in possession of the present disclosure will recognize require power to provide the functionality described below.

Furthermore, the preliminary power transmission operations 2302 may also include the Ethernet connector 1203 providing the electrical power received from the PoE powering device 2202 to the power transmission system 1209 to cause the power controller device 1209*b* to drive the power laser subsystem 1209*a* such that the power laser subsystem 1209*a* emits laser light to provide optical power that is transmitted via the optical power conduit(s) in the single cable optical data power port 1204. As such, similarly as described above with reference to FIG. 17B, at optional block 2004 the single cable optical data/power transmission powered device 1000 may receive the optical power transmitted by the single cable optical data/power transmission Ethernet port adapter device 1200 and use that optical power for its operations.

Similarly as described above with reference to FIGS. 17C and 17D, at optional block 2004 the single cable optical data/power transmission powering device 200 may transmit optical data providing a powering device power negotiation communication to the PoE powered device 2102 via the optical power conduit(s) in the single cable optical data power port 212*a* and via the optical power fiber(s) in the optical data/power cable 600. Furthermore, one of skill in the art in possession of the present disclosure will appreciate how the PoE powering device 2202 may operate at optional block 2004 to transmit electrical data providing a powering device power negotiation communication to the single cable optical data/power transmission powered device 1000 via the Ethernet port 2202*a*.

Figure 23C:
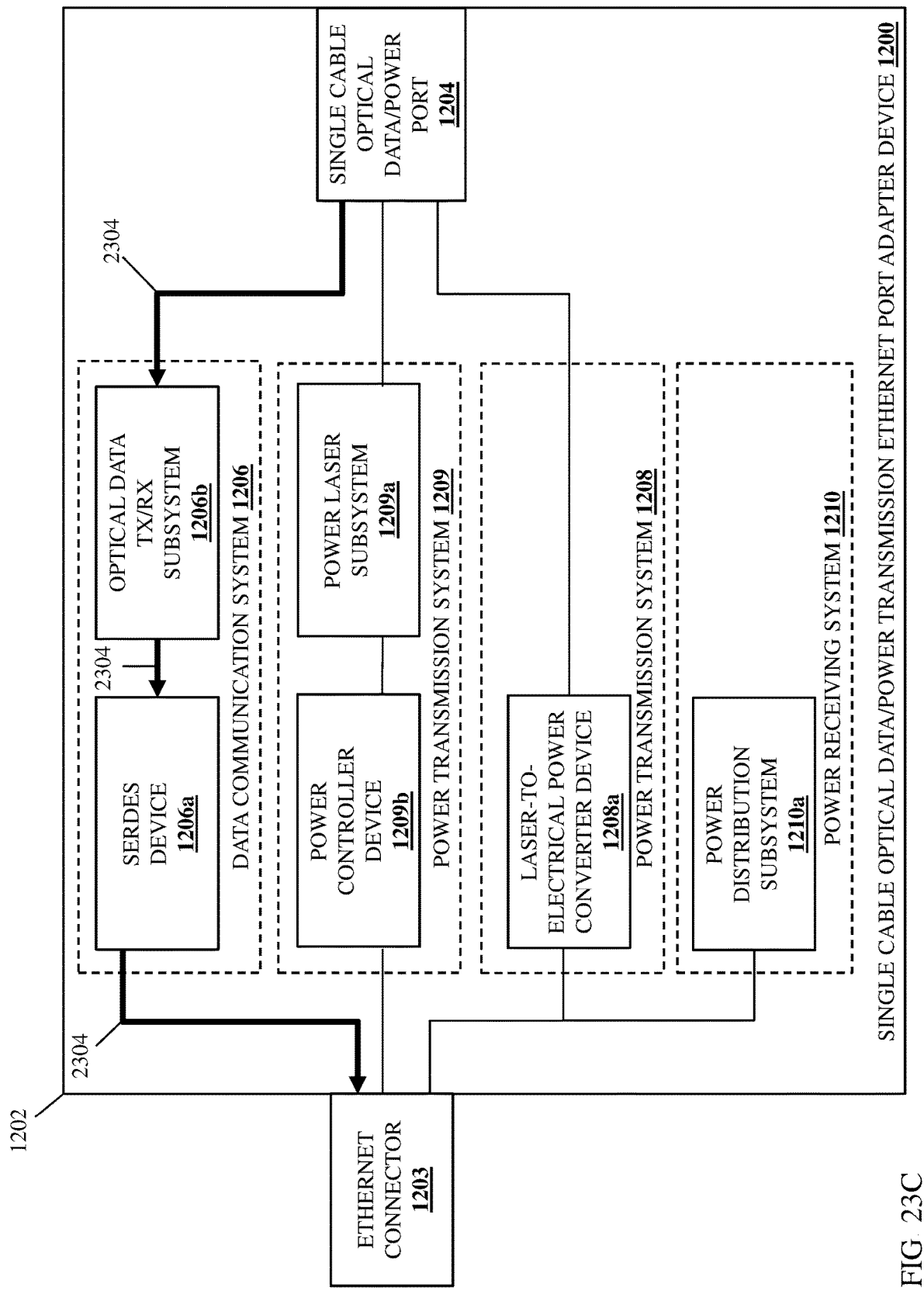
FIG. 23C is a schematic view illustrating an embodiment of the single cable optical data/power transmission Ethernet port adapter device of FIG. 21 operating during the method of FIG. 20.

With reference to FIG. 23C, in embodiments of optional block 2004 where the single cable optical data/power transmission powering device 200 transmits the powering device power negotiation communication discussed above, the single cable optical data/power transmission Ethernet port adapter device 1200 may perform powering device power negotiation communication transmission operations 2304 that include the optical data conduit(s) in the single cable optical data power port 1204 receiving the optical data that was transmitted by the single cable optical data/power transmission powering device 200 through the optical data conduit(s) in the single cable optical data power port 212*a* and via the optical data fiber(s) in the optical data/power transmission cable 600, and providing that optical data to the data communication system 1206 such that the optical data TX/RX subsystem 1206*b* converts the received optical data to a serial electrical data signal stream and provides the serial electrical data stream to the SERDES device 1206*a*, and the SERDES device 1206*a* converts the serial electrical data signal stream to a parallel electrical data signal stream that provides electrical data, and provides the electrical data (that was transmitted by the single cable optical data/power transmission engine 204 in the in the single cable optical data/power transmission powering device 200) via the Ethernet connector 1203 and to the PoE powered device 2102.

Figure 23D:
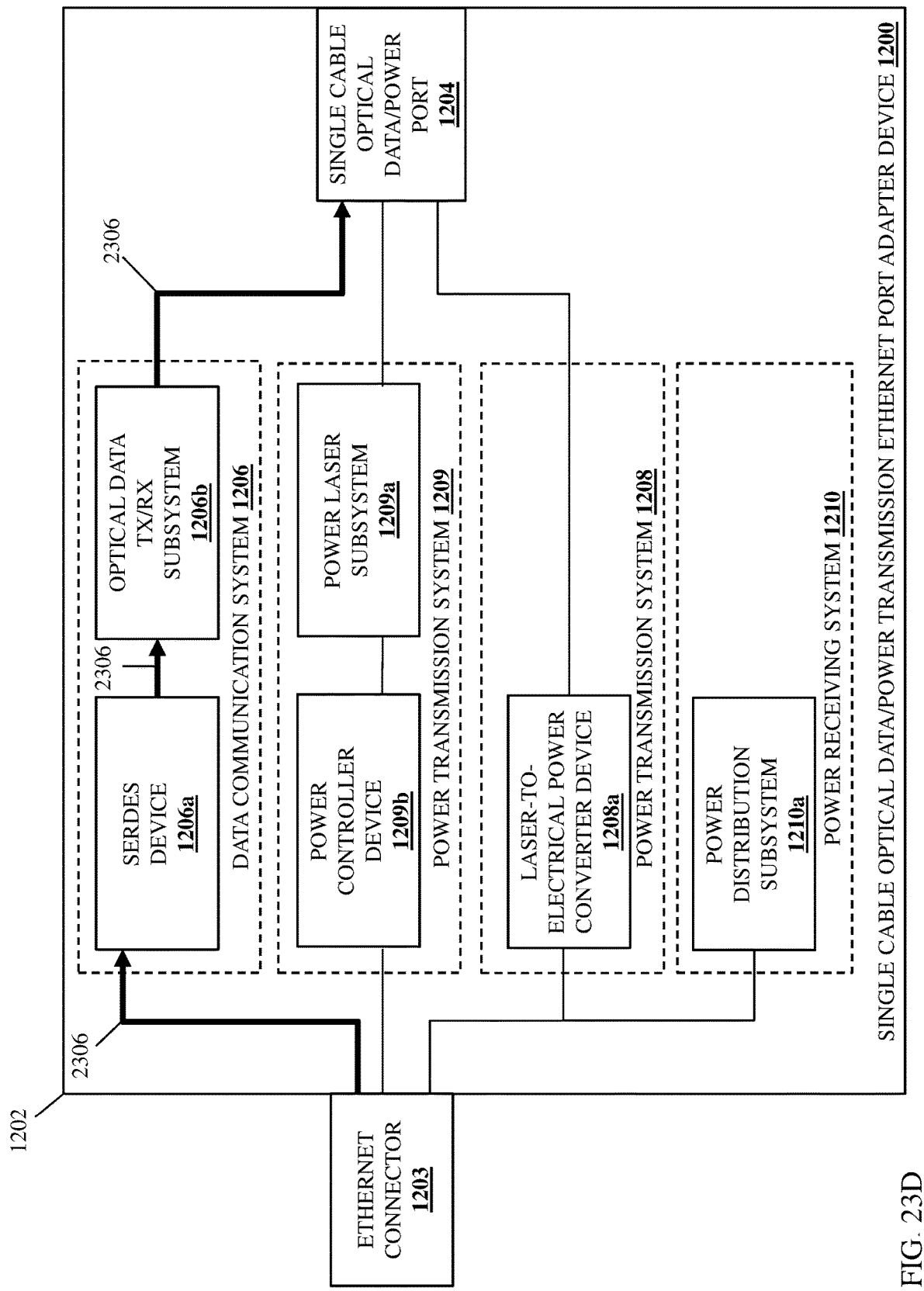
FIG. 23D is a schematic view illustrating an embodiment of the single cable optical data/power transmission Ethernet port adapter device of FIG. 22 operating during the method of FIG. 20.

With reference to FIG. 23D, in embodiments of optional block 2004 where the POE powering device 2202 transmits the powering device power negotiation communication discussed above, the single cable optical data/power transmission Ethernet port adapter device 1200 may perform powering device power negotiation communication transmission operations 2306 that include the Ethernet connector 1203 receiving the electrical data that was transmitted by the PoE powering device 2202 through the Ethernet connector 2202*a*, and providing the electrical data as a parallel electrical data signal stream to the SERDES device 1206*a*, the SERDES device 1206*a* converting the parallel electrical data signal stream to a serial electrical data signal stream and providing that serial electrical data signal stream to the optical data TX/RX subsystem 1206*b*, and the optical data TX/RX subsystem 1206*b* modulating one or more laser devices using the serial electrical data signal stream to produce optical data that is transmitted at optional block 2004 via the optical data conduit(s) in the single cable optical data power port 1204 and the optical fiber(s) in the optical data/power transmission cable 600. Similarly as described with reference to FIG. 17D, the single cable optical data/power transmission powered device 1000 may receive that optical data and convert it to electrical data for use by the powered device engine 1004.

As will be appreciated by one of skill in the art in possession of the present disclosure, the PoE powered device 2102 may respond to the powering device power negotiation communication from the single cable optical data/power transmission powering device 200 with a powered device power negotiation communication, and the single cable optical data/power transmission Ethernet port adapter device 1200 may transmit that powered device power negotiation communication similarly as described above with reference to FIG. 23D. As will also be appreciated by one of skill in the art in possession of the present disclosure, the single cable optical data/power transmission powered device 1000 may respond to the powering device power negotiation communication from the PoE powering device 2202 with a powered device power negotiation communication, and the single cable optical data/power transmission Ethernet cable adapter device 1100 may transmit that powered device power negotiation communication similarly as described above with reference to FIG. 23C.

The method 2000 then proceeds to block 2006 where the single cable optical data/power transmission Ethernet port adapter device enables the transmission of optical power and optical data from the single cable optical data/power transmission powering device to the PoE powered device, or from the PoE powering device to the single cable optical data/power transmission powered device. Similarly as described above with reference to FIG. 18A, the single cable optical data/power transmission powering device 200 may transmit optical data and optical power via the via the optical power conduit(s) in the single cable optical data power port 212*a* and via the optical power fiber(s) in the optical data/power cable 600. Furthermore, one of skill in the art in possession of the present disclosure will appreciate how the PoE powering device 2202 may transmit electrical data and electrical power via the Ethernet port 2202*a* as well.

Figure 24A:
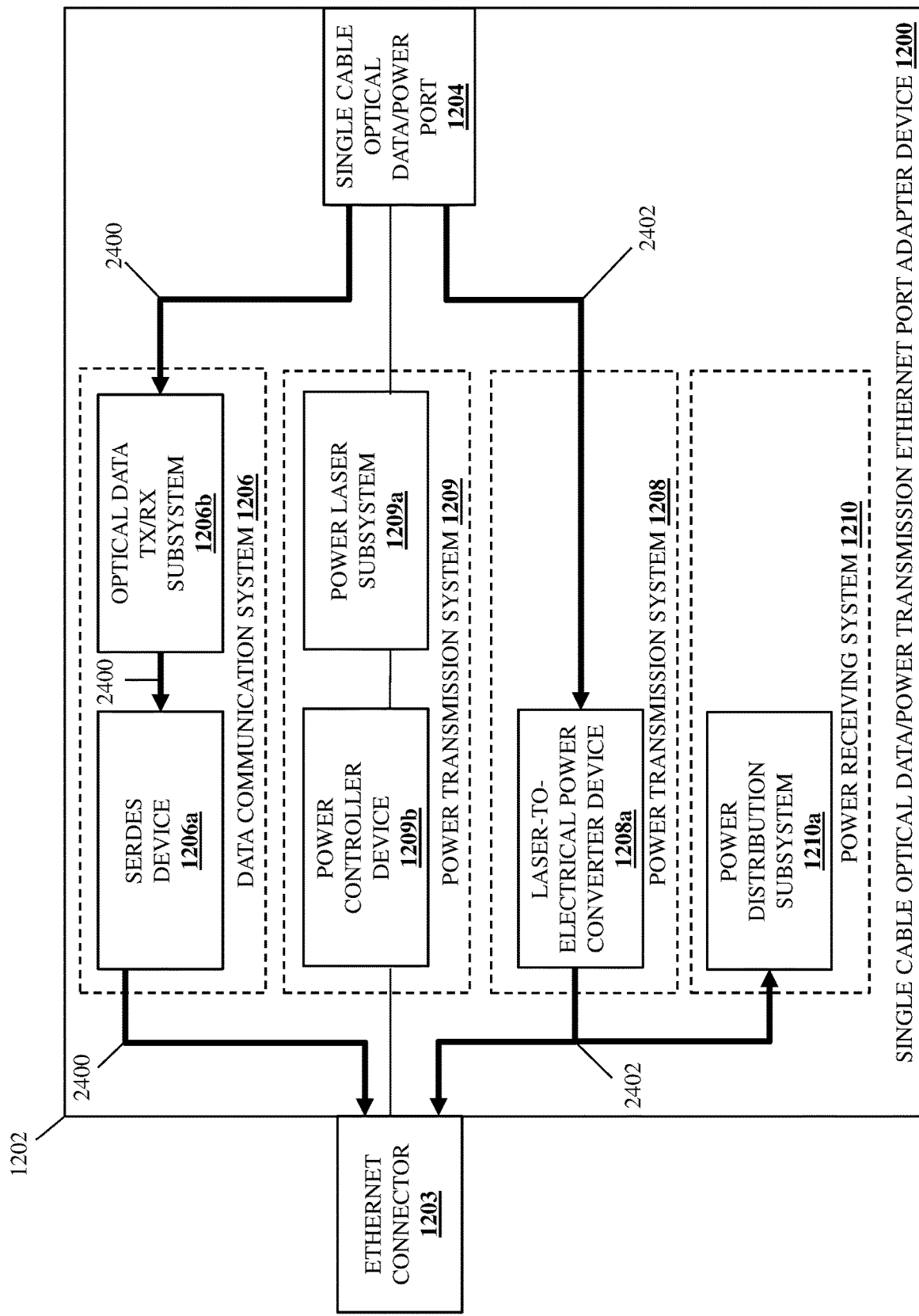
FIG. 24A is a schematic view illustrating an embodiment of the single cable optical data/power transmission Ethernet port adapter device of FIG. 21 operating during the method of FIG. 20.

With reference to FIG. 24A, in embodiments of block 2006 where the single cable optical data/power transmission powering device 200 transmits the optical data and optical power discussed above, the single cable optical data/power transmission Ethernet port adapter device 1200 may perform data transmission operations 2400 and power transmission operations 2402. For example, the data transmission operations 2400 may include the optical data conduit(s) in the single cable optical data/power port 1204 receiving the optical data transmitted by the single cable optical data/power transmission powering device 200 via the optical data conduit(s) in the single cable optical data/power port 212a and via the optical power fiber(s) in the optical data/power cable 600, and providing that optical data to the data communication system 1206 such that the optical data TX/RX subsystem 1206b converts the received optical data to a serial electrical data signal stream and provides the serial electrical data stream to the SERDES device 1206a, and the SERDES device 1206a converts the serial electrical data signal stream to a parallel electrical data signal stream that provides electrical data, and provides the electrical data (that was transmitted by the single cable optical data/power transmission engine 204 in the single cable optical data/power transmission powering device 200) via the Ethernet connector 1203 and to the PoE powered device 2102.

Furthermore, the power transmission operations 3242 may include the optical power conduit(s) in the single cable optical data power port 1204 on the single cable optical data/power transmission Ethernet port adapter device 1200 receiving the optical power that was transmitted via the optical power conduit(s) in the single cable optical data power port 212a and via the optical power fiber(s) in the optical data/power cable 600, and providing the optical power to the power transmission system 1208 such that the laser-to-electrical power converter device 1208a converts that optical power to electrical power and provides a portion of the electrical power to the power receiving system 1210 so that the power distribution subsystem 1210a may distribute that electrical power to one or more components in the single cable optical data/power transmission Ethernet port adapter device 1200 that one of skill in the art in possession of the present disclosure will recognize require power to provide the functionality described below. Furthermore, the laser-to-electrical power converter device 1208a may also provide that electrical power to the Ethernet connector 1203 in order to transmit that electrical power to power the PoE powered device 2102.

Figure 24B:
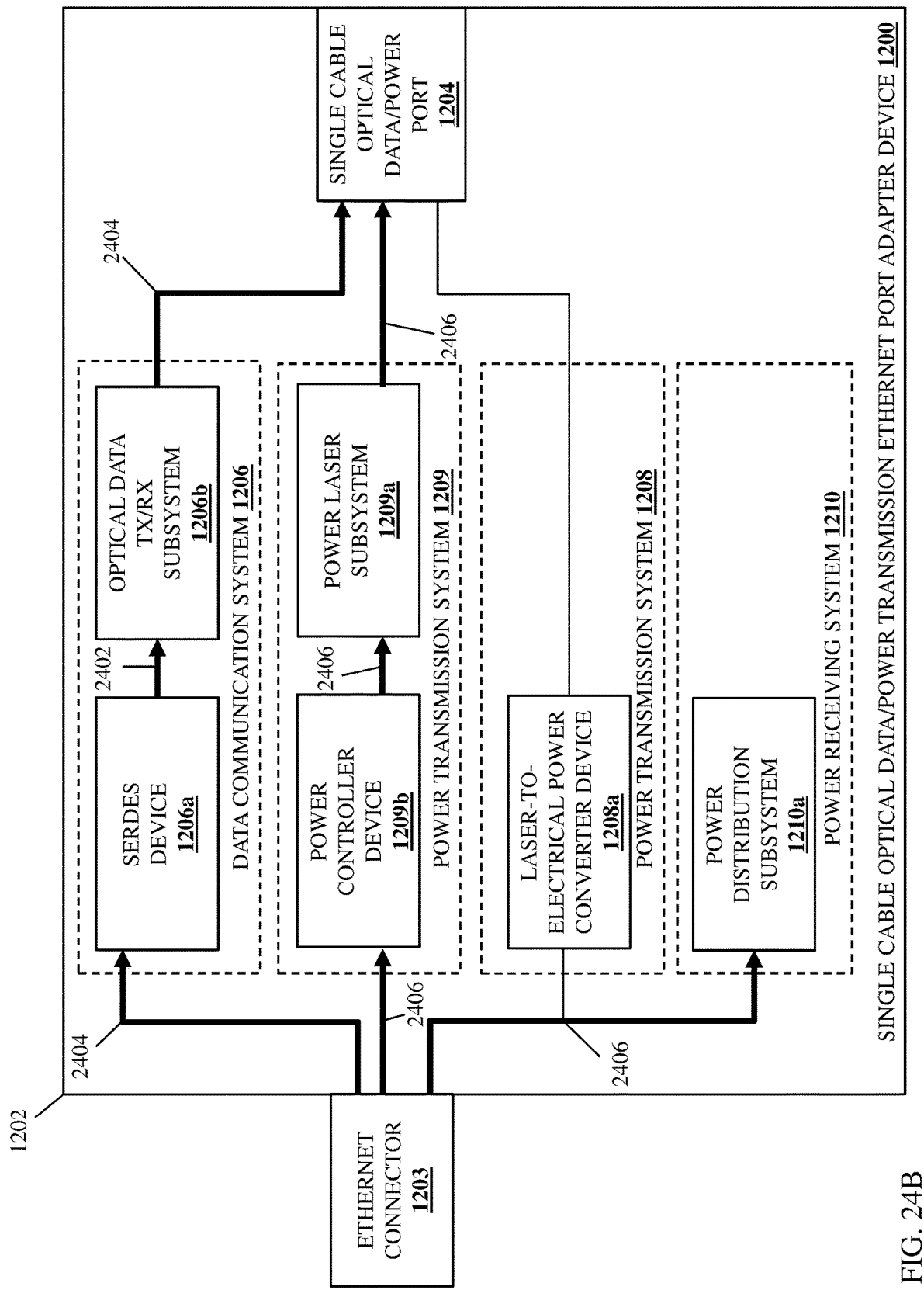
FIG. 24B is a schematic view illustrating an embodiment of the single cable optical data/power transmission Ethernet port adapter device of FIG. 22 operating during the method of FIG. 20.

With reference to FIG. 24B, in embodiments of block 2006 where the PoE powering device 2202 transmits the electrical data and electrical power discussed above, the single cable optical data/power transmission Ethernet port adapter device 1200 may perform data transmission operations 2404 and power transmission operations 2406. For example, the data transmission operations 2404 may include the Ethernet connector 1203 receiving the electrical data that was transmitted by the PoE powering device 2202 through the Ethernet port 2202a, and providing the electrical data as a parallel electrical data signal stream to the SERDES device 1206a, the SERDES device 1206a converting the parallel electrical data signal stream to a serial electrical data signal stream and providing that serial electrical data signal stream to the optical data TX/RX subsystem 1206b, and the optical data TX/RX subsystem 1206b modulating one or more laser devices using the serial electrical data signal stream to produce optical data that is transmitted at block 2006 via the optical data conduit(s) in the single cable optical data power port 1204, via the optical data fiber(s) in the optical data/power transmission cable 600, and to the single cable optical data/power transmission powered device 1000.

Furthermore, the power transmission operations 2406 may include the Ethernet connector 1203 receiving the electrical power transmitted by the PoE powering device 2202 via the Ethernet port 2202a, and providing a portion of that electrical power to the power receiving system 1210 so that the power distribution subsystem 1210a may distribute that electrical power to one or more components in the single cable optical data/power transmission Ethernet port adapter device 1200 that one of skill in the art in possession of the present disclosure will recognize require power to provide the functionality described below, as well as the Ethernet connector 1203 providing the electrical power received from the PoE powering device 2202 to the power transmission system 1209 to cause the power controller device 1209b to drive the power laser subsystem 1209a such that the power laser subsystem 1209a emits laser light to provide optical power that is transmitted via the optical power conduit(s) in the single cable optical data power port 1204, via the optical power fiber(s) in the optical data/power transmission cable 600, and to the single cable optical data/power transmission powered device 1000.

The method 2000 then proceeds to block 2008 where the single cable optical data/power transmission Ethernet port adapter device enables the transmission of optical data from the single cable optical data/power transmission powered device to the PoE powering device, or from the PoE powered device to the single cable optical data/power transmission powering device. Similarly as described above with reference to FIG. 19A, the single cable optical data/power transmission powered device 1000 may transmit optical data via the single cable optical data/power port 1010 and through the optical data/power transmission cable 600. Furthermore, one of skill in the art in possession of the present disclosure will appreciate how the PoE powered device 2102 may transmit electrical data via the Ethernet port 2102a.

Figure 25A:
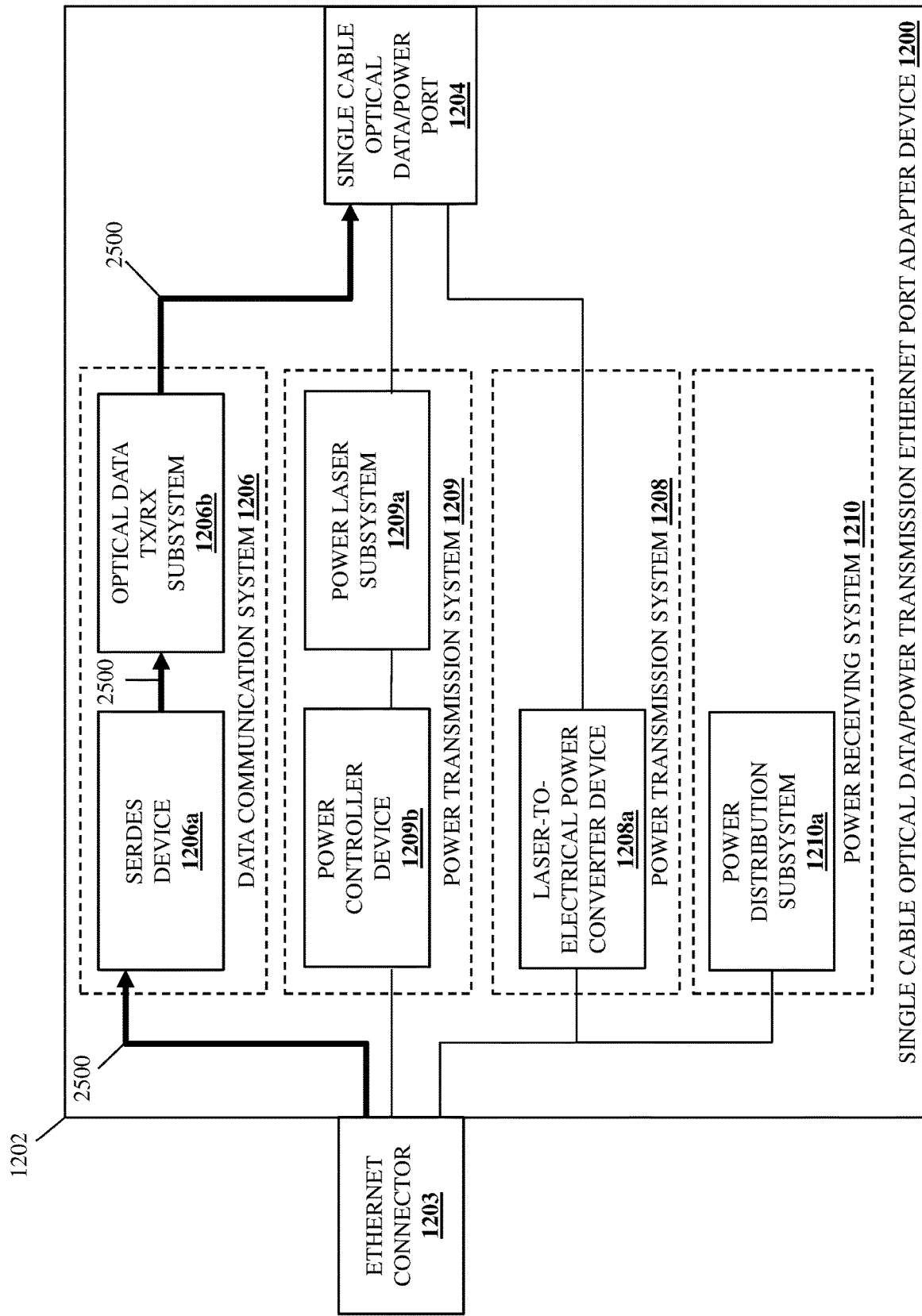
FIG. 25A is a schematic view illustrating an embodiment of the single cable optical data/power transmission Ethernet port adapter device of FIG. 21 operating during the method of FIG. 20.

With reference to FIG. 25A, in embodiments of block 2008 where the PoE powered device 2102 transmits the electrical data discussed above, the single cable optical data/power transmission Ethernet port adapter device 1200 may perform data transmission operations 2500. For example, the data transmission operations 2500 may include the Ethernet connector 1203 receiving the electrical data that was transmitted by the PoE powered device 2102 through the Ethernet port 2102a, and providing the electrical data as a parallel electrical data signal stream to the SERDES device 1206a, the SERDES device 1206a converting the parallel electrical data signal stream to a serial electrical data signal stream and providing that serial electrical data signal stream to the optical data TX/RX subsystem 1206b, and the optical data TX/RX subsystem 1206b modulating one or more laser devices using the serial electrical data signal stream to produce optical data that is transmitted at block 2008 via the optical data conduit(s) in the single cable optical data power port 1204, via the optical power fiber(s) in the optical data/power transmission cable 600, and to the single cable optical data/power transmission powering device 200.

Figure 25B:
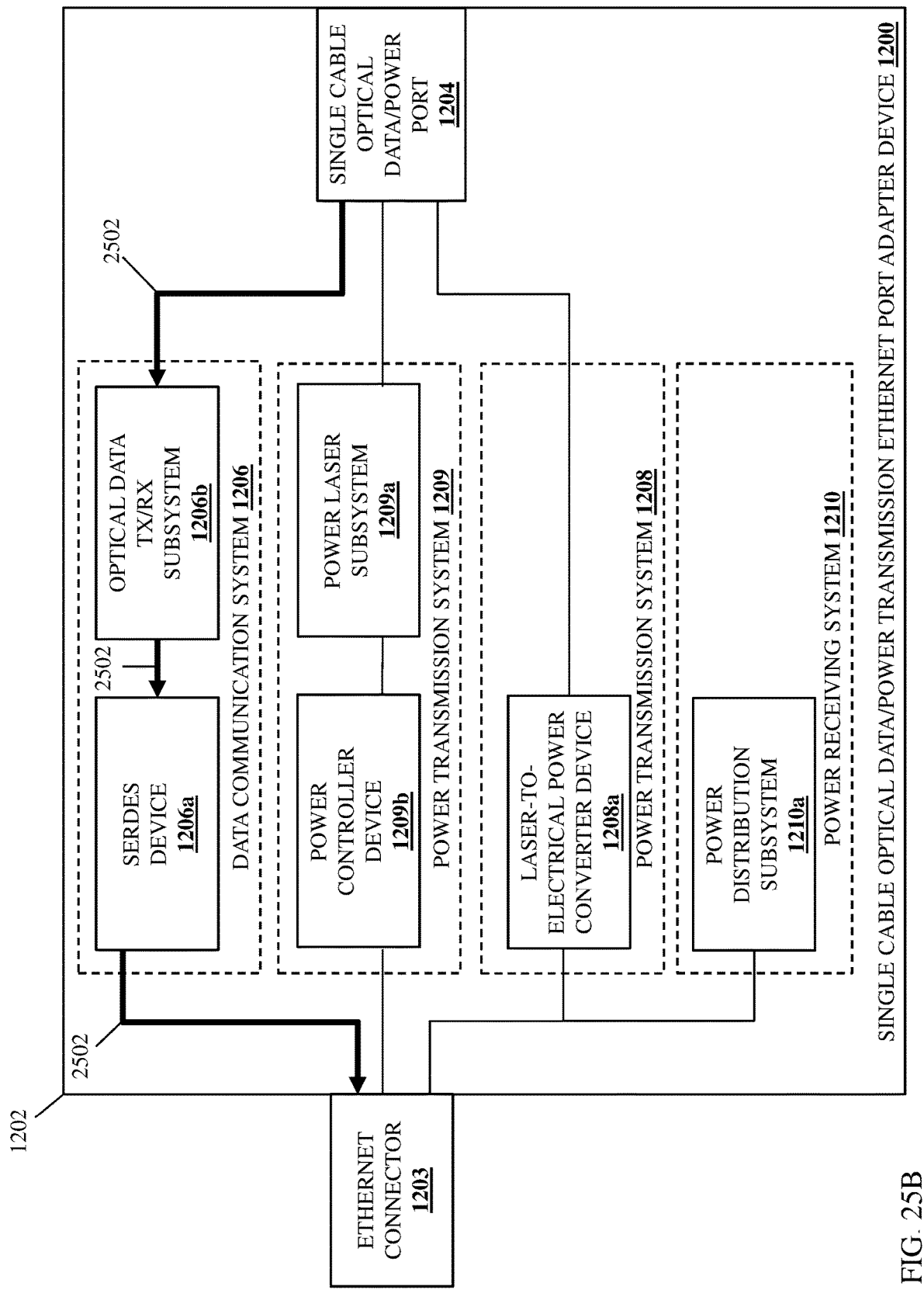
FIG. 25B is a schematic view illustrating an embodiment of the single cable optical data/power transmission Ethernet port adapter device of FIG. 22 operating during the method of FIG. 20.

With reference to FIG. 25B, in embodiments of block 2008 where the single cable optical data/power transmission powered device 1000 transmits the optical data discussed above, the single cable optical data/power transmission Ethernet port adapter device 1200 may perform data transmission operations 2502. For example, the data transmission operations 2502 may include the optical data conduit(s) in the single cable optical data/power port 1204 receiving the optical data transmitted by the single cable optical data/power transmission powered device 1000 via the optical data conduit(s) in the single cable optical data/power port 1010 and via the optical power fiber(s) in the optical data/power transmission cable 600, and providing that optical data to the data communication system 1206 such that the optical data TX/RX subsystem 1206b converts the received optical data to a serial electrical data signal stream and provides the serial electrical data stream to the SERDES device 1206a, and the SERDES device 1206a converts the serial electrical data signal stream to a parallel electrical data signal stream that provides electrical data, and provides the electrical data (that was transmitted by the powered device engine 1004 in the single cable optical data/power transmission powered device 1000) via the Ethernet connector 1203 and to the PoE powering device 2202.

The method 2000 then returns to block 2006. As such, the method 2000 may loop such that the single cable optical data/power transmission Ethernet port adapter device 1200 enables the single cable optical data/power transmission powering device 200 to power the PoE powered device 2102 while the single cable optical data/power transmission powering device 200 and the PoE powered device 2102 exchange data, or enables the PoE powering device 2202 to power the single cable optical data/power transmission powered device 1000 while the PoE powering device 2202 and the single cable optical data/power transmission powered device 1000 exchange data. Furthermore, one of skill in the art in possession of the present disclosure will appreciate how the power negotiation operations discussed above with reference to optional block 2004 may be performed periodically to adjust the amount of power provided by the single cable optical data/power transmission powering device 200 to the PoE powered device 2102, or adjust the amount of power provided by the PoE powering device 2202 to the single cable optical data/power transmission powered device 1000, while remaining within the scope of the present disclosure.

Thus, systems and methods have been described that provide a single cable optical data/power transmission Ethernet port adapter device that may be used to couple the single cable optical data/power transmission powering device of the present disclosure to a PoE powered device via the optical data/power transmission cable of the present disclosure in order to allow data and power to be transmitted to the PoE powered device over greater distances than are available via conventional PoE techniques, or that may be used to couple a PoE powering device to the single cable optical data/power transmission powered device of the present disclosure via the optical data/power transmission cable of the present disclosure in order to allow data and power to be transmitted from the PoE powering device over greater distances than are available via conventional PoE techniques.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A single cable optical data/power transmission Ethernet port adapter system, comprising:
    a single cable optical data/power transmission powering device;
    an optical data/power transmission cable that is connected to the single cable optical data/power transmission powering device;
    a powered device including an Ethernet port;
    a single cable optical data/power transmission Ethernet port adapter device that includes:
        a single cable optical data/power port that is coupled to the optical data/power transmission cable and that includes at least one optical data conduit having an optical data conduit cross-sectional area, and at least one optical power conduit having an optical power conduit cross-section area that is greater than the optical data conduit cross-sectional area;
        an Ethernet connector that is connected to the Ethernet port;
        a data communication system that is coupled to the Ethernet port and the at least one optical data conduit, and that is configured to:
            receive, via the at least one optical data conduit, first optical data that was transmitted by the single cable optical data/power transmission powering device using the optical data/power transmission cable;
            transmit, using the first optical data, first electrical data via the Ethernet connector and to the powered device;
        a power transmission system that is coupled to the Ethernet port and to the at least one optical power conduit and that is configured to:
            receive, via the at least one optical power conduit, first optical power that was transmitted by the single cable optical data/power transmission powering device using the optical data/power transmission cable;
            transmit, using the first optical power, first electrical power via the Ethernet connector and to the powered device.

2. The system of claim 1, wherein the power transmission system includes:
    a laser-to-electrical power converter device that is connected to the at least one optical power conduit and the Ethernet port, wherein the laser-to-electrical power converter device is configured to:
        convert the first optical power received via the at least one optical power conduit to the first electrical power; and
        transmit the first electrical power via the Ethernet connector and to the powered device.

3. The system of claim 1, wherein the data communication system includes:
    an optical data transmit/receive subsystem that is coupled to the at least one optical data conduit and that is configured to receive the first optical data and convert the first optical data to the parallel electrical data; and
    a SERializer/DESerializer (SERDES) device that is connected to the optical data transmit/receive subsystem and the Ethernet port, wherein the SERDES device is configured to receive the parallel electrical data from the optical data transmit/receive subsystem, convert the parallel electrical data to serial electrical data that provides the first electrical data, and transmit the first electrical data via the Ethernet connector to the powered device.

4. The system of claim 1, wherein the single cable optical data/power transmission Ethernet port adapter device includes:

a power receiving system that is coupled to the at least one optical power conduit and that is configured to:
receive, via the at least one optical power conduit, a portion of the first optical power that was transmitted by the single cable optical data/power transmission powering device using the optical data/power transmission cable; and
use the portion of the first optical power to power the single cable optical data/power transmission Ethernet port adapter device.

5. The system of claim 1, wherein each of the at least one optical data conduit includes an optical data conduit diameter that is less than 10 microns, and wherein each of the at least one optical power conduit includes an optical power conduit diameter that is greater than 50 microns.

6. The system of claim 1, wherein the at least one optical data conduit is provided by two optical data conduits, and wherein the at least one optical power conduit is provided by one optical power conduit.

7. An Information Handling System (IHS), comprising:
a single cable optical data/power transmission Ethernet port adapter chassis;
a single cable optical data/power port that is included on the single cable optical data/power transmission Ethernet port adapter chassis and that includes at least one optical data conduit having an optical data conduit cross-sectional area, and at least one optical power conduit having an optical power conduit cross-section area that is greater than the optical data conduit cross-sectional area;
an Ethernet connector that is included on the single cable optical data/power transmission Ethernet port adapter chassis;
a data communication system that is included in the single cable optical data/power transmission Ethernet port adapter chassis, that is coupled to the at least one optical data conduit and the Ethernet port, and that is configured to:
receive, via at least one optical data conduit in the single cable optical data/power connector, first optical data;
transmit, using the first optical data, first electrical data via the Ethernet port;
a power transmission system that is included in the single cable optical data/power transmission Ethernet cable adapter chassis, that is coupled to the at least one optical power conduit and the Ethernet port, and that is configured to:
receive, via at least one optical power conduit in the single cable optical data/power connector, first optical power;
transmit, using the first optical power, first electrical power via the Ethernet port.

8. The IHS of claim 7, wherein the power transmission system includes:
a laser-to-electrical power converter device that is connected to the at least one optical power conduit and the Ethernet port, wherein the laser-to-electrical power converter device is configured to:
convert the first optical power received via the at least one optical power conduit to the first electrical power; and
transmit the first electrical power via the Ethernet connector and to the powered device.

9. The IHS of claim 7, wherein the data communication system includes:
an optical data transmit/receive subsystem that is coupled to the at least one optical data conduit and that is configured to receive the first optical data and convert the first optical data to the parallel electrical data; and
a SERializer/DESerializer (SERDES) device that is connected to the optical data transmit/receive subsystem and the Ethernet port, wherein the SERDES device is configured to receive the parallel electrical data from the optical data transmit/receive subsystem, convert the parallel electrical data to serial electrical data that provides the first electrical data, and transmit the first electrical data via the Ethernet connector to the powered device.

10. The IHS of claim 7, further comprising:
a power receiving system that is included in the single cable optical data/power transmission Ethernet port adapter chassis, that is coupled to the at least one optical power conduit, and that is configured to:
receive, via the at least one optical power conduit, a portion of the first optical power that was transmitted by the single cable optical data/power transmission powering device using the optical data/power transmission cable; and
use the portion of the first optical power to power the single cable optical data/power transmission Ethernet port adapter device.

11. The IHS of claim 7, wherein each of the at least one optical data conduit includes an optical data conduit diameter that is less than 10 microns, and wherein each of the at least one optical power conduit includes an optical power conduit diameter that is greater than 50 microns.

12. The IHS of claim 7, wherein the at least one optical data conduit is provided by two optical data conduits, and wherein the at least one optical power conduit is provided by one optical power conduit.

13. The IHS of claim 7, wherein the at least one optical data conduit includes a first attenuation level that is lower than a second attenuation level of the at least one optical power conduit.

14. A method for adapting a single cable optical data/power transmission powered device to receive data and power via an Ethernet port, comprising:
receiving, by a data communication system in a single cable optical data/power transmission Ethernet port adapter device via at least one optical data conduit that is included in a single cable optical data/power port on the single cable optical data/power transmission Ethernet port adapter device and that has an optical data conduit cross-sectional area, first optical data;
transmitting, by the data communication system using the first optical data, first electrical data via an Ethernet connector that is included on the single cable optical data/power transmission Ethernet port adapter device;
receiving, by a power transmission system in the single cable optical data/power transmission Ethernet port adapter device via at least one optical power conduit that is included in the single cable optical data/power port on the single cable optical data/power transmission Ethernet port adapter device and that has an optical power conduit cross-sectional area that is greater than the optical data conduit cross-sectional area, first optical power;
transmitting, by the power transmission system using the first optical power, first electrical power via the Ethernet connector.

15. The method of claim 14, wherein the power transmission system includes:
a laser-to-electrical power converter device that is connected to the at least one optical power conduit and the Ethernet, wherein the laser-to-electrical power converter device converts the first optical power received via the at least one optical power conduit to the first electrical power, and transmits the first electrical power via the Ethernet connector and to the powered device.

16. The method of claim 14, wherein the data communication system includes:
an optical data transmit/receive subsystem that is coupled to the at least one optical data conduit and that receives the first optical data and converts the first optical data to the parallel electrical data; and
a SERializer/DESerializer (SERDES) device that is connected to the optical data transmit/receive subsystem and the Ethernet port, wherein the SERDES device receives the parallel electrical data from the optical data transmit/receive subsystem, converts the parallel electrical data to serial electrical data that provides the first electrical data, and transmits the first electrical data via the Ethernet connector.

17. The method of claim 14, further comprising:
receiving, by a power receiving system in the single cable optical data/power transmission Ethernet port adapter device via the Ethernet port, a portion of the first electrical power; and
using, by the power receiving system, the portion of the first electrical power to power the data communication system and the power transmission system.

18. The method of claim 14, wherein each of the at least one optical data conduit includes an optical data conduit diameter that is less than 10 microns, and wherein each of the at least one optical power conduit includes an optical power conduit diameter that is greater than 50 microns.

19. The method of claim 14, wherein the at least one optical data conduit is provided by two optical data conduits, and wherein the at least one optical power conduit is provided by one optical power conduit.

20. The method of claim 14, wherein the at least one optical data conduit includes a first attenuation level that is lower than a second attenuation level of the at least one optical power conduit.

* * * * *